United States Patent [19]
Jannson et al.

[11] Patent Number: 5,278,687
[45] Date of Patent: Jan. 11, 1994

[54] MULTIWAVELENGTH DATA COMMUNICATION FIBER LINK

[75] Inventors: Tomasz P. Jannson, Torrance; Kevin W. Shirk; Behzad M. R. Moslehi, both of Redondo Beach; Richard C. Kim, Yorba Linda, all of Calif.

[73] Assignee: Physical Optics Corporation, Torrance, Calif.

[21] Appl. No.: 681,128

[22] Filed: Apr. 5, 1991

Related U.S. Application Data

[63] Continuation-in-part of Ser. No. 599,816, Oct. 18, 1990.

[51] Int. Cl.$^5$ .................................. H04J 14/02
[52] U.S. Cl. .................................. 359/125; 359/124; 359/126
[58] Field of Search ............. 359/124, 129, 130, 131, 359/193, 8, 575, 615, 569; 385/123, 42, 46

[56] References Cited

U.S. PATENT DOCUMENTS

| | | | |
|---|---|---|---|
| 4,472,797 | 9/1984 | Nicia | 359/131 |
| 4,708,425 | 11/1987 | Gouali et al. | 359/131 |
| 4,718,055 | 1/1988 | Winzer | 359/121 |
| 4,748,614 | 5/1988 | Dammann et al. | 359/130 |
| 4,749,247 | 6/1988 | Large | 359/130 |
| 4,775,971 | 10/1988 | Bergmann | 359/113 |
| 4,834,474 | 5/1989 | George et al. | 359/8 |
| 4,909,584 | 3/1990 | Imoto et al. | 359/124 |
| 4,923,270 | 5/1990 | Carter | 359/127 |
| 4,926,412 | 5/1990 | Jannson et al. | 359/130 |
| 4,957,339 | 9/1990 | Fussgänger et al. | 359/127 |
| 5,026,131 | 6/1991 | Jannson et al. | 359/130 |

FOREIGN PATENT DOCUMENTS 2152317  7/1985  United Kingdom ............. 359/130

Primary Examiner—Richard E. Chilcot, Jr.
Assistant Examiner—Rafael Bacares
Attorney, Agent, or Firm—Niles & Niles

[57] ABSTRACT

An optical multi-channel data communication link transmits data from a transmitter to a remote receiver. The link includes a multimode laser diode source connected to the transmitter, a device for modulating the source with each channel of data to generate a modulated light wave, and a wavelength division multiplexing device at the transmitter. The wavelength division multiplexing device has paraxial optics for multiplexing the light waves to produce a multiplexed signal. Multimode fiber optic means are connected to the multiplexer and pass the multiplexed signal to the remote receiver. A wavelength division multiplexer has paraxial optics for demultiplexing the multiplexed signals at the receiver to produce demultiplexed light waves. Each of the demultiplexed light waves are converted for use by the receiver. Preferably, each of the wavelength division multiplexer and demultiplexer has a littrow reflecting grating and a lens which are paraxially aligned with the multimode fiber optic means to provide channel separation of less than 50 nm.

61 Claims, 19 Drawing Sheets

(CROSS-TALK MODEL)

MULTIWAVELENGTH DATA COMMUNICATION FIBER LINK

This is a continuation-in-part of Ser. No. 599,816 filed on Oct. 18, 1990.

BACKGROUND OF THE INVENTION

1. Field of the Invention

The present invention pertains to the transfer of data signals point to point. More particularly, the invention relates to transfer of data between source and receiver wherein the data in the form of an electrical signal is converted into light waves, transferred via a fiber optic cable to a receiver and then converted back into an electrical signal.

2. Description of the Prior Art

Transmission of multiple data signals from one point to another can be accomplished in a virtually unlimited number of ways. Transfer of information can occur over different frequencies (optical, microwave, & radio) and media including air, twisted wire, coax and more recently, fiber optic cables. Examples of data transmission in air include television and radio. Transfer of information by wire could include, for example, macroscopic structures such as coax or twinax cable for carrying a television signal from a receiving antenna to a television set or a cable connecting a peripheral unit such as a printer to a personal computer, to microscopic structures such as the minute electrical paths that guide electrons in an integrated circuit. Examples of transmission of data using fiber optic cables include fiber optic telephone cables. In each of these types of systems it is typically desirable that data should be transferred between source and receiver as quickly as possible and with utmost accuracy and maintenance of desired signal characteristics.

Two broad categories of transmission of data would include transmission by analog and digital means. Within each of these types of transmission, numerous modulation techniques of data have been used including FM, AM, and pulse modulation (PM). Techniques providing means for not only modulating a carrier with information from one signal but for multiplexing numerous signals for transmission together include time division multiplexing (TDM), and frequency division multiplexing (FDM). FDM in essence involves stacking a number of data channels side by side in the frequency domain to form a composite signal. The composite frequency multiplexed signal is used to modulate a carrier in a conventional manner. TDM is a derivative of pulse modulation and involves interleaving in time the narrow pulses of several pulse modulated signals to form one composite signal. Separation of the TDM pulses at the receiver is accomplished by directing the pulses into individual channel filters.

In recent years, as a result of the maturation of fiber optic technology in transmission systems, advances have been made in a multiple carrier technique referred to as wavelength division multiplexing (WDM). This technique is the optical equivalent of frequency division multiplexing used in RF coaxial transmission. In WDM, each discrete data channel is modulated onto an optical carrier of a fixed wavelength and each of the carriers are then fed into the optical transmission medium. The individual carriers are recovered at the receiver by separating the carrier into its individual wavelength components. One such example of a WDM is disclosed in U.S. Pat. No. 4,926,412, the essentials of which are incorporated by reference herein. There, a WDM is disclosed having paraxial transmission optics.

A transmission optics WDM differs from a reflection optics system in that in the former, the light beam changes direction only once in the system; it is first collimated by a lens, diffracted by a grating, and then focused by the lens into the fibers. In paraxial optics, the input and output optical fibers are maintained close to the optical axis to limit losses in the system due to dispersion broadening, and image aberrations.

In a reflection optics WDM, the beam changes direction three times; the beam is first collimated by a mirror, diffracted by a grating located in roughly the same plane as the fiber ends, and focused by the first mirror into the fibers. Reflection optics WDMs, produced by Instrument SA and others, are based on relief surface holographic gratings, usually coated on curved surfaces that simultaneously perform imaging operations. Other types of WDMs, produced by Kaptron, for instance, utilize spherical imaging reflection surfaces, usually coated with multilayer dielectric films to provide wavelength selective reflectance (see, e.g., F. Unterleitner, Fiberoptic Product News, Vol. 5, No. 12, November 1990, p. 27). An entirely different WDM approach based on biconical coupler technology, is proposed by Gould Electronics. Still another WDM system, based on lens transmission optics and highly non-uniform flat volume holographic gratings, has been proposed by Physical Optics Corporation in the above mentioned U.S. Pat. No. 4,926,412. References relating generally to optical fibers and fiber communications are plentiful and include for example: S. Miller and I. Kaminow, Optical Fiber Telecommunications (Academic Press, 1988); and D. Baker, Fiber Optic Design and Applications (Reston, 1985)incorporated by reference herein.

Without question, transmission of data optically versus by wire means is becoming more and more prevalent. Numerous reasons exist for using optical transmission of data, as opposed to electrical transmission including bandwidth limitations, electromagnetic interference, weight and bulk. In order to achieve high bandwidth in an electrical data transmission system, the wires must have large diameters for shielding from EMI and consequently are bulky and heavy. Furthermore, power losses associated with data transmission over electrical ires are very large, and signal repeaters must be placed at relatively small intervals (500 m) even for low frequencies (<10 MHz).

Transmission of data optically, on the other hand, can provide huge bandwidth characteristics, extremely low loss even over long distances and immunity to electromagnetic radiation even in environments saturated with electronics such as aircraft. Furthermore, because the bandwidth of an optical fiber actually increases with a decrease in the diameter of the fiber optic cable, huge bandwidths (>300 MHz for 1 km length of multimode fiber) are obtainable with extremely light and nonbulky transmission lines.

Although the majority of LANs are still coax-based or "twisted pair", video transmission systems, which are more demanding than LANs because of higher bandwidth requirements and remote location desirability are better suited to fiber optics. Typical high speed fiber optics systems are red-green-blue (RGB), closed circuit television (CCTV), and computer aided design (CAD) RGB and CCTV are typically analog with a 10-50 MHz throughput while CAD is digital or analog with 120-300 MHz throughput. Typical multi-mode fibers used for data transmission have 50/125μ, 62.5/125μ, 100/140μ, and 200/380μ core diameters. Fibers having these four core/cladding diameters are standard in most fiber optic applications and their cost of manufacture continues to decrease. Note that in a state of the art single-wavelength design only the core diameter is important because the core contains the traveling beam to the exclusion of the other portions of the fiber such as the cladding.

The advantages of optical transmission of data have not escaped industries where transfer of data is critical to transaction of daily business. Video local area networks (LANs), i.e., video conferencing, security systems, and the securities brokerage industry are three examples where transfer of information by fiber optic cable has been in place for sometime. Fiber optic cables have been used to transfer data between a video camera and a security alarm processor in high end security systems. In another application, information is transferred between a main computer that keeps track of market conditions and the tens of screens in a securities trading room.

In the future, Integrated Services Digital Networks (ISDN) which may provide 3-channel information for homes and businesses (telephone, video and data) will require high quality transmission. These systems, and Broadband Integrated Services Digital Networks (BISDN) will become commonplace.

In securities trading applications, typically called data feed terminal systems, the three video components (red, green, and blue), are continuously fed to trading room video screens in basically two ways. One means of transfer currently in use is inputting each of the three components of the video signal from the source computer into a light emitting diode (LED), or laser diode (LD) which converts each of the electrical signals to a light signal which is then fed, via a dedicated, separate optical path, to the trading screen. Another slightly newer and less common approach is to first multiplex (using TDM) the three electrical components of the video signal and then feed the multiplexed electrical signal to a LED, or LD for conversion to a multiplexed light wave which is then fed to the trading room video screen and reconverted to three electrical signals. Most such systems in use today are standardized around the RS 170, and RS343A standard for computer generated video signals.

The major drawback of the first system is that it requires the use of three separate modules in the electronics rack and, most importantly, requires three lengths of fiber optic cable to be run from the central computer to the trading room screens potentially many floors below. This obviously creates size and cost constraints. The major drawback of the slightly newer implementation of data transfer (TDM) is that the signals must be electronically multiplexed and then fed to a laser which must convert the multiplexed electrical signal accurately into a multiplexed light wave and transmit it to the video screen. Committing one light source to the task of converting a multiplexed electrical signal into a multiplexed light signal is less than desirable because it is typically a low efficiency conversion. The bandwidth of the fiber also becomes an issue in this format because 200μ core fiber cannot effectively transmit the bandwidth of an RGB signal on a single wavelength due to modal dispersion. Length is an issue as well; the signal can be broadcast but only over very short distances.

Still another disadvantage of TDM technique is that the multiplexed signals must be of the same modulation format, usually digital. To the contrary, WDM fiber-optic systems can multiplex, through various wavelength carriers, not only different format signals such as digital and analog, i.e., RS170 & RS232, but also various types of information related to different wavelengths, specific to a particular sensing medium such as in Raman spectroscopy, for example.

There are three basic types of light sources used in optical fiber data transmission, surface light emitting diodes (LEDs) and edge limiting LEDs (ELEDs), and laser diodes (LDs). Surface emitting LEDs have been in use for many years in many different applications. They are extremely reliable and relatively inexpensive. Laser diodes, on the other hand, are a much more recent technology, are slightly less reliable than LEDs, and are usually more expensive. LDs, however, as well as ELEDs have certain advantages over LEDs, that are becoming consistently achievable as LD technology matures in the compact disk (CD) industry. LDs are well known in use as the light source for reading CDs in now quite common CD players. The market for LDs created by the CD industry is large and has caused the development of standard LD wavelengths located in the 1st transmission spectral window: 750-850 nm. Within this range, Sharp has developed standard LD WDM wavelengths 750, 780, 810, 840, all in the vicinity of the CD wavelength 780 nm. Siemens, Phillips, Hitachi and Ortel also make LDs. Because of the huge production of LDs in these standard wavelengths, LDs have become extremely low cost ($10-$30) and price competitive with LEDs. Recently, ELED technology has achieved maturity, with a typical unit price of around $100. ELEDs' wavelengths, on the other hand, are usually located in the 2nd transmission window, around 1300 nm.

The primary advantage of LDs over LEDs is that LDs have much narrower spectral characteristics. Furthermore, LDs are much faster than LEDs. It is difficult to achieve 200 MHz with LEDs, while LDs can obtain greater than 1 GHz bandwidths. Additionally, the life of a typical laser diode is 250,000 hours or 120 years assuming it is not abused with high current or physically damaged. Also ELEDs have significantly narrower linewidths than surface-emitting LEDs, typically 50-100 nm versus 100-200 nm.

Unfortunately, with respect to transmission of multiple channels from source to receiver, TDMs and FDMs require very troublesome and sophisticated electronics while multi-fiber solutions are expensive and difficult to implement in space tight applications. Therefore, a data transmitting system that does not require the use of TDM or FDM multiplexing nor multiple fibers would be of great benefit and cost saving for all data transmission applications.

SUMMARY OF THE INVENTION

A multiwavelength data communication link employing low cost LDs, ELEDs and/or distributed feedback (DFB) lasers, holographic wavelength dependent dispersive grating elements, multimode or single mode optical fibers and associated electronics is presented. Specifically, low cost LDs within the single transmission window 750 nm-850 nm, as well as around 1300 nm, are modulated with the data to be transferred. A paraxial grating WDM, resistant to adverse effects from even substantial wavelength shift, may multiplex the separate modulated laser diode light beams for transmission on a single fiber optic cable to a receiver comprising a similar WDM (also called WDDM) which demultiplexes the multiplexed data into the original data channels. Electronic circuitry converts the individually modulated light waves into their electrical counterparts and then feeds the channels to the receiver. In another embodiment, the optical signal is modulated by a sensing medium, before it is transformed into an electrical signal.

Low cost GaAs LDs manufactured in the most common wavelength ranges and particularly 780 nm standard in the CD industry may be used as sources. GaAs LDs in the 750-850 nm window are particularly low cost and may act as the carrier for a separate channel of information (or more than one channel if TDM or FDM is employed) to be transferred independently and with extremely low cross-talk (or optical isolation), and nearly full transparency. The LDs receive their respective data channel information from electronics which adapt the channel in electronic form to the LD for conversion to a light wave modulated with the information. Each of the modulated light waves is then space-multiplexed in a fiber cable using wavelength division multiplexing techniques.

A preferred WDM comprises paraxial optics and a holographic dispersive element, preferably a broadband reflection quasi-Littrow grating, which assures extremely high multiplexing efficiency. The fiber optic cable on which the information is sent is a multi-mode fiber capable of handling the number of multiwavelength channels. The fiber optic cable therefore has extremely high total bandwidth, multiplying the bandwidth capacity by the number of wavelengths multiplexed. Fiber optic cable diameters standard in the industry may be used further lowering cost. The multiplexed signal in the fiber optic cable is received by another similar WDM (WDDM) which demultiplexes the signal into discrete signals corresponding to the original data channels. Again, the low loss and cross-talk of the WDM having paraxial optics and a holographic dispersive element makes the demultiplexing operation highly efficient. The demultiplexed modulated light waves may then be fed to three or more photo detectors which convert the light waves back into electrical signals. The converted electrical signals are then fed to a receiver such as a data feed terminal or video monitor. It should be emphasized that demultiplexing (WDDM) is more critical than multiplexing (WDM) because WDM can be accomplished in a number of alternative ways with good power budget, while only paraxial WDDM can separate wavelengths with high efficiency and low cross talk.

The above combination provides the ability to transmit a number of independent (multiwavelength) channels (analog & digital) within a single transparent window less than 200 nm wide with nearly full transparency and extremely low cross talk. The present invention enables voice, video, analog, or digital signals to be transferred point to point inexpensively and with a minimum of fiber length, equipment, and bulk. Importantly, the present invention therefore has a variety of applications, is low in cost, especially due to the ability to use current CD LD technology and low cost electronics, a variety of standard fiber types and lengths including lengths greater than 1 km with excellent power budget, high tolerance to wavelength shift, low cross talk, and full transparency. These highly optimal results, heretofore unobtainable, are achievable due to a combination of paraxial transmission optics, optimized WDM design, high quality highly uniform and broadband wavelength reflection holographic gratings and either multiwavelength low cost single window operation CD LDs, rapidly maturing ELEDs, or DFB lasers.

The optimized WDM design permits use of the present invention in multi-mode and single mode fiber optic applications where DFB lasers, conventional LDs, or LEDs are employed in either single or multi-window operations. The present WDM system geometry provides benefits resulting from the unique and unexpected relationship (both mathematical and structural) between the link's parameters such as insertion loss, cross-talk, signal dispersion, and system size; and WDM system design parameters such as source linewidth, source wavelength shift, wavelength separation, grating dispersion, grating optical density, fiber core/cladding ratio, fiber core/cladding geometrical tolerance, fiber insertion loss, fiber dispersion and lens focal length.

DESCRIPTIONS OF THE DRAWINGS

Figure 16A:
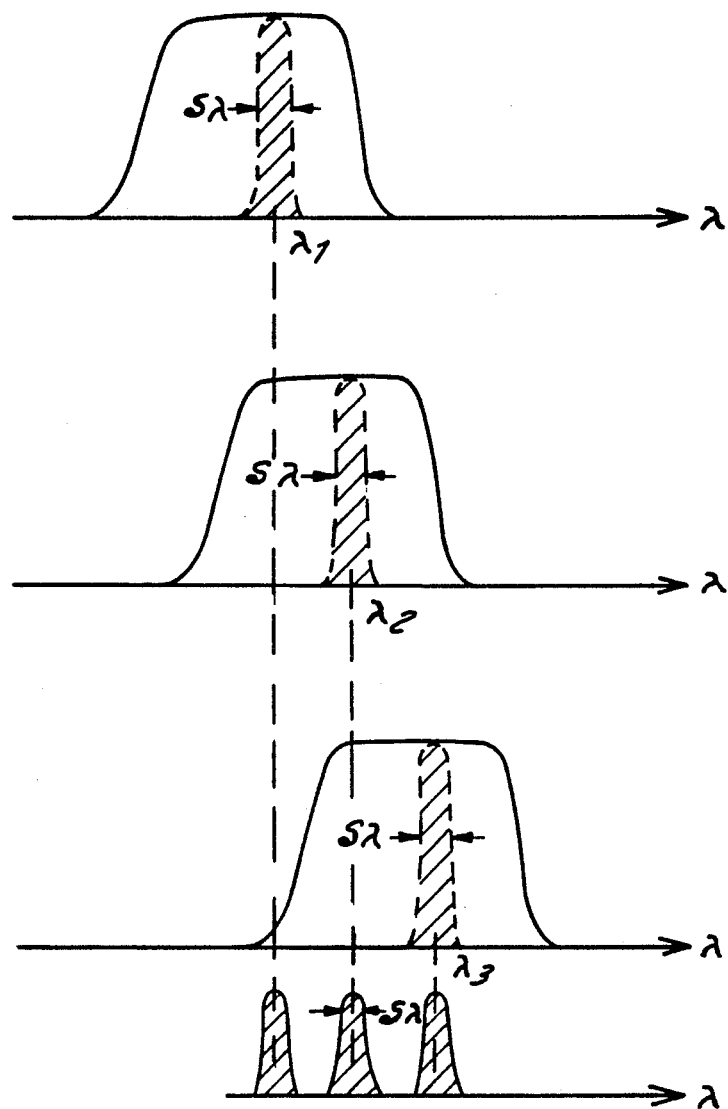
Figure 17:
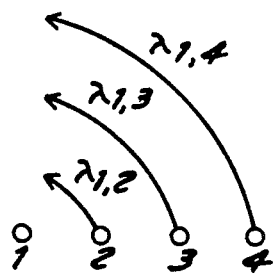
Figure 19:
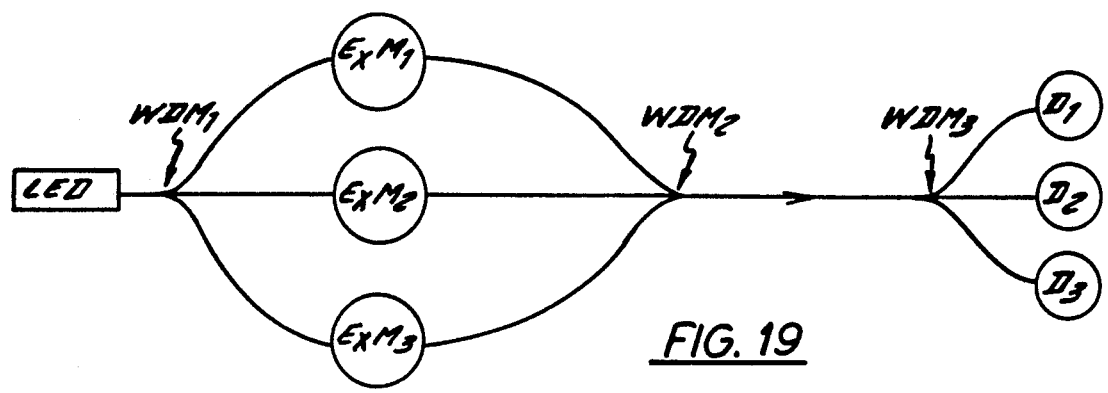
Figure 20:
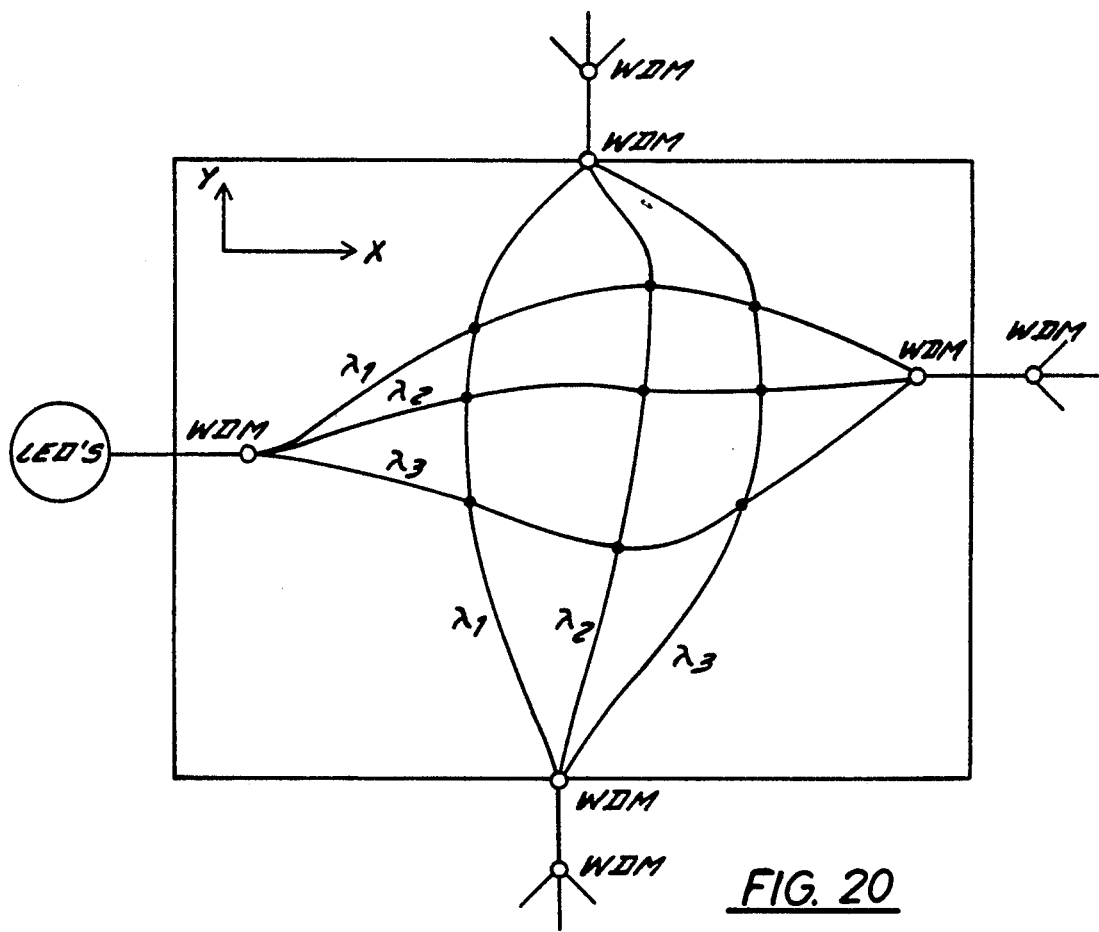
Figure 21A:
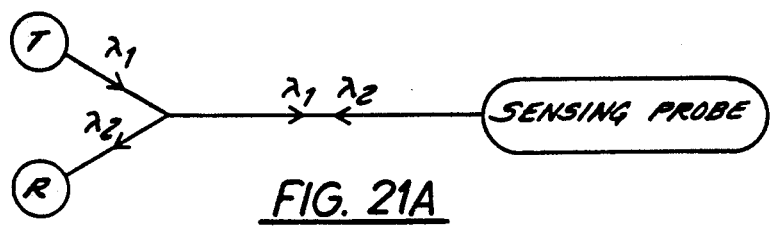
Figure 21B:
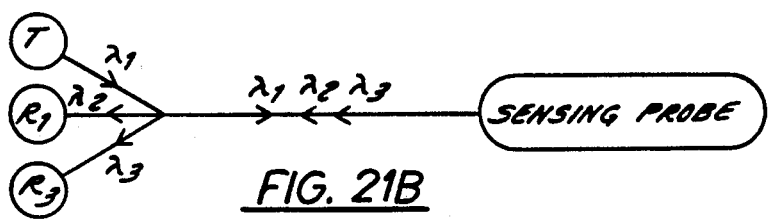
Figure 22:
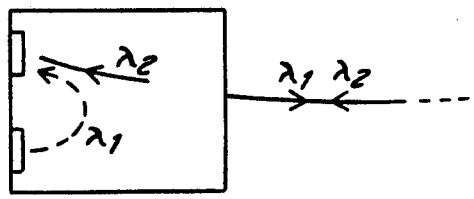
Figure 24:
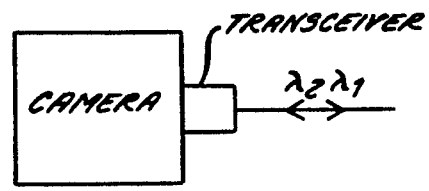
Figure 23:
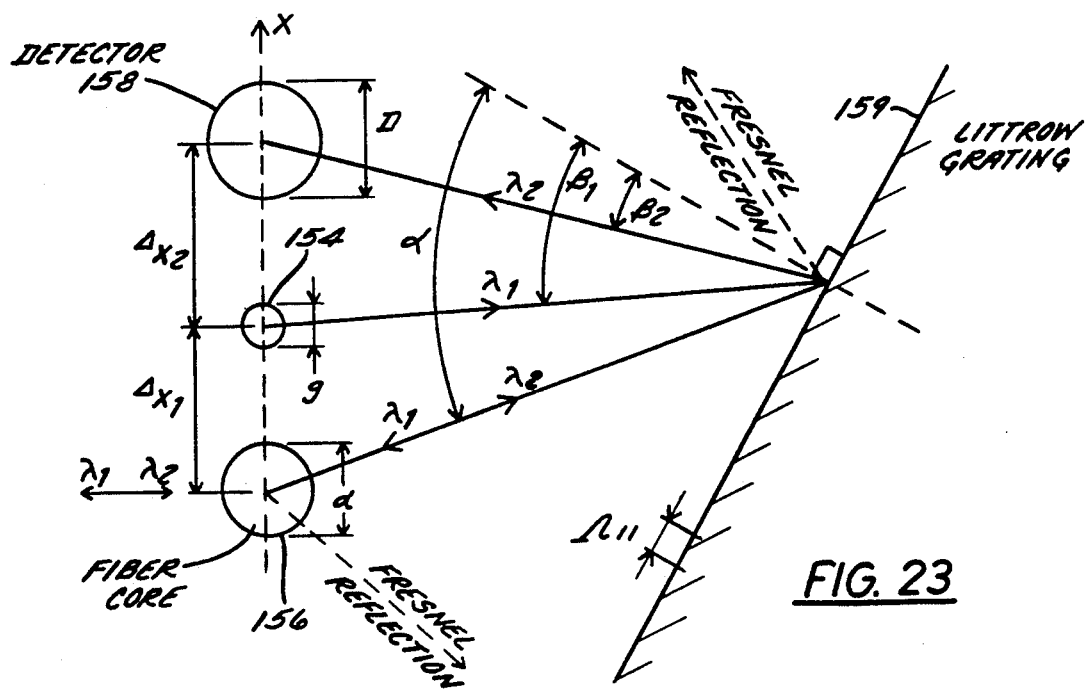
Figure 25:
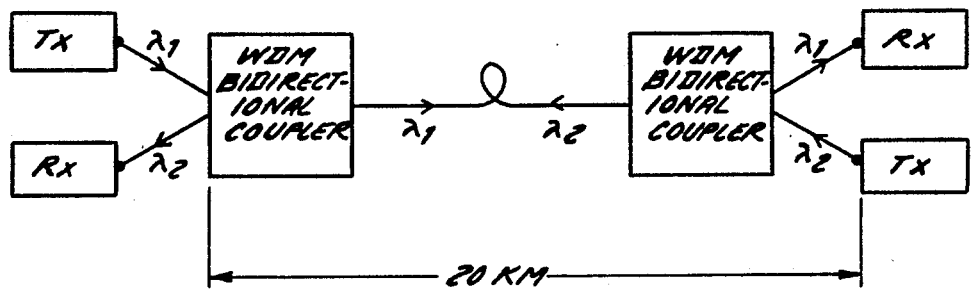
Figure 26A:
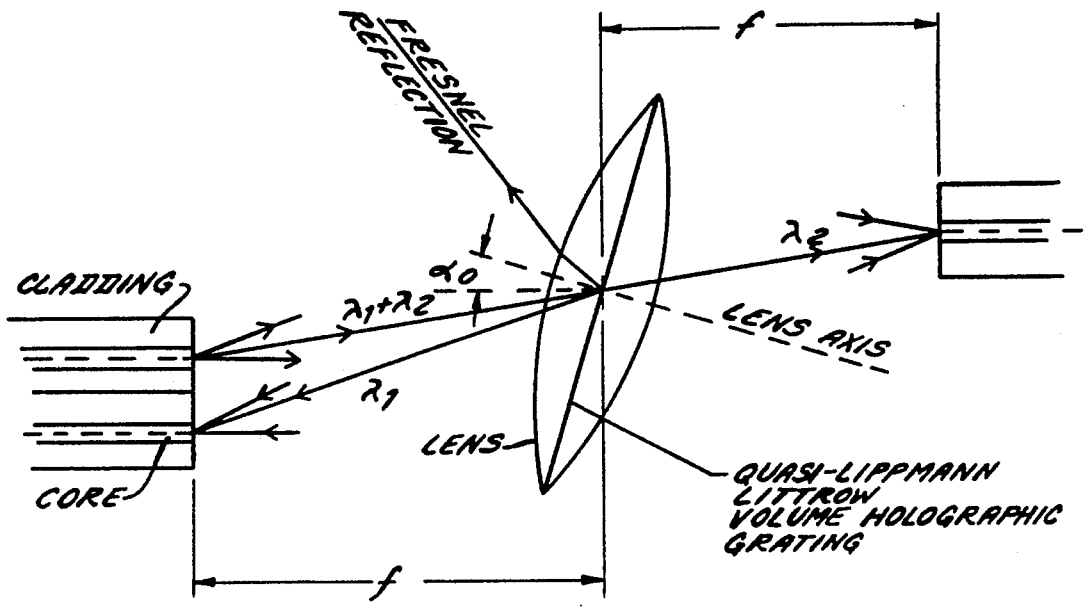
Figure 26B:
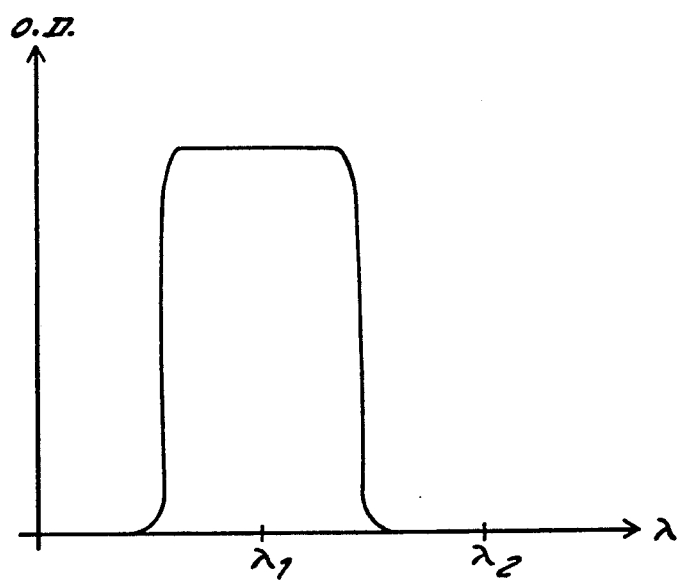

FIGS. 16A and B show the WDM filtering effect of the present invention;

FIG. 17 shows the relationship between fibers and their wavelengths in of the present invention;

FIGS. 18A-D show the WDM filtering effect of the present invention using only one light source;

FIG. 19 is a schematic of a multiple external modulator system of the present invention;

FIG. 20 is a schematic of a "smart skin" sensor system of the present invention;

FIGS. 21A-B are schematics of multi-wavelength sensors of the present invention;

FIG. 22 is a schematic of WDM optical isolation structure of the present invention;

FIG. 23 is a schematic of a bidirectional WDM grating splitter of the present invention;

FIG. 24 is a schematic of a security camera WDM system in accordance with the present invention;

FIG. 25 is a schematic of a bidirectional, dual-wavelength, single mode data link of the present invention with extremely low cross-talk;

FIG. 26A is a schematic of a WDM employing a quasi-Lippman Littrow volume holographic grating and FIG. 26B is a plot of the grating's reflection characteristics, O.D. versus λ.

FIGS. 27A-D are schematics of a single mode WDM, WDDM and bidirectional dual wavelength coupler, and dual window WDM cascade of the present invention.

Figure 28:
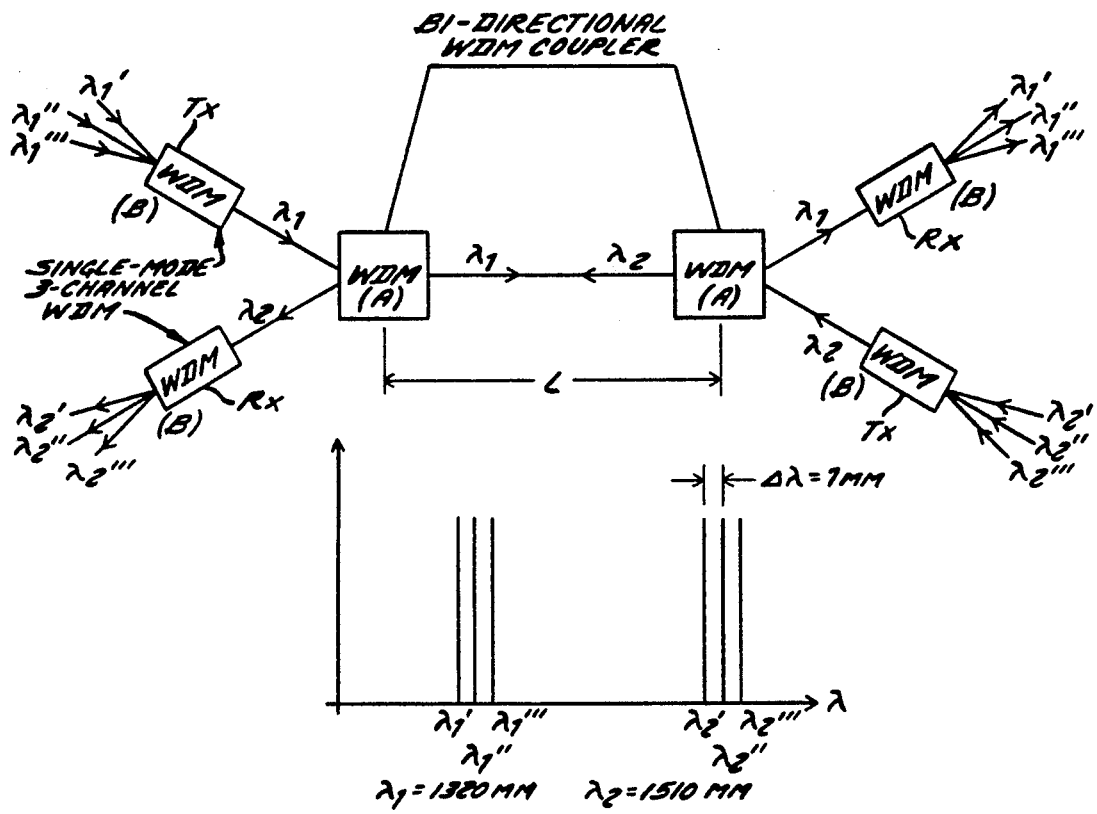
Figure 29A:
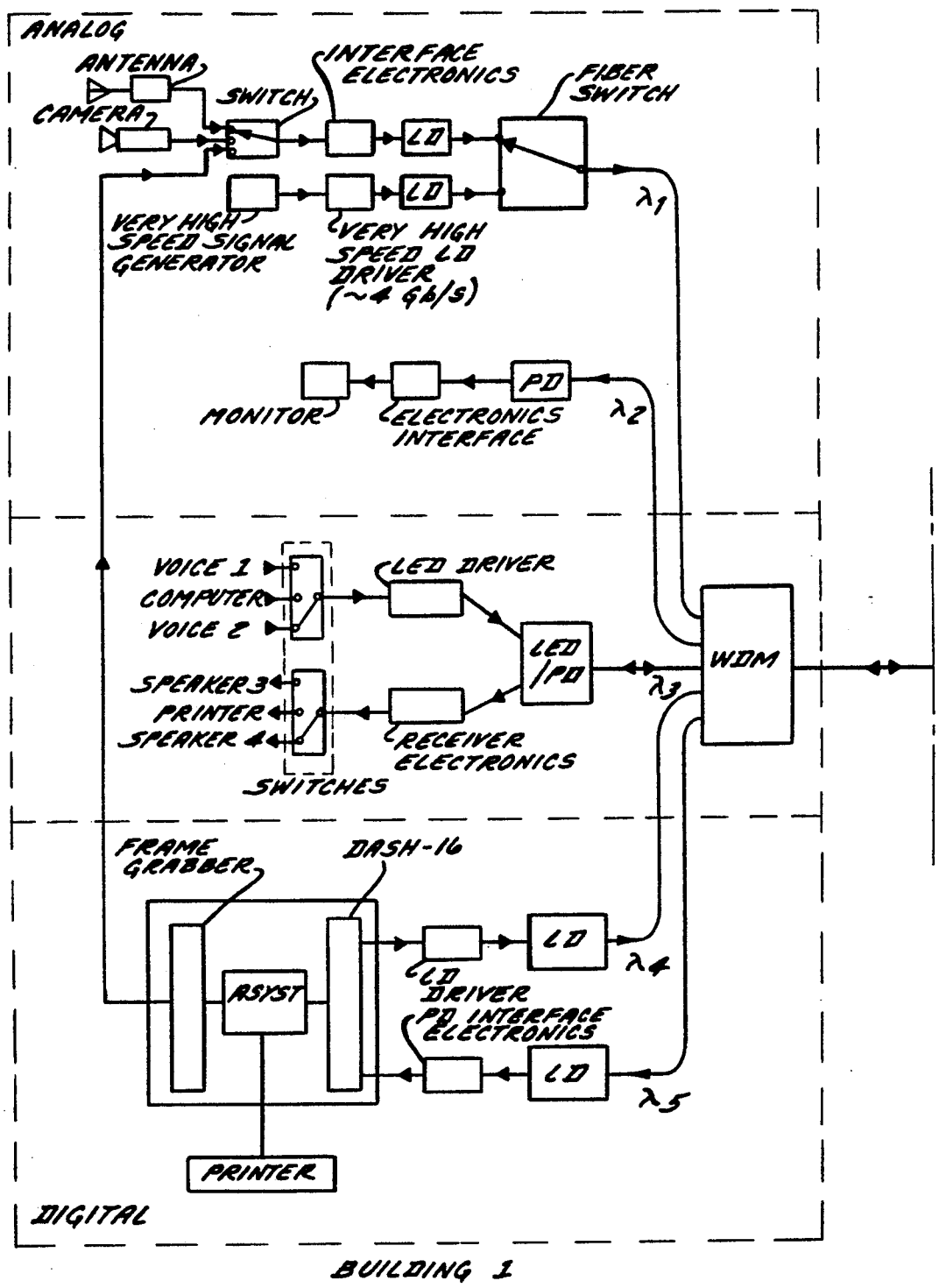
Figure 30:
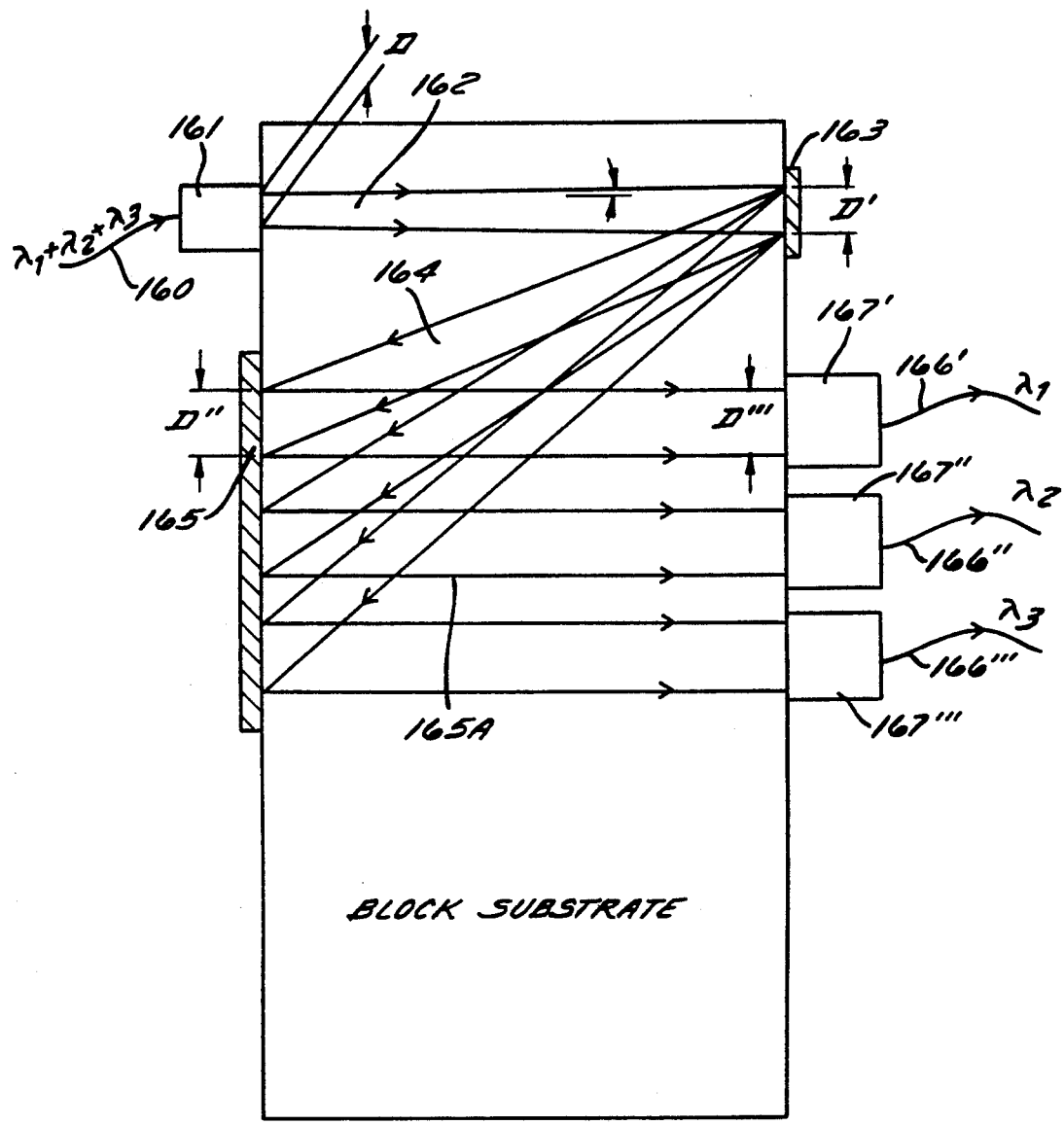

FIG. 28 is a schematic of a single mode WDM link of the present invention having WDM bidirectional couplers and WDM transceivers;

FIGS. 29A and B are schematics of a WDM based local area network (LAN) for communicating data, voice, video, and sensor information;

FIG. 30 is a schematic of a dispersion-compensation WDM system of the present invention.

DESCRIPTION OF THE PREFERRED EMBODIMENTS

Multiwavelength Data Communication Link

Figure 1:
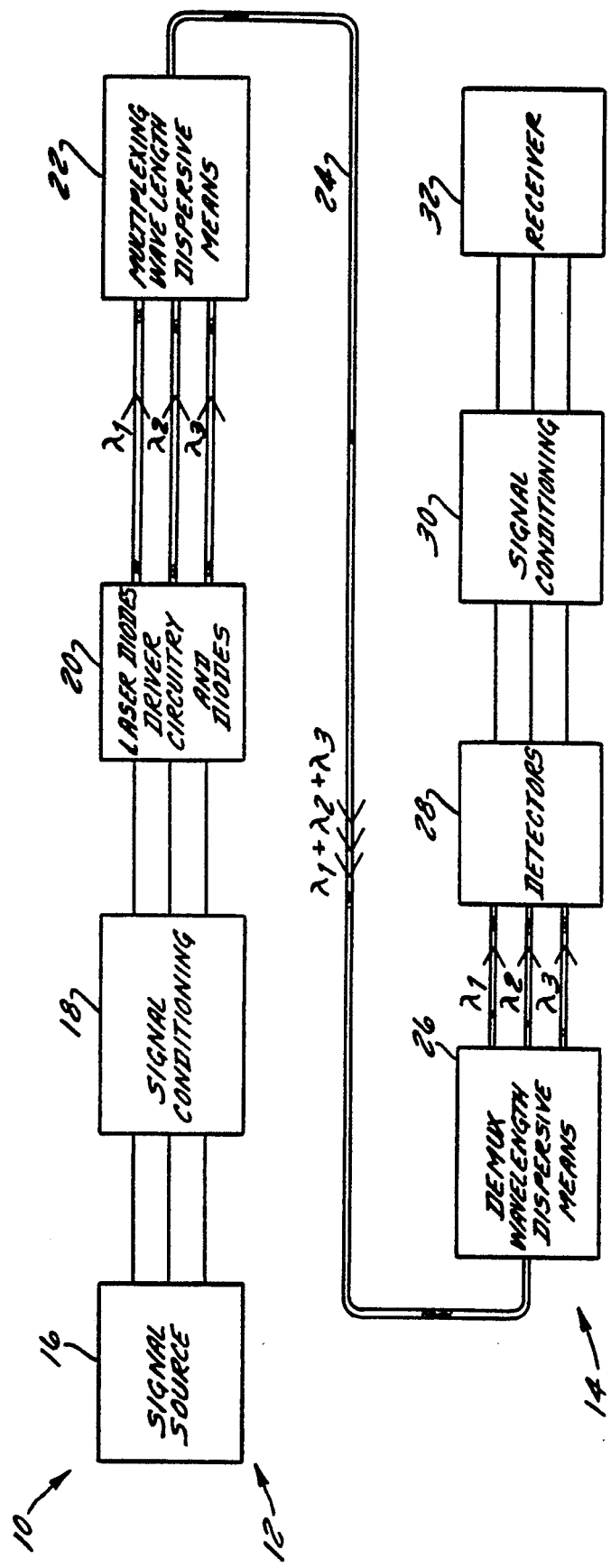
FIG. 1 is a block diagram of a video system in accordance with the present invention.

Referring now to FIG. 1, a multiwavelength data communication link 10 comprising transmitter 12 and receiver 14 is depicted. Transmitter 12 may comprise signal source 16, signal conditioning circuitry 18, laser diode driver circuitry and diodes 20 (which may alternatively be ELEDs), and multiplexing wavelength dispersive means 22. Signal source 16 may Comprise any multichannel signal such as video, computer, telephone or other data channels, or multi-color RGB signal. Signal conditioning circuitry 18 conditions and adapts the signal for input into the laser diode driver circuitry and laser diodes 20. Laser diode driver circuitry and diodes 20 receive the conditioned signal and output that signal in light wave form to multiplexing wavelength dispersive means 22, for exemplary wavelengths $\lambda_1$, $\lambda_2$, $\lambda_3$ as shown in FIG. 1.

Each channel is provided a dedicated line for transfer between signal source 16, signal conditioning circuitry 18, and laser diode driver circuitry and laser diodes 20, and the multiplexing wavelength dispersive means 22. The laser diode driver circuitry may comprise standard circuitry that provides the proper voltages for operation of the laser diodes. Such circuitry may comprise for instance a standard biasing circuit to bias the LD above threshold and below kinks in the current vs output curve, and a standard op-amp circuit for adjustable scan of the input. The laser diodes in block 20 may preferably comprise standard laser diodes used in the CD industry having standard operating wavelengths of 750, 780, 810, and 840 nm. Sharp laser diodes may preferably be used, but for higher speed links (>20 MHz per wavelength), other LDs or ELEDs may be more convenient. These LDs are low cost because the thickness of the aluminum needed to be doped into the LD for this wavelength range (particularly 780 and 810 nm) to achieve proper band gap energy and wavelength can be accomplished without unduly stressing the GaAs layers which bound the aluminum doped layers in the liquid phase epitaxial growth (LPE) process or MOCVD (Metal Organic Chemical Vapor Deposition) process.

Multiplexing wavelength dispersive means 22 may comprise any device which multiplexes light signals according to wavelength. In the preferred embodiment, the multiplexing wavelength dispersive means may comprise a highly paraxial WDM having a broadband reflection grating with highly uniform and high diffraction efficiency wavelength characteristics. Less desirable but operable gratings include transmission gratings and mirror based reflection gratings. Preferred high diffraction efficiency gratings may include DCG volume holographic gratings and photopolymer volume holographic gratings, if the photopolymer has sufficiently broadband uniform wavelength characteristics. Some types of photoresist gratings and substrate-etched grating structures having above average diffraction efficiency and broadband width uniform characteristics may be used as well. Particularly advantageous gratings would include highly vertically-nonuniform volume holographic DCG gratings wherein nonuniform alcohol-water processing techniques are used to create a grating having an extremely flat efficiency curve over the wavelength range of interest. Such a highly nonuniform volume holographic grating is fully described in U.S. application Ser. No. 435,608 the essentials of which are incorporated by reference herein as well as in: T. Jannson et al., Opt. Soc. of Amer., Vol. 8, No. 1, p. 201 (January 1991).

The transmitter 12 is connected to the receiver 14 via multimode fiber 24 which may comprise any of the standard multimode fibers presently manufactured. The relative core to cladding diameter ranges for these standard fiber sizes are: 50/125, 62.5/125, 100/140, and 200/380 lμ. The cost of multimode fibers in these standard size ranges continues to decrease thereby making their use in the present invention advantageous. A 1 km length of these fibers, a length which may be necessary in large installations, would present only a 2-6 dB loss.

The receiver 14 in FIG. 1 comprises demultiplexing wavelength dispersive means 26, detectors 28, signal conditioning circuitry 30, and receiving unit 32. The demultiplexing wavelength dispersive means 26 may comprise the same or similar type of wavelength dispersive means used for the multiplexing wavelength dispersive means 22 in the transmitter 12. Demultiplexing wavelength dispersive means 26, however, obviously has one multimode fiber as its input and three multimode fibers at its output (or a number of output multimode fibers corresponding to the number of channels in the system).

The output of the demultiplexing wavelength dispersive means 26 is connected to detectors 28 which detect the various wavelength light signal channels and convert them to electrical impulses corresponding to standard logic levels at the transmitter 12. Standard photodetectors may be used for this purpose, and advantageously, these photo detectors may be lower speed detectors which further reduce the cost of implementing the present invention.

The preferred photodetector is a PIN diode which is small, fast, and inexpensive. For cases where power levels at the detector are very low (nW-pW range) avalanche photodiodes (APD) can be used. The draw back of an APD is its high voltage (~100 v) requirement and high temperature sensitivity compared to PIN diodes. The temperature sensitivity, however, can be drastically reduced by electronic feedback compensation. Both PIN diodes and APDs are compatible with optical fibers in terms. of size (area) and numerical aperture.

This is in contradistinction to the high speed photo detectors needed in a TDM system as discussed above. For example, in order to transmit 100 MHz aggregate bandwidth, the TDM case requires high speed detectors with 100 MHz bandwidths, while in the 5-wavelength WDM case, 20 MHz lower speed detectors are sufficient. Inexpensive silicon can be used for the 800 nm window. This points up the unexpected advantages of the present combination wherein the components may be standard low cost components, which when combined nonetheless yield very high aggregate bandwidth and low loss and excellent power budget (approximately 20 dB power margin), high tolerance to wavelength shift (approximately 10 nm), low cross-talk (less than −20 dB optical or equivalently −40 dB electrical), and full transparency (i.e., each wavelength carrier is transmitted completely independently of other wavelength carriers).

The output of the photo detectors 28 is input to the signal conditioning circuitry 30 which prepares the signal (at the same logic levels 0-5 V digital or 1 V p-p analog as at the transmitter) for input to the receiver 32 which may comprise any number of receiving units such as standard data feed terminals.

Figure 2:
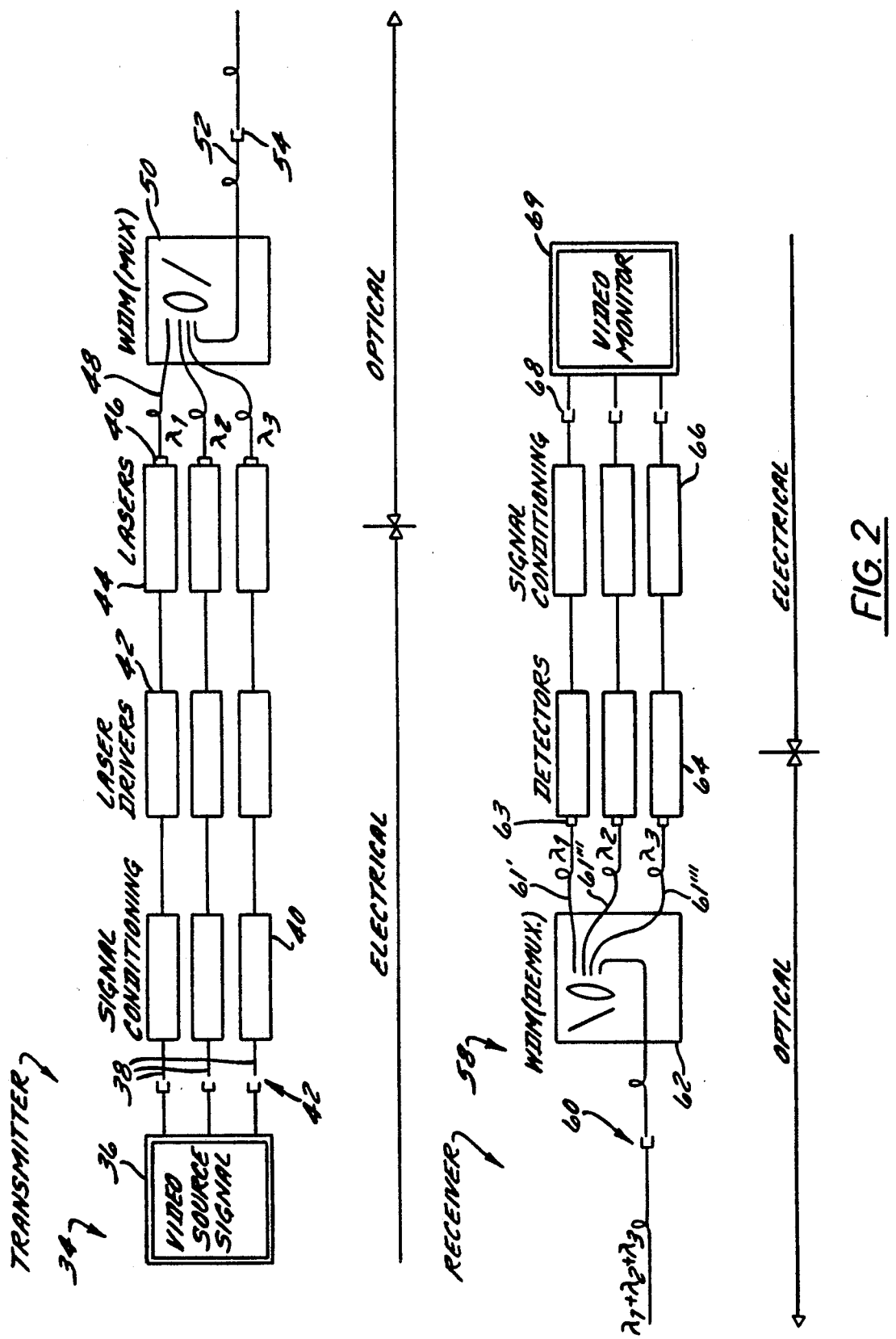
FIG. 2 is a schematic of the electro/optic circuit modules shown in FIG. 1 in accordance with the present invention.

Referring now to FIG. 2 a more detailed schematic of the exemplary multiwavelength data communication link 10 in accordance with the present invention with respect particularly to video signals is depicted. A preferred transmitter 34 comprises multichannel video source signal 36 having one output line 38 for each channel which inputs the signal to the signal conditioning circuitry 40 through 75-ohm BNC connectors 42. Signal conditioning circuitry 40 may comprise individual signal conditioning circuitry for each channel. Signal conditioning circuitry 40 outputs the respective channels electrically to standard laser drivers 42. Laser drivers 42 output their electrical signal to lasers 44, there being one laser per wavelength channel. The 3 mW lasers 44 output their laser light waves onto fibers 48 through laser pigtails 46. Alternatively, 1 mw ELEDS may be used. Fiber optic cables 48 are input to multiplexing WDM 50. Pigtails 46 are essential to minimizing the effects of feedback which include mode hopping between the lasers' longitudinal modes, bias point shift, and wavelength shift due to unwanted secondary resonator structure in the fiber. Without control of feedback, bias point optimization at set-up will likely be lost.

Figure 3:
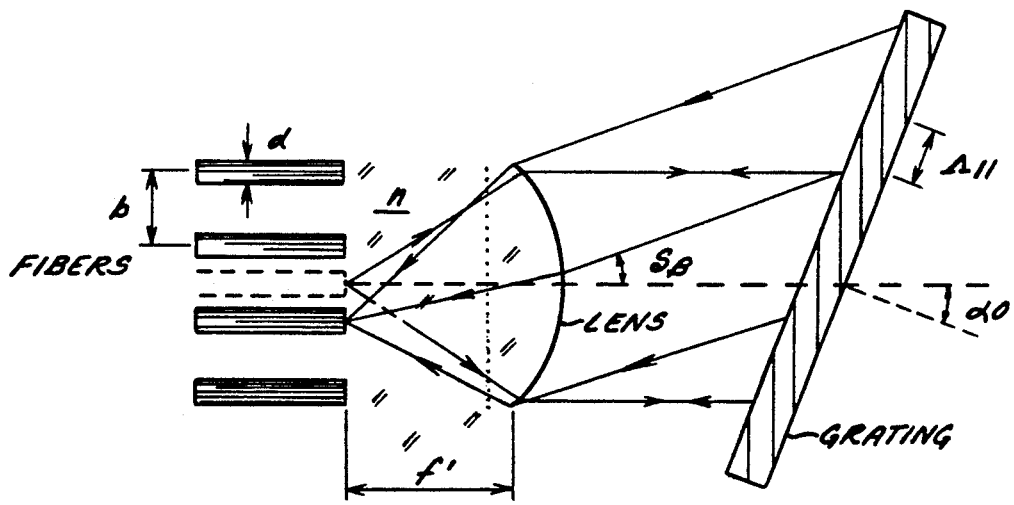
FIG. 3 is a schematic of a WDM grating configuration of a link in accordance with the present invention.

WDM 50 in a preferred embodiment may comprise the structure similar to the WDM disclosed in U.S. Pat. No. 4,926,412. Briefly, the WDM comprises a housing, a Fourier transform lens and a holographic dispersion grating as shown in that patent. The WDM has close location of the fibers about its optical axis and a holographic dispersion grating which reduces losses in the system, the essentials of which are incorporated herein as shown in FIG. 3 where d is the fiber core diameter, b is the core-core distance, $\alpha_0$ is the Littrow angle, $\Lambda_{//}$ is the grating period and f' is the focal length in medium n. (Alternatively, the medium with refractive index $\bar{n}$ can be replaced by free space. Then, only the lens remains with refractive index $\bar{n}$, and f'=f). Unlike state of the art systems in which only core diameter is critical, cladding diameter as well as core diameter is important in the present invention because cladding diameter determines the spacing of the fibers. The use of highly-efficient holographic dispersion gratings enables the multiplexing WDM to highly efficiently multiplex the three or more channels simultaneously. It should be noted that the grating may be transparent in a certain spectrum of interest to additional wavelength channels. In such a case, the optical wave of the additional channels may be focused to a fiber on the right side of the grating to pass that optical wave through the WDM unchanged. In FIG. 3, the input fiber is placed at the center, slightly below the output fibers. In alternative architecture, the input fiber can be placed with the output fibers as in FIG. 2.

The output of the WDM 50 in FIG. 2 is preferably placed on a multimode fiber having a core to cladding diameter ratio of 62.5/125, 100/140 or 200/380 standard in the industry. Each of the signals in the multimode fiber 52 comprises a separate wavelength in the fiber 52 ($\lambda_1 + \lambda_2 + \lambda_3$) so that the signals are multiplexed without interference, i.e., low cross talk, and full transparency. Completely different signals can be transmitted over the same multi-mode fiber. For instance, analog video, and digital Ethernet signals can be simultaneously transmitted on a single fiber unlike TDM systems. In other words, due to full transparency, the multimode fiber 52 allows the multiple channels space multiplexed therein to travel in the fiber and behave as if the other channels traveling in the fiber did not exist. Of course, each wavelength can, in addition, combine a number of TDM channels. In addition, coupler 54 couples the 100/140 cable and the 200/380 cable if two different fiber sizes are used (otherwise, the coupler 54 is not needed). The coupler 60 couples the 200/380 fiber to a 100/140 fiber which is then input to a demultiplexing WDDM 62 which may preferably comprise the same components as the multiplexing WDM 50 in transmitter 34.

A preferred arrangement is the use of one size fibers to keep the numerical apertures of the two fibers the same. Generally mixing fiber sizes is undesirable because it increases power budget (decreases power margin) and causes signal disturbance. These effects are due to incompatible numerical apertures (NA) (which defines the total internal reflection (TIR) angle of the fiber) which causes the non-filling of all possible TIR angles within one or both of the fibers. When a fiber whose full complement of TIR angles is not filled is bent, the signal within the fiber is disturbed. Modal partition noise due to differential attenuation of optical paths taken in the multi-mode fiber can limit the "noise" floor of the system when a coherent source such as an LD is used. Thus, it is preferred to use fibers of equal diameter, especially for analog systems.

On the other hand, in the unidirectional case, different sizes of internal WDM fibers can be used. For example, in FIG. 2, where the beam is transmitted only from the left to the right, fibers 48 can have smaller cores than simple WDM fiber 52, even if the connector 54 is not used, and fibers 52 and 50 are identical. Analogously, identical fibers 61', 61'', 61''', can have larger sizes than external WDM fiber 52. In such a case, power subject and cross-talk can be improved, but the system can be only unidirectional. In order to preserve bidirectionality, however, all fibers may preferably be identical.

Retrofit of existing systems frequently requires matching different diameter fibers, however, therefore the arrangement in FIG. 2 is apt. The WDM 62, however, instead of having three input fibers and one multiplexed output fiber instead has one multiplexed input fiber and three demultiplexed output fibers. The output of the WDM 62 is to photodetectors 64, there being one photodetector per channel or fiber. At the input of each of the photodetectors 64 is a photodetector pigtail each of which presents roughly a 1 dB loss to the system. At the detector 64, the system again becomes electrical and the output from the detector 64 is an electrical signal to the signal conditioning circuitry 66 which prepares the signal in standard manner for input into the video monitor 70 via 75-ohm BNC connectors 68. DIN connectors of course may be employed as well.

RGB, CCTV, CAD Systems

This type of system may be used for a number of applications including red-green-blue (RGB) color systems, CCTV, and computer aided design (CAD). The modulation technique for RGB video may preferably be analog whereas another preferred modulation technique for CAD is digital. The present invention is capable of handling both simultaneously as well. The number of channels that may be implemented in the system depicted in FIG. 2 may be up to six channels, based on present technology. In other words six different wavelength carriers for carrying the information from each of the respective channels may be employed. However, the improvement of wavelength-shift control of LDs, and improvement of holographic grating technology, may easily increase the potential number of wavelength channels up to 20. The bandwidth of the RGB and CCTV systems is in the range 10–30 MHz and for CAD is in the range 50–100 MB/s. Typical RGB or CCTV may be found in financial trading firms for real time market data transfer, security systems employing cameras, and information systems. CAD based systems, for example, would be used extensively in the aerospace industry and in university campuses.

Power Budget

The system described in FIG. 2 has very good power budget. The basic components contributing to loss present in the system are the laser pigtails 46 ($\approx$1 dB), photo detector pigtails 63 ($\approx$1 dB), multimode fiber 56 ($\approx$6 dB/km), and the two WDMs ($\approx$3 dB each). In this embodiment, the typical total power loss of these elements will be 10–15 dB. This yields approximately a 20–25 dB power margin. Taking into account wavelength shift, discussed in detail below, losses still remain between 17–22 dB. Additional connecting losses due to the couplers between the 100/140 and 200/380 multimode fibers are 11 dB but total power margin still remains above 10 dB which is unexpectedly high for this type of system.

Figure 4:
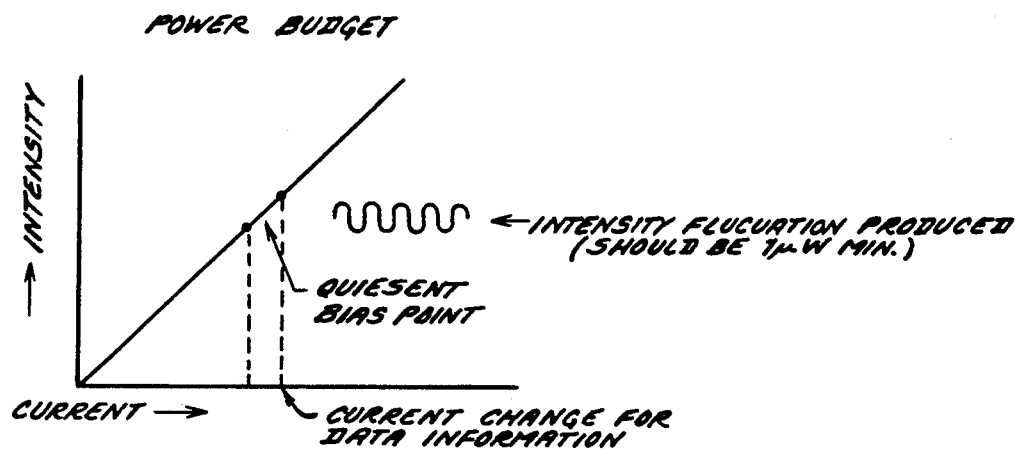
FIG. 4 is a graph depicting AC power budget.

An LD's optical intensity versus current and modulation depth, is depicted in FIG. 4. Power budget is calculated by subtracting (in dB) sensitivity of the detector from power of the source. Power margin is power budget after power losses are subtracted. But these calculations only represent DC budget while AC is of primary interest because of finite source rise times. If a source is too slow it is unable to raise system power to the maximum available. Thus, AC power budget might be less than DC budget and should be taken into account, as illustrated in FIG. 4.

Another limiting factor is dispersion. Two entirely different types of dispersion are discussed with respect to the present invention. Grating dispersion determines the WDM system's insertion loss and cross-talk according to wavelength linewidth shift. Fiber dispersion, on the other hand, limits signal speed. Light waves traveling in a multi-mode fiber travel at different angles within the fiber which causes them to travel at different speeds and thus disperse. This is called multi-mode dispersion, and is of real concern above 100 MHz, for fiber lengths of the order of a few kilometers.

Input power to the laser pigtail is approximately 2 mW, to the multiplexing fiber is 1 mW, to the multimode transmission line is 900 $\mu$W, to the demultiplexing fiber is 250 $\mu$W, to the detector pigtail is 125 $\mu$W, and to the detector is 120 $\mu$W. When calculating detected power at the photodetector, it must be realized that this is a continuous intensity and produces only a D.C. voltage, i.e., nonvarying electrical output. By using the present invention, the efficiency of the system allows the depth of modulation to be very small. The amount of detected modulation intensity is approximately 1 $\mu$W for a shot raise limited system.

Real Time Market Analysis System

Figure 5:
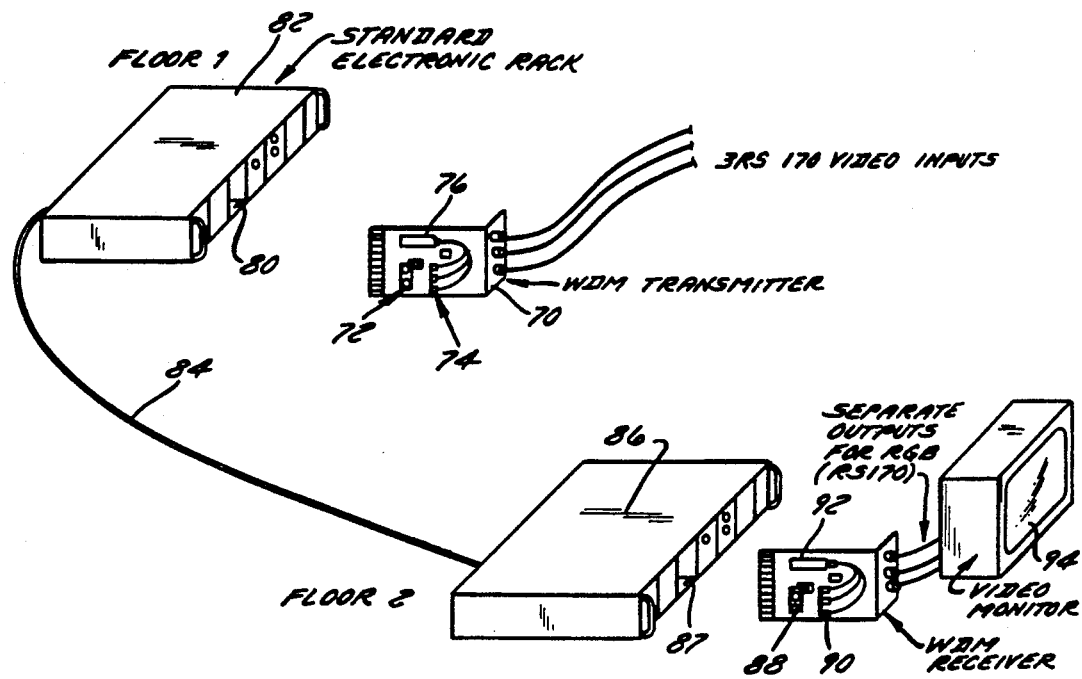
FIG. 5 is a schematic of the transmitter and receiver portions of a link in accordance with the present invention.

In use, as shown in FIG. 5, the system described may be used in a real-time market analysis operation by plugging a module 70 (an APC board which may be compatible with Europackaging standards) containing the transmitter component circuitry 72, LDs 74, and WDM 76, into slot 80 (+12 v) of standard electronics rack 82 of the trading computer electronics. The video signal is sent from the transmitter via multimode fiber 84 between potentially many floors in the trading offices and received by the receiver in rack 86 containing slot 87, electronics 88, detectors 90, and WDDM 92, converted into electrical signals and then inputted to a video monitor trading display 94. State of the art techniques send the same signal either through a TDM system which has significant transparency problems or through three fibers with obvious space and cost constraints. Of course, the video inputs and outputs of the system are standard base-band and comply with the RS170 standard.

Integrated Services Digital Network

Figure 6A:
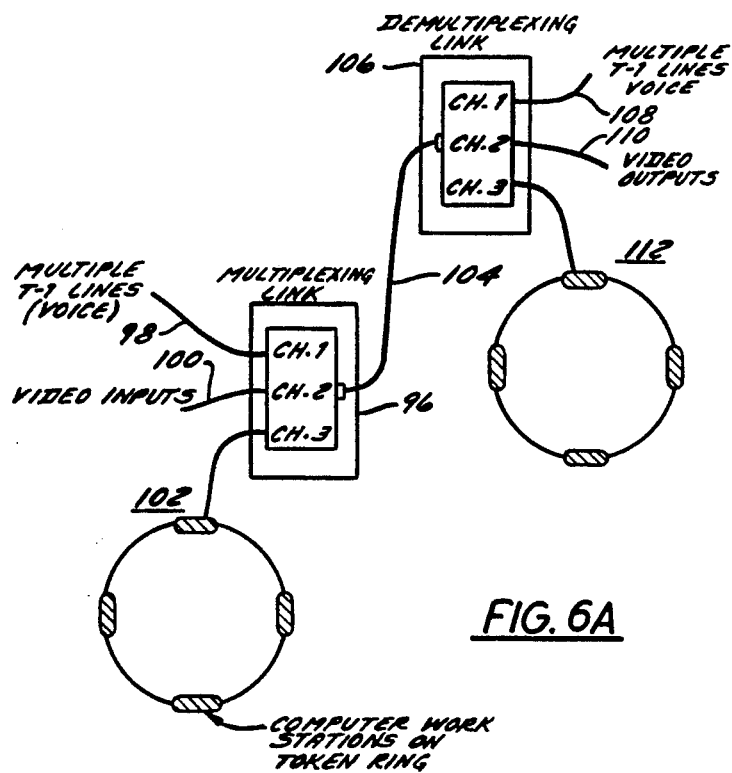
FIGS. 6A & 6B are schematics of an ISDN system and a remote work-station system in accordance with the present invention.

FIG. 6A illustrates an ISDN implementation of the present invention. The three channel system has dedicated channels for voice, video and a computer network. Multiplexing link 96 contains inputs for voice signals 98, video signals 100, and computer work stations 102 connected by, for example, token ring. The signals are fed into link 96, converted into light waves and multiplexed onto a single multimode fiber bridge 104 and fed to demultiplexing link 106. Link 106 demultiplexes the light signals and converts each to its respective electrical signal and then outputs them at output 108 for voice, 110 for video and 112 for computer networking. This WDM bridge may be redundant with a state-of-the-art single-wavelength bridge and both bridges may be connected parallely and activated alternatively by a suitable switching system.

Figure 6B:
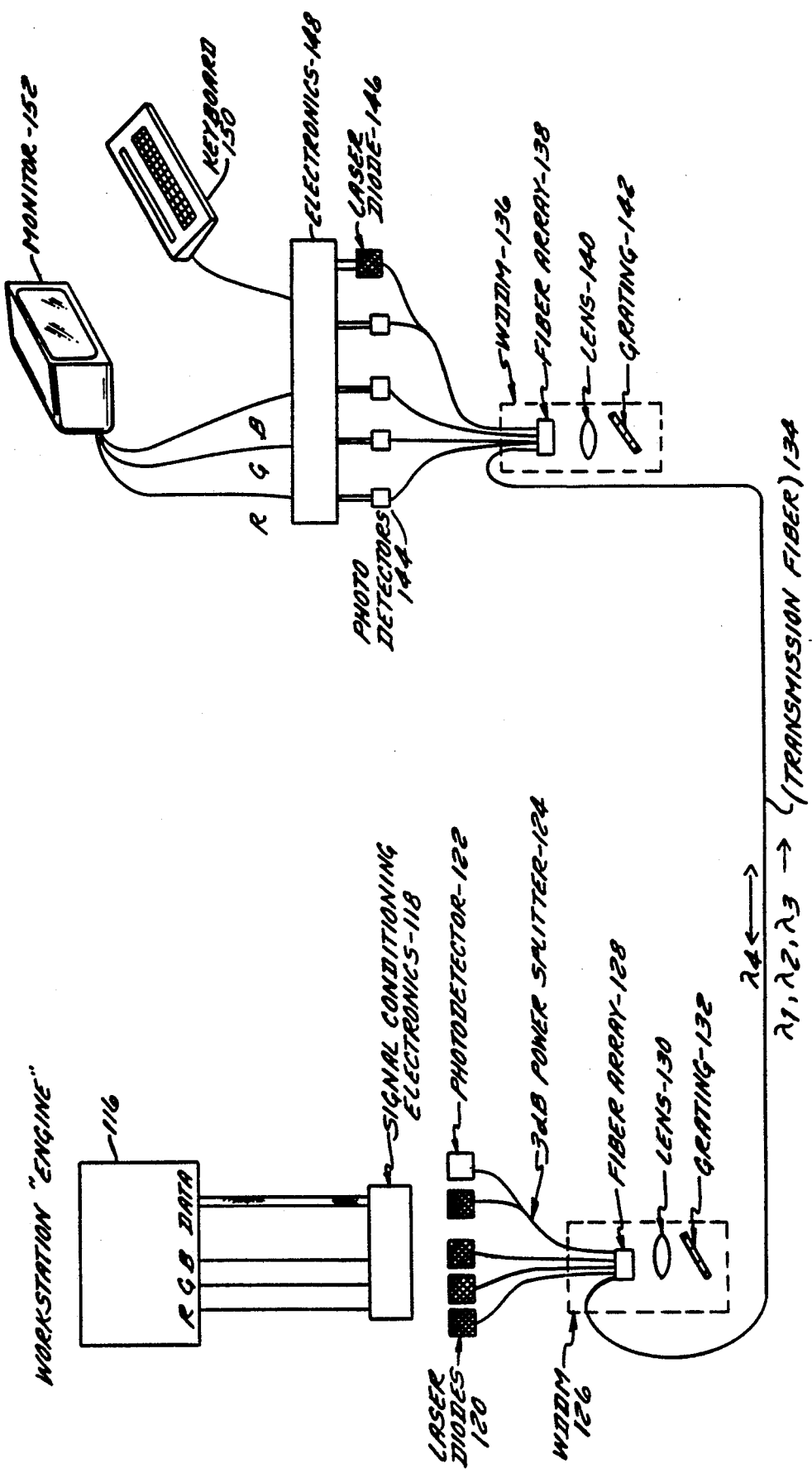
Figure 7A:
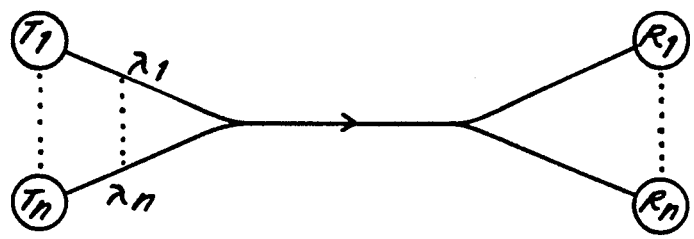
FIGS. 7A-7D are a schematic of various WDM architectures of the present invention.
Figure 7B:
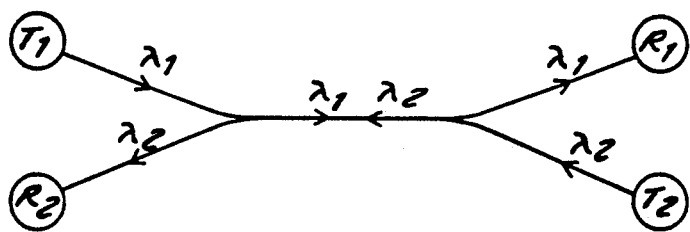
Figure 7C:
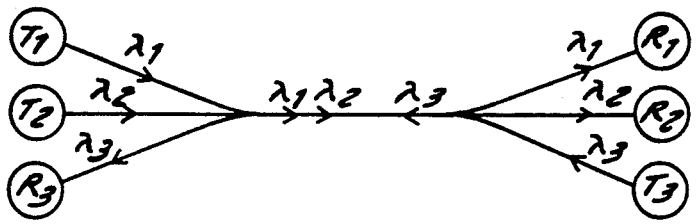
Figure 7D:
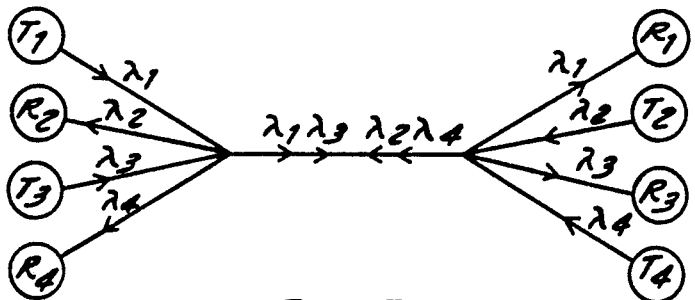

FIG. 6B shows a remote computer workstation arrangement achieved by use of the present invention. Current methods require the use of 4 fibers between the monitor/keyboard and the workstation. The system in FIG. 6B comprises workstation 116, signal conditioning electronics 118, laser diodes 120, photodetector 122, 3 dB power splitter 124, WDM 126 having fiber array 128, lens 130, and grating 132. The work station is connected via the transmission fiber 134 to a WDDM 136 having fiber array 138, lens 140 and grating 142. WDDM 136 is connected to multiple photodetectors 144 and laser diode 146 which in turn are connected to electronics 148 to which are connected keyboard 150 and monitor 152. The lines designated RGB on workstation 116 are for transmission of data from workstation 116 to the user at monitor 152 and keyboard 150. The two lines marked DATA are for bidirectional data transfer at a digital rate of 19.2 kB/s. The RGB lines are run at 35-50 MHz. By using the arrangement in FIG. 6B only one fiber is needed to place a workstation at a remote location greatly reducing costs by eliminating four fibers currently used along with their associated connectors and packaging.

It can be seen that WDM affords an additional degree of freedom in the invention. In the context of space multiplexing, WDM is competitive with current systems in the sense that fewer fibers are required but complementary in the sense that each fiber may carry more than one signal and with greater total bandwidth. In the context of TDM, the WDM link is competitive in the sense that WDM is able to handle more than one channel but complementary in that TDM can be used in a WDM system to further increase system flexibility.

Figure 8:
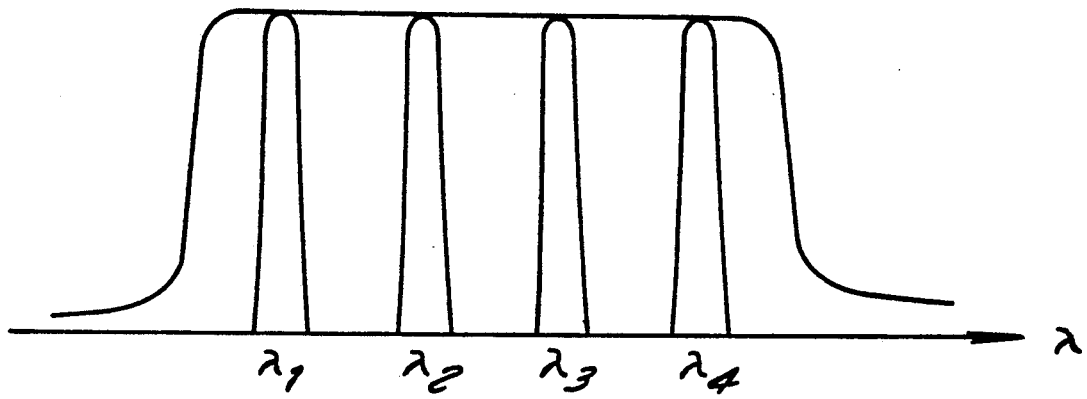
FIG. 8 is a graph plotting source linewidth, or, alternatively, wavelength shifts, versus grating spectral characteristics.

Contrary to a TDM system which requires high speed sources, high speed detectors, and different signals of different channels to be electrically multiplexed, thereby making full transparency unachievable, the present invention can transfer 2-6 channels of information, comprising both analog and digital signals with nearly full transparency. A number of different formats may be employed for 2-6 channel operation, or more if the state of the art of light sources improves. As shown in FIGS. 7A-D the present invention can be employed as a 2-6 channel unidirectional system (FIG. 7A), where T is a transmitter, R denotes its receiver, and $\lambda_n$ the wavelength of each, a 2 channel bidirectional system (FIG. 7B), a 3 channel bidirectional system (FIG. 7C) and a 4 channel bidirectional system (7D) as well as other combinations of these architectures. This flexibility of design and implementation is due to the physical independence of different channels in the present invention due to the different wavelengths that are used to transfer the information ($\lambda_n$) and the highly efficient manipulation of those light signals by the reflection WDM grating having broad uniform wavelength characteristics, and a WDM system based on paraxial optics transmission geometry. FIG. 8 depicts wavelength separation of $\lambda_1-\lambda_4$ in FIG. 7D for instance. Wavelength separation between channels traveling in the same direction must typically be greater than that for two channels traveling in opposite directions to avoid cross-talk. Low cost and standard fiber optic and light source components such as CD LDs and standard multimode fibers may be used.

Tolerance to Wavelength Shift and Optimization

Figure 9:
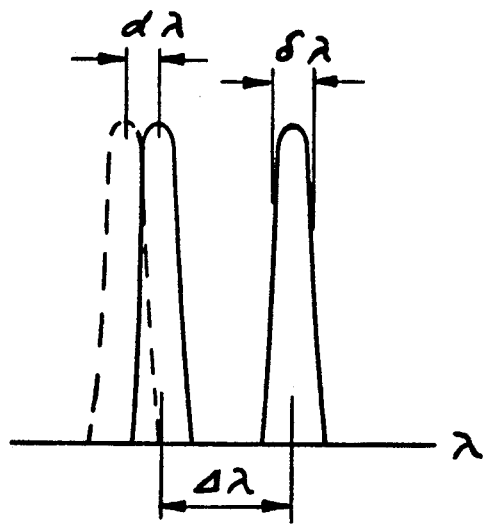
FIG. 9 is a graph plotting source wavelength shift, $d\lambda$, linewidth $\delta\lambda$ and wavelength separation $\Delta\lambda$.

In order to better understand the merits of the combination of the present invention and the invention's tolerance to loss of WDM optical efficiency due to wavelength shift of LDs, the trade off between optical losses and cross-talk is discussed. In FIG. 9, wavelength shift $d\lambda$, source linewidth $\delta\lambda$, and wavelength separation $\Delta\lambda$ are depicted. $\Delta\lambda$ is the separation between the center Wavelengths of the LDs (or ELEDs), $\delta\lambda$ is the width of the spectrum of a LD or ELED, and is typically greater for LEDs than for LDs, which typically necessitate a greater $\Delta\lambda$ for LED systems (and will be assumed to be zero for the LD case here). $d\lambda$ is the variation in the center wavelength of the LD or LED and is typically greater for LDs than for LEDs or ELEDs (and will be assumed to be zero for the ELED case below). Subsequently, the adverse effects on performance in the case of ELEDs, due to a non zero $\delta\lambda$ (line width) is discussed where $d\lambda$ (shift) is ignored because LEDs have little wavelength shift. For complete and accurate analysis one may assume that both $\delta\lambda$ and $d\lambda$ are non-zero in the same model even though they are secondary effects. For sake of analytic clarity of evaluation, that is not done here.

There are a number of factors creating LD wavelength shift. Each of these is discussed in detail because they are critical to wavelength sensitive fiber optic WDM systems. For sake of simplicity it is assumed here that the LDs are almost single longitudinal mode, that is, typical 1-3 nm LD linewidths are ignored, i.e. $\delta\lambda=0$. Furthermore, a 2 dB WDM loss (for zero wavelength shift) is assumed and only for a WDM employing a volume holographic grating with high (greater than 90%) diffraction efficiency within the spectrum of interest. In other cases, this loss will be higher (say, 5 dB) but what is essential is the substantial uniformity of the grating's wavelength characteristics in the spectrum of interest. The assumption that the LD is single mode is proper even though an LD linewidth can be 1 nm or slightly more since a number of longitudinal modes are excited. In the background discussion above, wavelength shift was assumed to be zero as in the article, B. Moslehi, et al., "Fiber Optic Wavelength Division Multiplexing Using Volume Holographic Gratings," 14 Optics Lett. 1088 (1989) incorporated by reference herein. For wavelength sensitive information transfer, however, such as in RGB or other video, it is necessary to consider a non-zero $d\lambda$. The link of the present invention is able to minimize the effects of wavelength shift thus offering unexpectedly high performance even in the presence of a shifting wavelength source.

Thus, we assume for now that $\delta\lambda=0$ and we proceed to define the wavelength shift parameter:

$$k = \frac{d\lambda}{\Delta\lambda} \qquad \text{(Eq. 1)}$$

Then, the optical efficiency loss due to wavelength shift is $$\zeta_D = 1 - \frac{b \cdot k}{d}, \text{ for } k \leq \frac{d}{b}, \qquad \text{(Eq. 2)}$$

and $\zeta_D=0$, otherwise; or, in decimal logarithmic units, $$L_D = -10 \log_{10} \zeta_D \, [dB] \qquad \text{(Eq. 3)}.$$

Equation 2 has been derived based on a 1 dimensional model. For more precise calculations, however, this formula should be replaced by the following exact formula, based on the 2D model (see, for example, J. W. Goodman, Introduction to Fourier Optics, McGrew-Hill, 1975; Section 3):

$$\zeta_D = \frac{2}{\pi}\left[\arccos\left(\frac{k}{k_o}\right) - \frac{k}{k_o}\sqrt{1-\left(\frac{k}{k_o}\right)^2}\right], \text{ for } k \leq k_o, \qquad \text{(Eq. 3A)}$$

and $\zeta_D=0$, otherwise; where $k_o=d/b$.

Assuming that the fibers are packed closely together, b is also the cladding diameter. It can be seen that both core and cladding diameters are critical. This is because the jacket of the fiber is preferably stripped to allow the fibers to be placed together as closely as possible to achieve paraxiality and minimize dispersion loss. Thus the cladding diameter is the determinative factor with respect to paraxiality and dispersion loss.

For typical fibers, the core/cladding ratio is: 50/125μ, 62.5/125 and 100/140, 200/380. Thus, usually, $$\frac{b}{d} \approx 2. \quad \text{(Eq. 4)}$$

Eq. 2 then takes the form $$\zeta_D = 1 - 2k \quad \text{(Eq. 5)}.$$

Figure 10:
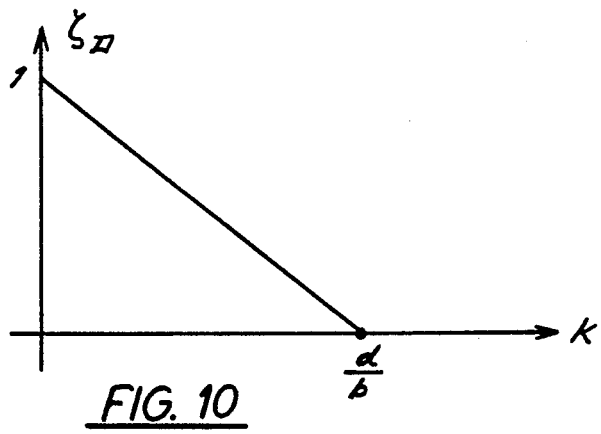
FIG. 10 is a graph plotting efficiency $\zeta$ versus k.
Figure 11:
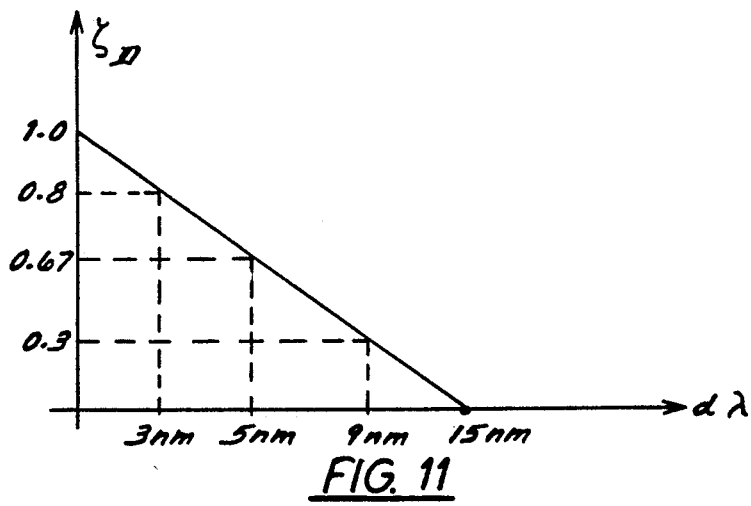
FIG. 11 is a graph plotting efficiency, $\zeta$ versus $d\lambda$.
Figure 12A:
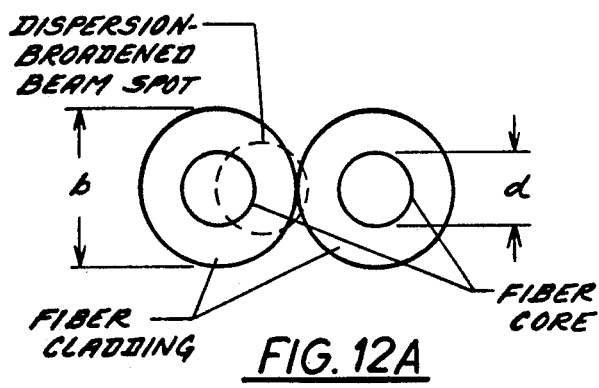
FIGS. 12A and 12B depict fiber light spot misalignment.
Figure 12B:
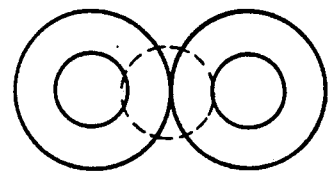

Eq. 2 is illustrated in FIG. 10, while Eq. 5, for $\Delta\lambda=30$ nm, is illustrated in FIG. 11. FIGS. 10 and 11 depict the total loss of the optical signal for $d\lambda \leq 15$ nm due to misalignment of the signal beam and the output fiber as shown in FIGS. 12A and FIG. 12A shows partial misalignment ($\zeta_D>0$) and FIG. 12B shows total misalignment ($\zeta_D=0$). The results are also illustrated in Table 1 for $$\frac{b}{d} = 2, \zeta_D = 1 - 2k, \Delta\lambda = 30 \text{ nm,}$$

$$k = \frac{d\lambda}{\Delta\lambda}, L_D[\text{dB}] = -10 \log_{10}\zeta_D.$$

| dλ | 1 nm | 2 nm | 3 nm | 4 nm | 5 nm | 6 nm | 7 nm | 8 nm | 9 nm | 10 nm |
|---|---|---|---|---|---|---|---|---|---|---|
| k | 0.03 | 0.06 | 0.1 | 0.13 | 0.15 | 0.2 | 0.23 | 0.27 | 0.3 | 0.33 |
| ξ | 93% | 86% | 80% | 73% | 67% | 60% | 53% | 47% | 40% | 33% |
| $L_D$ [dB] | 0.3 | 0.65 | 1.0 | 1.36 | 1.73 | 2.2 | 2.75 | 3.27 | 4.0 | 4.8 |
| $L_T$ [dB] | 2.3 | 2.65 | 3.0 | 3.36 | 3.73 | 4.2 | 4.75 | 5.27 | 6.0 | 6.8 |

The total loss, $L_T$ is calculated from the formula:

$$L_T = L_D + 2 \text{ dB} \quad \text{(Eq. 6)}$$

where 2 dB represents a rough estimation of additional losses such as Fresnel loss, aberration loss, diffraction inefficiencies, etc.

Figure 13:
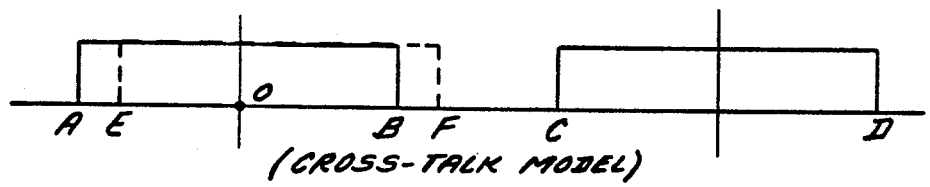
FIG. 13 illustrates a rectangular ID model for cross-talk calculation.

Formulation and discussion of a model of cross-talk is necessary to fully analyze the merits of the claimed data link. Using the 1D rectangular model as shown in FIG. 13 we have $$g = \frac{OF}{OC} = \frac{\delta\beta_\lambda + \frac{\delta a}{2}}{\Delta\beta - \frac{\delta a}{2}} = \frac{\frac{b \cdot k}{f} + \frac{d}{2f}}{\frac{b}{f} - \frac{d}{2f}} = \quad \text{(Eq. 7)}$$

$$\frac{bk + \frac{d}{2}}{b - \frac{d}{2}}.$$

To avoid cross-talk then it is necessary that $$g \leq 1 \quad \text{(Eq. 8)}.$$

Rewriting Eq. 7 in the form $$g = \frac{k + \frac{d}{2b}}{1 - \frac{d}{2b}} \quad \text{(Eq. 9)}$$

and setting $g=1$, we obtain $$\left(\frac{b}{d}\right)_c = \frac{1}{1-k}. \quad \text{(Eq. 10)}$$

And, to avoid cross talk, $$\frac{b}{d} > \left(\frac{b}{d}\right)_c. \quad \text{(Eq. 11)}$$

The minimum loss, $L_D$ min. occurs for $b/d=(b/d)_c$. Then, cross talk is at the edge of acceptability, and $$\zeta_{Dmax} = 1 - \left(\frac{b}{d}\right)_c \cdot k = 1 - \frac{k}{1-k} = \frac{1-2k}{1-k}. \quad \text{(Eq. 12)}$$

Equation 12 is illustrated in Table 2 set out here.

TABLE 2

| Δλ | 30 nm | 30 nm | 30 nm | 30 nm | 30 nm | 30 nm | 30 nm | 30 nm | 30 nm | 30 nm |
|---|---|---|---|---|---|---|---|---|---|---|
| dλ | 1 nm | 2 nm | 3 nm | 4 nm | 5 nm | 6 nm | 7 nm | 8 nm | 9 nm | 10 nm |
| k | 0.03 | 0.06 | 0.1 | 0.13 | 0.15 | 0.2 | 0.23 | 0.27 | 0.3 | 0.33 |
| $\left(\frac{b}{d}\right)_c$ | 1.03 | 1.06 | 1.11 | 1.15 | 1.18 | 1.25 | 1.3 | 1.4 | 1.43 | 1.5 |
| ($\zeta_D$)min | 97% | 94% | 88% | 85% | 82% | 75% | 70% | 62% | 57% | 50% |
| ($L_D$)min [dB] | 0.1 | 0.2 | 0.5 | 0.7 | 0.86 | .12 | 1.5 | 2.0 | 2.4 | 3.0 |
| ($L_T$)min [dB] | 2.1 | 2.2 | 2.5 | 2.7 | 2.86 | 3.2 | 3.5 | 4.0 | 4.4 | 5.0 |

From Table 2 it can be seen that the minimum loss, ($L_D$)min, is quite low, and total loss, ($L_T$)min, is lower than 5 dB, even for wavelength shift of $d\lambda=10$ nm. Now, comparing four fibers of the present invention from the point of view of Eq. 10, and assuming that $$\frac{b}{d} = \left(\frac{b}{d}\right)_c \quad \text{(Eq. 13)}$$

we find the critical $k_c$ value from the relation $$\left(\frac{b}{d}\right)_c = \frac{1}{1-k} \rightarrow k_c = 1 - \left(\frac{d}{b}\right)_c \quad \text{(Eq. 14)}$$

and $$(d\lambda)_c = k_c \cdot \Delta\lambda \quad \text{(Eq. 15)}.$$

It can be seen that for $$(d\lambda) < (d\lambda)_c \quad \text{(Eq. 16)}$$

cross talk can be ignored. $(L_D)_c$ and $(L_T)_c$ for $(d\lambda) = (d\lambda)_c$ can be calculated and illustrated as in Table 3 below.

TABLE 3

| Fibers | $\frac{d}{b}$ [µm] | $\frac{b}{d}$ | k | (dλ) | $\zeta_D$ | $L_D$ |
|---|---|---|---|---|---|---|
| A | 200/380 | 1.9 | 0.47 | 14.1 nm | 10% | 10 dB |
| B | 62.5/125 | 2 | 0.5 | 15 nm | N/A | ∞ |
| C | 50/125 | 2.5 | 0.6 | 18 nm | N/A | ∞ |
| D | 100/140 | 1.4 | 0.28 | 8.4 nm | 60% | 2.2 dB |

From Table 3 it can be seen that for fibers 62.5/125 and 50/125, cross-talk is not a limitation and very high wavelength shifts (greater than 10 nm) can be tolerated assuming that loss is acceptable. For 200/380 fiber, however, wavelength shift must be less than 14 nm in order to avoid significant cross talk, and for 100/140 fiber, wavelength shift must be less than 8 nm in order to avoid cross talk. In summary, for 200/380 fiber and for $d\lambda = 14$ nm, $L_D = 10$ dB and $L_T = 12$ dB without cross talk. For 100/140 fiber and for $d\lambda = 8$ nm, $L_D = 2$ dB and $L_T = 4$ dB. It can be seen from the above that the multiwavelength data communication link of the present invention can achieve high $\zeta_D$ and low cross-talk even for high wavelength shifts assuming the optimized b/d ratio, close to $(b/d)_c$, given in Tables 2 and 3 is followed.

For a given wavelength shift, the b/d ratio should be slightly higher than the $(b/d)_c$ ratio and therefore the fiber parameters may be adjusted for wavelength shift. This is illustrated by Eq. 16. For a given k (i.e., wavelength separation, $\Delta\lambda$, and wavelength shift, $d\lambda$), the critical geometric ratio of the fiber parameters $(d/b)_c$ can be found and from these parameters the $k_c$ parameter can be found. Using the value of the $k_c$ parameter and $\Delta\lambda$ the critical $(d\lambda)_c$ can be found. According to Eq. 16, if wavelength shift is smaller than $(d\lambda)_c$ significant cross-talk can be avoided.

For example, referring again to Table 2, for $\Delta\lambda = 30$ nm and $d\lambda = 8$ nm, $k = 0.27$ and $(b/d)_c = 1.4$. It then follows that for any fibers with $b/d > (b/d)_c$, and for $d\lambda \leq 8$ nm cross-talk is avoided. If the fiber of interest has the required critical parameters, then its loss will be minimal ($L_D\text{min} = 2.4$ dB, and $L_T\text{min} = 4.4$ dB) and significant cross-talk may still be avoided even for wavelength shift as high as $d\lambda = 8$ nm.

Figure 14:
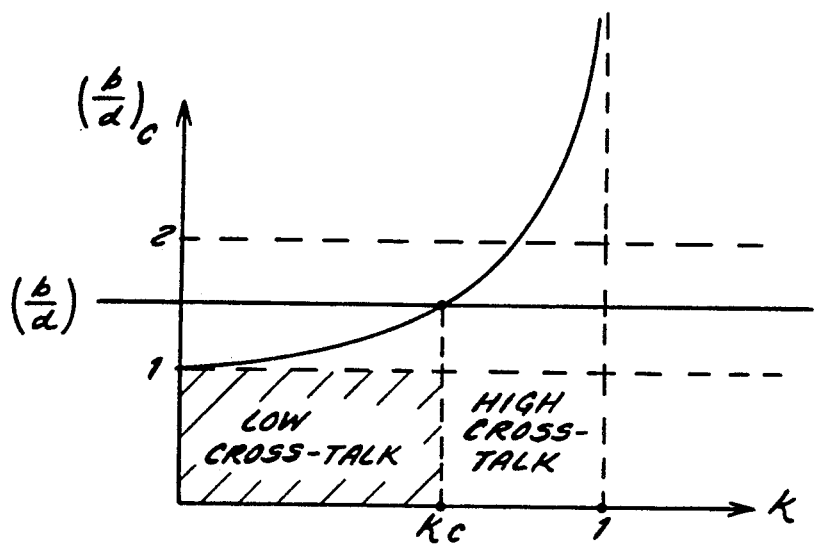
FIG. 14 illustrates cross-talk optimization, according to Eq. 14.

Eq. 14 has been illustrated in FIG. 14. It is seen that the actual fiber value of b/d determines $k_c$ and that for $k < k_c$ we have low cross-talk, while for $k > k_c$ cross-talk is high. $k = k_c$ is the optimum case from the point of view of minimization of cross-talk and insertion loss due to wavelength shift, and misalignment.

Using Eq. 12, we obtain $$k = k_o = \frac{1 - \zeta_D}{2 - \zeta_D}. \quad \text{(Eq. 17)}$$

Figure 15:
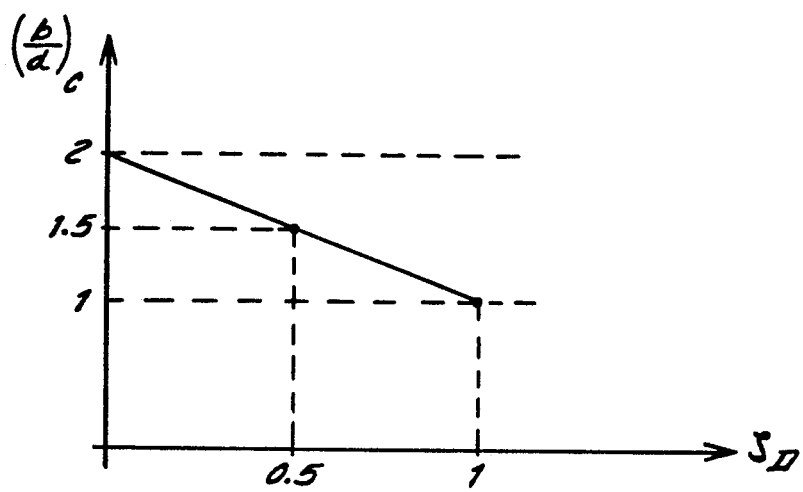
FIG. 15 illustrates cross-talk optimization, according to Eq. 18.

This equation allows calculation of acceptable wavelength shift, for predetermined insertion loss. For example, for $\zeta_D = 0.5$, and $L_D = 3$ dB (equivalent to $L_T = 5$ dB, according to Eq. 6), we obtain $k_o = 0.33$, which, for $\Delta\lambda = 30$ nm, gives $(\delta\lambda)_o = k_o \Delta\lambda = 10$ nm. On the other hand, combining Eqs. 10, and 17, We obtain $$\left(\frac{b}{d}\right)_c = 2 - \zeta_D \quad \text{(Eq. 18)}$$

illustrated in FIG. 15. It is seen that, for $\zeta_D = 0.5$ (and $L_D = 3$ dB), $(b/d)_c = 1.5$. It should be emphasized that these results are only approximate because the 1 D rectangular cross-talk model, illustrated in FIG. 13 is used.

The following example illustrates the optimization principle, discussed above. Assuming, that WDM dispersion loss of 3 dB is acceptable, the fiber should have b/d ratio of 1.5, close to that of 100/140µ - fiber (see Table 3). If, however, the actual fiber will have b/d = 2, such as 62.5/125 fiber, the dispersion loss will be higher, since $L_D = 5$ dB. This optimization principle is illustrated in Table 4, where optimized valued of $L_D$, k, $(d\lambda)$, and $(b/d)_c$, are compared in a modified version of Table 2.

TABLE 4

| Δλ | 30 nm | 30 nm | 30 nm | 30 nm | 30 nm | 30 nm | 30 nm |
|---|---|---|---|---|---|---|---|
| $\zeta_D$ | 0.8 | 0.7 | 0.6 | 0.5 | 0.4 | 0.3 | 0.2 |
| $L_D$ | 1 dB | 1.5 dB | 2.2 dB | 3 dB | 4 dB | 5 dB | 7 dB |
| k | 0.17 | 0.23 | 0.28 | 0.33 | 0.37 | 0.41 | 0.44 |
| (dλ) | 5 nm | 7 nm | 9 nm | 10 nm | 11 nm | 12 nm | 13 nm |
| $\left(\frac{b}{d}\right)_c$ | 1.2 | 1.3 | 1.4 | 1.5 | 1.6 | 1.7 | 1.8 |

According to Table 4, we can either adjust the fiber's b/d ratio, to a predetermined maximum wavelength shift, or select acceptable wavelength shift for the actual fiber. For example, for 100/140 fiber, we have b/d = 1.4, and according to Table 4, the maximum wavelength-shift, in order to minimize dispersion loss, is 8.6 nm, for $L_D = 2.2$ dB, and $L_T = 4.2$ dB. Of course, the optimum b/d - ratio, can always be adjusted either by removing part of the cladding (if $b/d > (b/d)_c$), or using spacer elements if $b/d < (b/d)_c$.

The presented optimization procedure determines the optimum WDM design, according to given LDs and system geometrical tolerance, defined by maximum wavelength shift, $d\lambda_o$, and optimum fiber b/d - ratio, defined by $(b/d)_c$, according to Tables 1-4, and Eqs. 1-18. Since, the WDM grating and WDM lens are also optimized, this procedure optimizes all basic components of the WDM system, from the point of view of dispersion loss and cross-talk minimization.

Eqs. 10, 17, and 18 are the basis for an optimization formula that allows for the minimization of loss, $L_D$, for a given wavelength shift. The multiwavelength data communication link of the present invention may preferably be designed according to the following:

1. Assuming that the system has wavelength shift not larger than $d\lambda = d\lambda_c$, the coefficient $k = k_o$ is calculated for a given $d\lambda$;
2. Using Eq. 10 the optimum fiber geometry $(b/d)_c$ is found. Then, for $b/d = (b/d)_c$, the system will have the minimum loss $(L_D)$min within wavelength shifts $d\lambda \leq d\lambda_c$ still preserving low cross talk;
3. If $b/d > (b/d)_c$, then the system has higher than minimum loss $(L_D) > (L_D)$min, within wavelength shifts $d\lambda \leq d\lambda_c$.

Of course, wavelength shift cannot be totally eliminated because it is caused by many changing factors such as temperature, aging, fiber geometry tolerance, current modulation, source pigtailing feedback, and many others. The above optimization, however, may minimize wavelength shift in the system of the present invention providing unexpected superior performance. Furthermore the condition $d\lambda = 0$ occurs where the optimum alignment of the fiber array, lens, and grating are in paraxial alignment as shown in FIG. 3 and, in a preferred embodiment, as shown in U.S. Pat. No. 4,926,412 and the reference B. Moslehi, et al., Optics Letters, 14, 1088 (1989). The multiwavelength data communication link of the present invention is able to minimize the effects of wavelength shift because of the particular combination of mature CD LD technology, within the single transmission window 750 nm to 850 nm, the use of standard multimode fibers, and the paraxial structure of the WDM including the fiber grouping, lens, and grating, be it holographic, including nonuniform volume holographic gratings, or a photoresist grating. It should be noted that the optimization procedure, determined by Eqs. 1–18, is independent of absolute LD wavelength values.

Single Mode Fibers and DFB Lasers

Equations 1–18 can also be used to analyze single-mode fiber applications. Typical cladding/core ratios for single mode fibers, however, are rather high. For example, for $9/125\mu$-single-mode fiber, $$\frac{b}{d} = \frac{125}{9} \approx 14 \quad \text{(Eq. 19)}$$

Equation 2 thus takes the form $$\zeta_D = 1 - 14k \quad \text{(Eq. 20)}$$

and only small k-values are acceptable to avoid high insertion loss. Fortunately, DFB (distributed feedback) lasers, typically used in single mode applications, have highly stable wavelengths; thus, DFB k-ratios may be very low, even for small wavelength channel separation, $\Delta\lambda$. For example, for a DFB wavelength stability of 1 GHz, $d\lambda \approx 0.05$ Å, and for $\Delta\lambda = 1$ nm, $k = 0.005$. Using Eq. 20, we obtain $\zeta_D = 0.93$, and $L_D = 3$ dB. In such a case, cross-talk is no problem, since, according to Eq. 14, $b/d >> (b/d)_c$. Of course, if a part of the cladding is removed, then $b/d < 14$, and Eq. 19 should be modified accordingly.

Of much more serious concern is fiber array tolerance. Eq. 2 may be generalized to the form, $$\zeta_D = 1 - \frac{b}{d}(k_\lambda + k_x) = 1 - \frac{b}{d}k \quad \text{(Eq. 21)}$$

where $k_\lambda$ represents wavelength shift (in Eq. 2, $k = k_\lambda$), and $K_x$ represents the fiber array geometrical tolerance in the form $$k_x = \frac{dx}{b} \quad \text{(Eq. 22)}$$

where dx is the fiber core center misalignment versus the ideal x-location. Setting $k_x = k_\lambda$, we can find the equivalent optical frequency and wavelength shifts, illustrated in Table 5, for $\Delta\lambda = 1$ nm, and $b = 125\mu$.

TABLE 5

| dv | 1 GHz | 2 GHz | 3 GHz | 5 GHz | 8 GHz | 10 GHz |
|---|---|---|---|---|---|---|
| dλ | 0.05 Å | 0.1 Å | 0.15 Å | 0.25 Å | 0.4 Å | 0.5 Å |
| dx | 0.6μ | 1.2μ | 1.8μ | 3μ | 4.8μ | 6μ |

According to Table 5, fiber misalignment is usually the dominating factor for typical DFB lasers; thus, $$\zeta_D \approx 1 - \frac{b}{d}k_x \quad \text{(Eq. 23)}$$

For example, for $9/125\mu$ fiber $b/d \approx 14$, and $d_x = 2\mu$, $k_x = 0.016$, and, according to Eq. 23, $\zeta_D = 0.78$, or $L_D = 1.1$ dB. Therefore, using the design of the present invention, the single-mode WDM link is achievable but only using DFB lasers and few-micron fiber-array tolerance and present day technology. Another way to minimize $k_x$ would be to tune the DFB lasers' wavelengths; then wavelength separation would be non-uniformly distributed.

The other fundamental advantages of the present invention for single-mode fiber WDM is that by using Littrow volume holographic gratings, the angle between diffracted and incident beams is close to 180°. Therefore, according to the theory of volume holograms (see H. Kogelnik, Bell Syst. Tech. J. 48, 2909 (1969), the coupling constants, $\nu$, for both polarizations, TE and TM are identical:

$$\nu_{TE} = \nu_{TM} \quad \text{(Eq. 24)}$$

and the WDM system is polarization-insensitive. Therefore, using parallel-oriented polarization-preserving single-mode fibers, and Eq. 24, the single-mode WDM system of the present invention preserves polarization.

Still another advantage of the single-mode WDM system of the present invention is the fact that Littrow volume holographic gratings have uniform wavelength characteristics within a very broad spectrum (>100 nm). Therefore, assuming $\Delta\lambda = 1$ nm, large numbers of wavelength channels, N may be employed. However, assuming $N = 20$, and $b = 125\mu$, we obtain the size of the fiber array: $N \cdot b = 2.5$ mm, and in order to preserve the paraxiality condition, the focal length of the WDM system, f, should satisfy the following relation.

$$f >> (N-1)b \quad \text{(Eq. 25)}$$

Therefore, the sizes of the WDM system (both single-mode and multi-mode) are determined by the number of channels. Of course, the maximum number of wavelength channels is also limited by the acceptable signal dispersion developed under long-length fiber propagation. For example, if single-mode fiber dispersion is 2 psec/1 nm·1 km, and the number of wavelength channels is N=20, for fiber length L=20 km; then to achieve channel separation of $\Delta\lambda=1$ nm, we obtain a total signal dispersion of 800 psec. This dispersion can be reduced by half if we replace $\Delta\lambda=1$ nm, by $\Delta\lambda=0.5$ nm. But then, according to Eq. 21, insertion loss doubles.

Therefore there is trade-off between the number of channels, N, wavelength separation, $\Delta\lambda$, signal dispersion, and system size. The optimum design may achieve a balanced trade-off among system requirements, say, maximum insertion loss of 3 dB, and maximum signal dispersion of 1 nsec for 20 km - fiber length, which in turn determines the maximum acceptable number of channels in the system. In summary, Eqs. 1-25 permit optimization of a WDM system design including: (1) fiber tolerance, dx; (2) DFB laser wavelength tolerance, $d\lambda$; (3) wavelength separation, $\Delta\lambda$; (4) number of wavelength channels, N; (5) insertion loss, $\zeta_D$, $L_D$, $L_T$; (6) cross-talk, determined by $(b/d)_c$, (7) fiber length, L; and (8) signal dispersion, and fiber cladding/core ratio, b/d, etc.

As an example of such a global design, we analyze below each aspect of a fiber-optic WDM link design including: fiber geometry, WDM, light sources, detectors, and signal parameters for digital processing. The power budget calculation is very simple and straightforward for LD single-mode fiber optics. Assuming a single-mode fiber (9/125 μm) with 0.5 dB/km fiber loss, and 35 dB-power budget, we obtain, for typical 3 mw-LD, and typical coupling and WDM (2 dB) losses, an excellent power margin of about 15 dB for 20 km-link. Signal dispersion, q, can be calculated from the following formula $$q = \rho \Delta\lambda (N-1) L \leq q_o \quad \text{(Eq. 26)}$$

where $\rho$ is signal dispersion per 1 nm and unit length, and $q_o$ is maximum acceptable signal dispersion. For example, for $\rho=2$ psec/1 nm·1 km, $\Delta\lambda=1$ nm, N=20, and L=20 km, we obtain q=760 psec and the condition of $q_o=1$ nsec, which is the maximum acceptable rise time, is satisfied. However, assuming $q_o=500$ psec, we would need to decrease $\Delta\lambda$; for $\rho$, N, L=constant. This, however, would increase WDM insertion loss, $L_D$, and cross-talk, C, according to Eqs. 20 and 21.

In addition, $\Delta\lambda$, also determines WDM geometry, according to the basic formula $$b = f \Delta\beta = f K_\lambda \cdot \Delta\lambda \quad \text{(Eq. 27)}$$

Since, in this equation, b is fixed by fiber geometry (here b=125 μm) assuming no-space between fibers, the only variables are the factors of the following product:

$$f K_\lambda = \text{constant} \quad \text{(Eq. 28)}.$$

The focal length of the lens, f, however, cannot be too small because the paraxial condition of Eq. 25 must be satisfied. For example, for N=20 and b=125μ, we obtain $$b(N-1) = 2.4 \text{ mm} \quad \text{(Eq. 29)}$$

in order to satisfy the paraxial condition, $$f > 3 \text{ cm} \quad \text{(Eq. 30)}.$$

The minimum lens diameter, D, is related to f, by the well-known formula, $$f\# = \frac{f}{D} = \frac{1}{2NA} \quad \text{(Eq. 31)}$$

where NA is the fiber numerical aperture and f# is the f-ratio. For NA=0.2 and f=3 cm, we obtain D=1.2 cm. Thus, the total WDM sizes, (2f, D, D) are approximately $$(2f, D, D)_1 = (6 \text{ cm}, 1.2 \text{ cm}, 1.2 \text{ cm}) \quad \text{(Eq. 32)}.$$

Using Eq. 27 for b=125μ, f=3 cm, and $\Delta\lambda=1$ nm, we obtain $K_\lambda = 4.1\mu^{-1}$. Assuming $\lambda_L=1300$ nm, and using Eq. 44, $\alpha=77°$ is obtained. In order to decrease this angle, $K_\lambda$ must be decreased which increases f because, according to Eq. 28, the product $f \cdot K_\lambda$ should remain constant. For example, by increasing f three times, we obtain f=9 cm and instead of Eq. 32 we have $$(2f, D, D)_2 = (18 \text{ cm}, 3.6 \text{ cm}, 3.6 \text{ cm}). \quad \text{(Eq. 33)}$$

This is still acceptable from a practical point of view (it should be remembered that we consider here a very large number of wavelength channels, N=2D). Then, from $K_\lambda = 1.36\mu^{-1}$ and from Eq. 44, $\alpha=46°$.

Also from Eq. 43, $1/\Lambda_{||} = 1000$ 1/mm, and from $\Lambda = \lambda_L / 2n$, we obtain $\Lambda = 0.42\mu m$, for n=1.55 (for DCG). In a single-window system, the grating O.D can be low (e.g., O.D=1.5); but if the system has two windows (some wavelengths are transmitted through the WDM) the grating O.D must be high in order to preserve low cross-talk, C, according to Eq. 81, below). For example, for C=−50 dB, O.D=5.0. The grating transmission, T, for the remaining part of the spectrum should be high, say, T>90% (0.5 dB-loss).

Using Table 5 and assuming DFB-laser sources with moderate frequency control, $d\nu=2$ GHz, we obtain $d\lambda=0.1$ Å and $k_\lambda=0.01$, and assuming fiber tolerance $d_x=3\mu$, we obtain $k_x=0.025$; thus $k=k_\lambda+k_x=0.035$, and from Eq. 31, $$\zeta_D = 1 - 14 \cdot 0.035 = 0.5 \quad \text{(Eq. 34)}$$

i.e., $L_D=3$ dB and $L_T=5$ dB. Also, from Eq. 14 $(b/d)_c = 1.03$; and $$\frac{b}{d} \gg \left(\frac{b}{d}\right)_c \quad \text{(Eq. 35)}$$

since the actual (b/d)=14. Therefore, system cross-talk is extremely low (<−50 dB); and thus, BER<$10^{-12}$ and signal data rate, $B_o$, also can be high (>1 Gbit/sec per channel). Thus, the aggregate system data rate, $B_T$, can be extremely high, $$B_T = N \cdot B_o = 20 \cdot 1 \text{ Gbit/sec} = 20 \text{ Gbit/sec} \quad \text{(Eq. 36)}.$$

All of this data has been summarized in Table 6 for a single-mode 21-channel WDM link. For simplicity, the data has been categorized within the following classes: fiber (F), WDM, light source (S), grating (G), lens (L), signal dispersion (D), and general link parameters (L-P).

TABLE 6

| No. | Parameter | Symbol | Category | Value |
|---|---|---|---|---|
| 1 | Fiber Core Diameter (Single-Mode) | d | F | 9 μm |
| 2 | Fiber Cladding Diameter | b | F | 125μ |
| 3 | Source Power (DFB Laser) | $P_i$ | S | 3 mw |
| 4 | Power Budget | | L-P | 35 dB |
| 5 | Fiber Loss | | F | 0.5 dB/km |
| 6 | Link Length | L | F | 20 km |
| 7 | Power Margin | | L-P | 15 dB |
| 8 | Acceptable Signal Dispersion | q | D | 1 nsec |
| 9 | Number of λ-Channels | N | WDM | 20 + 1* |
| 10 | Channel λ-Separation | Δλ | WDM | 1 nm |
| 11 | Unit Signal Dispersion | ρ | D | 2 psec/ 1 nm · 1 km |
| 12 | Total Signal Dispersion** | q | D | 760 psec |
| 13 | Grating Dispersion Coefficient | $K_\lambda$ | G | $1.3\mu^{-1}$ |
| 14 | Lens Focal Length | f | L | 9 cm |
| 15 | Fiber Numerical Aperature | NA | F | 0.2 |
| 16 | Lens Diameter | D | L | 3.6 cm |
| 17 | WDM Sizes | | WDM | (18 cm, 3.6 cm, 3.6 cm) |
| 18 | Littrow Wavelength | $\lambda_L$ | WDM | 1300 nm |
| 19 | Littrow Angle | α | G | 46° |
| 20 | Grating Resolution | $1/\Lambda_{//}$ | G | 1000 l/mm |
| 21 | Grating Constant | Λ | G | 0.42 μm |
| 22 | DCG Refractive Index | n | G | 1.55 |
| 23 | Grating O.D. (Single-Window) | O.D. | G | 1.5 |
| 24 | Grating O.D. (Dual-Window) | O.D. | G | 5.0 |
| 25 | Grating Transmission | T | G | ≧90% (0.3μ–3.0μ) |
| 26 | DFB Frequency Control | dν | S | 2 GHz |
| 27 | DFB Wavelength Control | dλ | S | 0.1Å |
| 28 | Fiber Tolerance | dx | F | ±3μ |
| 29 | Wavelength-Shift Coefficient | $k_\lambda$ | S | 0.01 |
| 30 | Fiber Tolerance Coefficient | $k_x$ | F | 0.025 |
| 31 | Global λ-Coefficient | k | WDM | 0.035 |
| 32 | Dispersion Loss | $L_D$ | WDM | 3 dB |
| 33 | WDM Total Loss | $L_T$ | WDM | 5 dB |
| 34 | Cross-Talk Critical (b/d) | $\left(\frac{b}{d}\right)_c$ | WDM | 1.03 |
| 35 | WDM Cross-Talk | C | WDM | <−50 dB |
| 36 | BER | BER | L-P | $<10^{-12}$ |
| 37 | Data Rate, Per Channel | $B_o$ | L-P | 1 Gbit/sec |
| 38 | Data Rate, Aggregate | $B_T$ | L-P | 21 Gbit/sec |

*Assuming dual-window WDM (otherwise, N = 20)
**For single-window signals

Edge Limiting LED Multiwavelength Link

A multiwavelength data communication link using an edge limiting LED (ELED) is now discussed. In the previous discussion of LDs, it was assumed that the LDs were single mode, i.e., δλ=0. In the discussion of the ELED case in which the line width of the source cannot be ignored readily as in the LD case, we take into account line widths of between 50–60 nm for ELEDs. Now, however, wavelength shift, dλ, is assumed to be zero because LEDs in general suffer very little from this effect.

The first use of ELEDs in the present invention is only slightly different than the use of LDs, analyzed by Eqs. 1-18. In the ELED case we replace Eq. 5, by the following approximate equation:

$$\zeta_D = 1 - k' \quad \text{(Eq. 37)}$$

where, instead of Eq. 1 we have, $$k' = \frac{\delta\lambda}{\Delta\lambda} \quad \text{(Eq. 38)}$$

and wavelength linewidth, δλ, is illustrated by FIG. 9 (here, customary to LDs, dλ=0). It should be noted that in the case of ELEDs their extended spectrum should be integrated over dispersion efficiency $\zeta_D$ (See Eq. 37) in order to obtain aggregate coupling efficiency, Q, similar to Eq. 57. In such a case, for the uniform part of the ELED spectrum, we obtain Q=0.5. The equivalent of Eq. 10 has similar form, $$\left(\frac{b}{d}\right)_c = \frac{2}{2 - k'} \quad \text{(Eq. 39)}$$

Therefore, the optimization analysis is similar to that for LDs, except dλ is replaced by δλ, and k by k'. Assuming $L_D=3$ dB, we obtain from Eq. 37, k'=0.5, and, according to Eq. 39, $(b/d)_c=1.33$. Now, however, the Wavelength separation, Δλ, must be made larger since for δλ=40 nm, Δλ=80 nm. On the other hand, for $(b/d)_c=2$, from Eq. 39 we obtain k'=1, still preserving Q=0.5, for the uniform part of the ELED spectrum.

The second use of ELEDs in the present invention is such that the WDM is used to filter out all but preferably the center frequency of each of the ELEDs used as sources. The WDM may also be used to filter out all but a frequency slightly off center of each of the ELEDs with satisfactory results but with some power loss. This filtering ability of the WDM is extremely advantageous because it results in an effective δλ that is smaller than δλ of the ELED itself. This sampling or slicing of LED spectra is illustrated in FIG. 16A which shows the spectra for three ELEDs filtered by the WDM leaving only the center frequency for use in the data link.

Figure 16B:
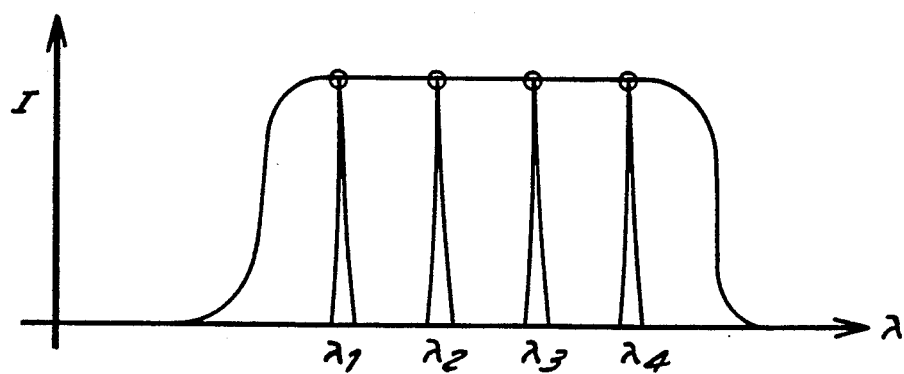

It can be seen that for each of the LEDs δλ, the region surrounding the central wavelength λ1, λ2, or λ3, is far smaller than the full, unfiltered spectrum of the ELED. As seen in FIG. 16B, when the filtered central wavelengths of each of the LEDs is multiplexed, the small δλ of each allows close juxtaposition of each of the carriers in wavelength. In this example, λ1, λ2, and λ3 may equal 1300, 1330, and 1360 nm. Therefore, the distance Δλ between the central frequencies of each of the filter LED spectra is on the order of about 30 nm rather than, in an unfiltered case, hundreds of nm.

Filtering Effect

An analysis of the filtering effect of the ELED multiwavelength data communication link of the present invention is now discussed. There are basically two types of LEDs, surface emitting LEDs (conventional) having wavelengths located typically at 800 nm and at 1.3μ, Lambertian type spectra, and broad line widths, δλ, up to 200 nm. The second type of LED is the ELED which has wavelengths at 1.3μ and narrower line widths of about 60 nm and recently down to 40 nm. ELEDs are not Lambertian in nature, however. Therefore, coupling efficiency ζ of ELEDs is much higher than conventional LEDs. Coupling efficiency $\zeta$ is given by the following equation $$\zeta = \left(\frac{d}{D'}\right)^2 \cdot \left(\frac{NA_F}{NA_L}\right)^2 \quad \text{(Eq. 40)}$$

where $NA_F$ is the numerical aperture of a fiber connected to the LED (and d is its core diameter) and the lower $NA_L$ is the numerical aperture of the LED itself (and D' is its diameter). In the case where a LED is used, NA for the LED is 1 because it is a Lambertian source. Assuming a typical NA for a fiber is between 0.2 to 0.5, coupling efficiency $\zeta$ turns out to be only about 25% (assuming d/D' equals roughly 1). In the ELED case, NA<1 and therefore $\zeta$ is much higher.

In the WDM used in the present invention, the source fiber emits light with a divergence determined by the fiber's numerical aperture NA, the light is collimated by the aspheric lens and reflected and dispersed by the grating that is mounted at Littrow angle for the central channel. The reflected light is reflected by the same aspheric lens into one of the receiving fibers in the fiber array determined by the wavelength of the light source.

The fundamental relation between the fiber spacing b, the channel spectral separation $\Delta\lambda$, and the focal length of the lens f can be derived from the basic grating formula for the first-order diffraction:

$$\sin\beta + \sin\alpha = \frac{\lambda}{\Lambda} \quad \text{(Eq. 41)}$$

where $\lambda$ is the light wavelength in vacuum, $\Lambda_{||}$ is the grating constant, $\alpha$ is the incident angle with respect to the normal to the grating, and $\beta$ is the diffraction angle. At the Littrow configuration, where $\alpha = \beta$, the beam is reflected directly backward and the angular distortion of the reflected beam is minimized. If Eq. 40 is differentiated for the fixed wavelength case the following is derived $$\delta\beta \cos\beta + \delta\alpha \cos\alpha = 0 => K_\alpha = -\frac{\cos\alpha}{\cos\beta} \sim -1 \quad \text{(Eq. 41A)}$$

where $K_\alpha$ is the geometrical magnification coefficient (which indicates that the system is a one-to-one imaging system) and $$K_\alpha = \frac{\partial\beta}{\partial\alpha} = -1 \quad \text{(Eq. 42)}$$

and $$2\sin\alpha = 2\sin\beta = \frac{\lambda}{\Lambda}. \quad \text{(Eq. 43)}$$

Thus, the dispersion factor $K_\lambda$ is shown to be $$K_\lambda = \frac{\partial\beta}{\partial\lambda} = \frac{1}{\cos\beta\Lambda} = \frac{2\tan\alpha}{\lambda}. \quad \text{(Eq. 44)}$$

Rewriting Eq. 44 for $\Delta\beta$ we get $$\Delta\beta = K_\lambda \Delta\lambda \quad \text{(Eq. 45)}$$

and the fiber spacing b (center-to-center) is given by $$b = f\Delta\beta \quad \text{(Eq. 46).}$$

Using the following equation $$d\beta_\lambda = K_\lambda \delta\lambda_1 = \frac{d}{f} \quad \text{(Eq. 47)}$$

where d is the core diameter, and substituting in Eq. 45 from above, the following is obtained $$\delta\lambda = 2\delta\lambda_1 = 2\frac{d\beta_\lambda}{K_\lambda} = 2\frac{d}{fK_\lambda} = \frac{2d}{f}\frac{\Delta\lambda}{\Delta\beta} = \frac{2d}{f}\frac{f}{b}\Delta\lambda \quad \text{(Eq. 48)}$$

and substituting in Eq. 42, the equation defining k' is obtained:

$$k' = \frac{\delta\lambda}{\Delta\lambda} = \frac{2d_1}{b_1}. \quad \text{(Eq. 49)}$$

Since light emitted by a LED or ELED is polychromatic (k'>0) some fraction of light energy will be lost in the fiber cladding. Considering the LED beam as a continuous superposition of monochromatic components, we can introduce the formula similar to Eq. 2 in the form:

$$\zeta_D(\delta\lambda_a) = \frac{\delta\alpha - \delta\beta_\lambda}{\delta\alpha} = 1 - \frac{\delta\beta_\lambda}{\delta\alpha} \quad \text{(Eq. 50)}$$

where $$\delta\alpha = \frac{d}{f} \quad \text{(Eq. 51)}$$

determines the angular sizes of the fiber core and $$\delta\beta_\lambda = K_\lambda \delta\lambda_a = K_\lambda k_a \Delta\lambda = k_a \Delta\beta = k_a \frac{b}{f} \quad \text{(Eq. 52)}$$

where $\delta\lambda_a$ determines the wavelength shift of a given monochromatic component. Substituting Eqs. 51 and 52 into Eq. 50, we obtain $$\zeta_D = 1 - \frac{k_a \frac{b}{f}}{\frac{d}{f}} = 1 - k_a \frac{b}{d} \text{ for } k_a \leq \frac{b}{d} \quad \text{(Eq. 53)}$$

and $\zeta_D = 0$, otherwise, where $$k_a = \frac{\delta\lambda_a}{\Delta\lambda}. \quad \text{(Eq. 54)}$$

Equations 50-54 are more precise than Eqs. 37-39, since they include all spectral components, not only boundary ones. According to Eq. 53, if $k_a = d/b$, then $\zeta_D = 0$. Therefore, the maximum wavelength shift, accepted by the output fiber, is $$k_a = \frac{d}{b} \quad \text{(Eq. 55)}$$

and the total spectral linewidth, accepted by the output fiber, is $$k_1 = 2k_a = \frac{2d}{b} \quad \text{(Eq. 56)}$$

in accordance with Eq. 49. It should be noted, however, that only a fraction of this spectrum will be accepted by the fiber. The general formula for coupling efficiency is $$Q = \frac{\int_0^{\delta\lambda} \zeta_D(\delta\lambda)G(\lambda)d\lambda}{\int_0^{\delta\lambda} G(\lambda)d\lambda} \quad \text{(Eq. 57)}$$

where $\zeta_D$ is determined by Eq. 53, and $G(\lambda)$ determines the source power (usually symmetrical) spectrum within linewidth $\delta\lambda_1 = 2\delta\lambda$, where $$\delta\lambda = \lambda - \lambda_o \quad \text{(Eq. 58)}$$

and $\lambda_o$ is the central wavelength of the spectrum. Substituting Eq. 53 into Eq. 57 and assuming uniform spectral distribution, we obtain $$Q = \frac{\int_0^{\delta\lambda_a}\left(1 - \frac{b}{d}\frac{\delta\lambda}{\Delta\lambda}\right)d\lambda}{\delta\lambda_a} = 1 - \frac{b}{d}\frac{\delta\lambda_1}{4\Delta\lambda} \quad \text{(Eq. 59)}$$

where $\delta\lambda_1 = 2\delta\lambda_a$ is the accepted spectral linewidth. Substituting Eq. 56 into Eq. 59, we obtain $$Q = 0.5 \quad \text{(Eq. 60)}$$

i.e., 3 dB dispersion coupling loss, independently on $k_1$ (3 dB of input energy is lost in fiber cladding). In order to avoid cross-talk, $k_1 \leq 1$; thus according to Eq. 56, $b > 2d$.

Broad-Band Source

The WDM design presented above can also be used to obtain a highly efficient broad-band source from a number of narrow-band sources, slightly shifted in the $\lambda$-domain. In such a case, FIG. 16A can be interpreted in a different way, namely, only the three cross-hatched spectral areas are present representing three $\lambda$-separated ELEDs, or other sources. (The remaining part of the spectra does not exist). Assuming m-number of such sources, and $(b/d) = 2$, we obtain using similar analysis as before, that the maximum coupling efficiency, Q, to the multiplexed fiber will be 50%, independently of m. To the contrary, for state-of-the-art couplers, such efficiency will be $(1/m)$, according to the well-known brightness theorem (see, e.g., M. Born and E. Wolf, *Principle of Optics*, Pergamon press (1970)). Therefore, the coupling efficiency gain, due to the present invention, will be especially visible for large m. For example, for m=10, we obtain only Q=10% for the state-of-the-art couplers, versus Q=50%, for a WDM system being subject of this invention.

WDM Insertion Loss

In the case of WDM demultiplexing, in order to calculate the insertion loss, we need to use a formula similar to Eq. 57, and an analogous formula for cross-talk. For sake of simplicity, however, we will use the boundary formula similar to Eq. 7 in the form $$g' = \frac{bk_a + \frac{d}{2}}{b - \frac{d}{2}} \quad \text{(Eq. 61)}$$

or using Eq. 56, $$g' = \frac{bk_1 + d}{2b - d} \quad \text{(Eq. 62)}$$

Assuming a low cross-talk condition, similar to Eq. 8, $$g' \leq 1 \quad \text{(Eq. 63)}$$

and replacing in Eqs. 61-63, (b,d) by ($b_2$, $d_2$) we finally obtain $$\frac{d_2}{b_2} \leq 1 - \frac{k_1}{2} \quad \text{(Eq. 64)}$$

and using Eq. 56, $$\frac{d_2}{b_2} \leq 1 - \frac{d_1}{b_1} \quad \text{(Eq. 65)}$$

Therefore, the symmetric case is only for $$\frac{b_2}{d_2} = \frac{b_1}{d_1} = 2. \quad \text{(Eq. 66)}$$

Comparing Eqs. 64 and 65 it is seen that the WDM system, ($d_1$, $b_1$), performs spectrum sampling ($k = 2d_1/b_1$) while the WD(D)M system ($d_2$, $b_2$) can effectively demultiplex the sampled spectrum with low cross-talk, assuming Eq. 65 is satisfied.

Equation 64 used separately, also demonstrates that we can use two LEDs, only slightly separated, in order to preserve low cross-talk. Using Eq. 64, we have $$k = \frac{\delta\lambda}{\Delta\lambda} = 2 \quad 1 - \frac{d}{b} \quad \text{(Eq. 67)}$$

Thus, for b/d=2, we obtain k=1, and $\delta\lambda = \Delta\lambda$. Therefore, even the so-called dual-wavelength approach with LEDs, can be effective in this case, assuming grating wavelength characteristics are sufficiently broad to cover both LED spectra.

WDDM Spectrum, Temperature, or Spectral Signature Measurement

Equation 56, used for the WDDM case (thus: $d = d_2$, $b = b_2$), can be also applied to a novel design of a compact optical spectrum analyzer (or stationary spectrophotometer) of the present invention. In such a case, Eq. 56 can be rewritten in the following form $$\frac{\delta\lambda_o}{\Delta\lambda} = \frac{1 d_2}{b_2} \quad \text{(Eq. 56A)}$$

where $d_2$ determines either fiber core diameter (or pixel diameter of fiber/photodector array). The difference between the fiber array (see FIG. 3) and photodetector (CCD) area is not a fundamental problem but only an engineering concern because detector pixels can be either placed directly in the output plane or connected through the fiber array. In a similar way, the lens can be replaced by a collimating/concentrating mirror with the profile close to an off-axial paraboloid. In any case, we have four possible packaging geometries of detector arrays determined by Eq. 56A, combining $\delta\lambda_o$ wavelength resolution (or wavelength range averaged within a single-pixel area) with $\Delta\lambda$ separation between the adjacent central pixel wavelengths:

a) for $b_2 > 2d_2$, then $\delta\lambda_o < \Delta\lambda$, and some part of the wavelength spectrum is not detected by the pixels at all;

b) for $b_2 = 2d_2$, then $\delta\lambda_o = \Delta\lambda$, and the spectral gaps are eliminated but cross-talk remains low;

c) for $d_2 < b_2 < 2d_2$, then $$\frac{\delta\lambda_o}{2} < \delta\lambda_o < \delta\lambda_o,$$

and some parts of the spectra overlap; and d) for $b_2 = d_2$, then $\delta\lambda_0 = 2\Delta\lambda$, and pixel packaging is the closest possible.

Among those four cases, case b) seems preferable, but other cases may also be applicable. Design of such a WDDM spectrophotometer is purely based on the grating WDM being of the present invention, and it can be illustrated by a table similar to Table 6, either for the single-mode or multi-mode fiber case, including parameters (9, 10, 17, 18, 31, 32, 33, 34, 35) related to a WDM system. The WDDM spectrophotometer of the present invention can use gratings similar to the WDM fiber-optic link case while the WDM lens can be replaced by a collimating mirror if the lens' chromatic aberration is too large, or if using a lens is prevented for longer infrared (IR) wavelengths of interest. Also, conventional fibers can be replaced by special fibers transparent to longer IR wavelengths (5–10μ). The design, however, remains fundamentally the same; thus preserving low grating dispersion loss and low cross-talk due to paraxial geometry of the WDDM system. Such a spectrophotometer design can be particularly useful for a moderately broad spectra of interest (<500 nm) and for limited spectral resolution. For example, for $b_2 = 2d_2$ and for $\delta\lambda_o = \Delta\lambda = 0.5$ nm, we can cover a 500 nm spectral range with N=1000 pixels and 0.5 nm spectral resolution. Thus, we can receive, parallely, 1000 wavelength readings using a relatively simple and compact WDDM system. The obvious applications are Raman spectroscopy, where Stoke's lines or anti Stokes can be measured, usually in the visible and/or near IR 100–500 nm spectral range. In such a case, the Rayleigh spectrum may be blocked using a holographic Raman filter such as is fully disclosed in U.S. patent application Ser. No. 464,116, filed Jan. 12, 1990.

In an other related application, high-temperature electromagnetic radiation can be measured using a WDDM spectral thermometer similar to the WDDM spectrophotometer (or spectroradiometer) discussed above. The typical temperature ranges are 500° C.–5000° C., equivalent to peak wavelengths of radiation, located in visible, near IR, and middle IR regions. In such an application, the number of wavelength readings is usually much smaller than in the previous cases and required wavelength resolution is much lower (e.g., m=20, and $\Delta\lambda = 20$ nm), but the principle of the invention remains fundamentally the same.

In a slightly different application, spectral signatures, characteristic of some particular chemical structures when illuminated by laser or other radiation, may be measured. In such a case, the application is similar to that related to Raman spectroscopy.

WDM ELED Filtering

The filtering effect of the ELED WDM is now further described. Taking Eq. 41 again $$\sin\beta + \sin d = \frac{\lambda}{\Lambda}$$

and the equation (Eq. 43) defining Littrow wavelength $$2\sin\alpha = 2\sin\beta = \frac{\lambda_L}{\Lambda}$$

as discussed earlier for $\lambda_{L1} = 720$ nm, $\Delta\lambda nm = 30$ nm, $\Delta\beta = K_\lambda \Delta\lambda$, and knowing that $K_\alpha = -1$ for $\alpha \approx \beta$ we obtain the following equation $$\lambda_{L(m+1)} = \lambda_{Lm} + 2\Delta\lambda \qquad \text{Eq. (68)}$$

which provides solutions to the filtering effect of the WDM for the arrangement shown in FIG. 17 and in Table 7. Assuming that the four fibers illustrated in FIG. 17 carry the following wavelengths 1300, 1330, 1360, and 1390 nm, and assuming the corresponding fibers 1–4 represented in Table 7 act as both input and output fibers a number of interesting effects can be observed. The Littrow wavelengths for each of the fibers 1–4 in FIG. 17 are positioned on the diagonal running from lower left to upper right in Table 7. Thus it can be seen that the Littrow wavelength for fiber 4 is 1480, for fiber 3 is 1420, for fiber 2 is 1360, and for fiber 1 is 1300. The table thus shows that the 1480 nm wavelength traveling in fiber 4 into the multiplexer will be diffracted back into that fiber in accordance with the Littrow equation. The same is true for the other fibers and their respective Littrow wavelengths.

TABLE 7

| FIBER | 4 | 0 | 1390 | 1420 | 1450 | 1480 |
|---|---|---|---|---|---|---|
|  | 3 |  | 0 | 1360 | 1390 | 1420 | 1450 |
|  | 2 |  | 0 | 1330 | 1360 | 1390 | 1420 |
|  | 1 ← | 0 | 1300 | 1330 | 1360 | 1390 |
|  |  |  | 0 | 0 | 0 | 0 |
|  |  |  | ↑ | ↑ | ↑ | ↑ |
|  |  |  | 1 | 2 | 3 | 4 |
|  |  |  |  | FIBER |  |  |

A more interesting example and one that shows the filtering effect of the WDM is to enter Table 7 at the bottom entry for fiber 3 and go up to the side entry for fiber I. The intersection of those two fibers 1, 3 is 1360 nm. Table 7 shows that fiber 3 delivers 1360 nm to fiber 1 (as well as 1420 nm to itself). Further it can be seen in Table 4 that fiber 2 delivers the 1330 nm wavelength to fiber 1 (as well as 1360 nm to itself), and fiber 4 delivers 1390 nm to fiber 1 (as well as 1480 nm to itself) as shown in FIG. 18C. Thus, for the system where $\lambda_{L1} = 1300$, $\lambda_{L2} = 1360$, $\lambda_{L3} = 1420$, and $\lambda_{L4} = 1480$ nm, and where fiber 1 is the output fiber for wavelengths input on fibers 2–4, fiber 1 will pick up the wavelengths 1300 (its Littrow wavelength), 1330, 1360, and 1390. Thus, it can be seen that the central wavelength of each of the LEDs used in the system is determined not by the LED but by the WDM. Thus, the filtering of the WDM of the present invention allows four channels to be compressed into the space of only 90 nm or just 3× the wavelength separation of the sources used. This effect again is in accordance with Eq. 68 which states that the distance between the Littrow wavelengths for adjacent fibers is $2\Delta\lambda$.

In the example above where $b_1/d_1=4$, that ratio of core to center fiber distance can be achieved by using dead fibers between live ones in the WDM. The system is adjusted so that the distance between central wavelengths of the ELEDs used is 30 nm and the Littrow wavelength of the first fiber is 1300 nm. In the case of ELEDs especially, $\Delta\lambda$ may be as small as 5 nm and the same analysis as above would apply. It can be seen that with $\Delta\lambda=5$ nm the total spectrum used by the filtered LEDs would only be about 15 nm.

Figure 18A:
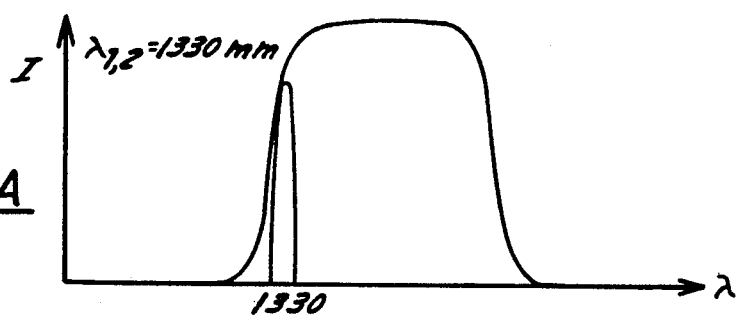
Figure 18B:
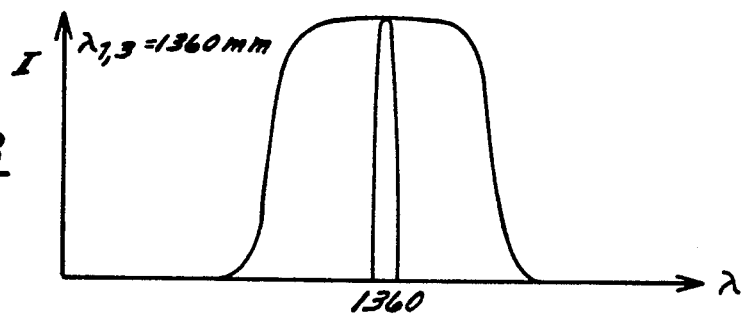
Figure 18C:
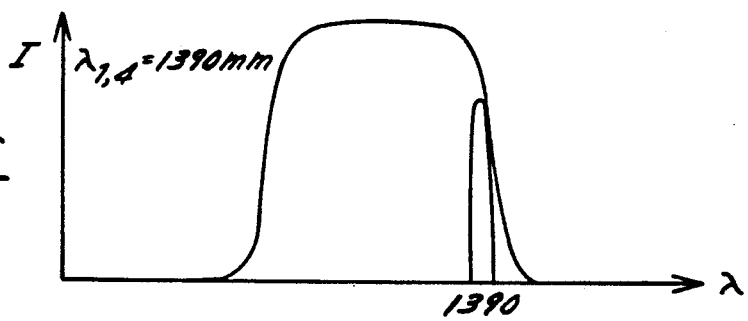
Figure 18D:
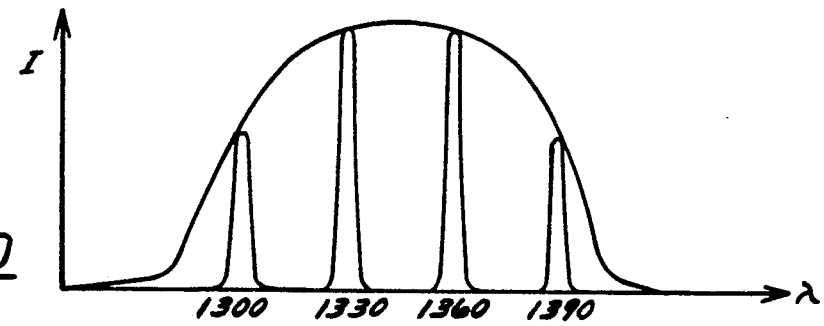

An alternative embodiment of the invention may use only one LED the spectrum of which would be sliced into the appropriate narrow linewidths for multiplexing on a single fiber as seen in FIGS. 18A-C. This is slightly less advantageous than the use of multiple LEDs the central frequency of which is filtered out and multiplexed because the wavelengths of the single LED spectrum that are located to either side of the central frequency will be of lesser power typically than the central wavelength and therefore will exhibit some power loss in the system as shown in FIG. 18D.

It should be mentioned that the optimum design for the multiplexing WDM is not necessarily the optimum design for the demultiplexing WDM. In other words, $$\frac{d1}{b1} \neq \frac{d2}{b2} \qquad \text{(Eq. 69)}$$

External Modulation Systems

Applications of an LED based link other than the three to four channel ELED system described above include a single LED and multiple external modulator system as depicted in FIG. 19 wherein a single LED is demultiplexed by a first WDM and each of the demultiplexed components is run through an external modulator the output of which is fed to a second WDM which multiplexes the signals for long distance transmission to a third WDM which demultiplexes the signals for use at a receiver. In another application the external modulators may appropriately be sensors instead of external modulators to pick up, for instance, three environmental parameters by modulating the light waves in the fibers. Such a smart skin system is depicted in FIG. 20 showing one LED and four WDMs one of which demultiplexes four wavelengths from the LED and passes them to a network of three other WDMs through sensors located at the intersection of the fibers for multiplexing by the three WDMs and transfer to a demultiplexing WDM at a receiver. In this way, the smart skin network can sense a large area and a variety of quadrants, determined by (x,y)-coordinates.

WDM Optical Isolation

Referring to the system illustrated in FIGS. 21A and B, it should be emphasized that it is important to avoid cross-talk between the output signal $\lambda_1$ and input signal $\lambda_2$, as it is schematically illustrated in FIG. 21A depicting for example a Raman sensor, or some type of multiwavelength sensor, where sensing medium shifts incite signal wavelength $\lambda_1$ to an other wavelength $\lambda_2$ (usually longer). FIG. 21B shows a sensing probe having two detectors $R_1$ and $R_2$ which can compare wavelengths $\lambda_2$ and $\lambda_3$ received from the medium to be sensed. $\lambda_3$ may also be used simply as a reference wave to sense unwanted motion of the fiber. The LD or ELED, and detector R may also be directly placed in the entrance plane (without using relay fibers) in FIG. 21B, obtaining a bidirectional WDM grating splitter using the same WDM geometry as in FIG. 3.

As seen in FIG. 22, signal $\lambda_1$ emitted by a laser diode LD (or LED/ELED) in a transceiver is usually much stronger than the received signal $\lambda_2$ due to its close proximity to the detector R and therefore should be isolated from detector R located in the same transceiver as shown schematically in FIG. 22.

Low Cross-Talk WDM

FIG. 23 shows a preferred structure of a WDM which prevents high cross-talk (lens structure is not shown here for simplicity, see FIG. 3). It is not possible for $\lambda_1$ from LD 154 to enter detector 158 because $\lambda_1$ is dispersed in the direction of Fresnel reflection. This optical isolation preferably is very high, down to $-60$ dB of optical cross-talk, equivalent to $-120$ dB of electrical cross-talk. As shown in FIG. 24, a camera embodying the high optical isolation design shown in FIG. 23 may be employed wherein $\lambda_1$ is the image signal and $\lambda_2$ is a coded information signal containing for example positioning information fed to the camera from a remote controlling location.

Referring again to FIG. 23, $\beta_2<\beta_1$; thus, $\lambda_2<\lambda_1$. Typical dimensions are $D=100\mu$, $g=5\mu$, $d=62.5\mu$. Pertinent grating equations are $$\sin\alpha + \sin\beta_1 = \frac{\lambda_1}{\Lambda} \qquad \text{(Eq. 70)}$$

$$\sin\alpha + \sin\beta_2 = \frac{\lambda_2}{\Lambda} \qquad \text{(Eq. 71)}$$

(incident angle and diffraction angles are reversible here.)

$$2\sin\alpha = \frac{\lambda_L}{\Lambda} \qquad \text{(Eq. 72)}$$

for Littrow wavelength, $\lambda_L$, also $$K_\lambda = \frac{\partial\beta}{\partial\lambda} = \frac{2\tan\alpha}{\lambda_L} \qquad \text{(Eq. 73)}$$

From FIG. 23

$$\Delta x_2 = f K_\lambda (\lambda_1 - \lambda_L) \qquad \text{(Eq. 74)}$$

$$\Delta x_1 = f K_\lambda (\lambda_1 - \lambda_2) \qquad \text{(Eq. 75)}$$

where f is the focal length of the lens not shown in FIG. 23. It is seen that this system has excellent optical isolation, since the $\lambda_1$ signal emitted by the source LD 154 is diffracted to the fiber 156 at diffraction angle $\alpha$, and the Fresnel reflection from the fiber front surface is not retro-reflected to the detector 158. Analogously, the Fresnel reflection from the grating 159 is not retro-reflected to the detector. (If $\lambda_1<\lambda_2$, the position of the source and detector should be reversed.) Since $d>>g$, and $D>>d$, power budget is excellent. The tolerance coefficients, $H_1$ and $H_2$, characterizing the signal dispersion broadening, due to either wavelength shift (for LD) or source linewidth (for LED) must be calculated. We have, for coupling between sources and fiber, $$H_1 = \frac{\delta x_\alpha}{d} \qquad \text{(Eq. 76)}$$

where $$\delta x_\alpha = f K_\lambda \, \delta\lambda \qquad \text{(Eq. 77)}$$

and $\delta\lambda$ characterizes wavelength shift for the LD and linewidth for LED (or ELED). Substituting Eqs. 75 and 76 into Eq. 77, we obtain $$H_1 = \frac{\partial X_\alpha}{\Delta x_1} \frac{\Delta x_1}{d} = \frac{\Delta x_1}{d} \frac{\partial \lambda}{\lambda_1 - \lambda_L}. \qquad \text{(Eq. 78)}$$

For $\lambda_1 = 720$ nm, $\lambda_2 = 810$ nm (thus, $\Delta\lambda = 90$ nm), and $\delta\lambda = 9$ nm, and $\Delta x_1 = 5d$, we obtain from Eq. 78 $H_1 = 0.5$, and superior optical isolation. Analogously, we obtain $$H_2 = \frac{\Delta x_2}{D} \frac{\delta\lambda}{\lambda_2 - \lambda_L}. \qquad \text{(Eq. 79)}$$

The system general schematic illustrated in FIG. 21A, can be used as a Raman sensor (or other multi-wavelength spectroscopic sensors) with excellent optical isolation (that may be further improved by using GRIN optics in the front of the source and interference holographic and multi-layer filters) or as transceivers in security cameras, where the weak output signal $\lambda_2$ is perfectly isolated from the strong input signal ($\lambda_1$) as shown in FIG. 24.

The system illustrated in FIG. 23 can be implemented using a holographic grating in quasi-Lippman geometry near the Littrow position. Such a WDM system can realize full duplex using only one fiber for both single-mode and multi-mode cases. In such a case either two wavelengths from two separate windows (e.g., $\lambda_1 = 1310$ nm, and $\lambda_2 = 1550$ nm), or two wavelengths from the same fiber transmission window can be multiplexed. Where the two wavelengths are far apart, compensation for chromatic dispersion in the lens may be necessary, or the lens can be replaced by a collimating mirror, preserving the same fundamental design. The basic architecture of a bidirectional dual-wavelength (single-mode) data link, based on such a WDM system, is illustrated in FIG. 25. This system can be applied in single-mode and multi-mode applications, as well as for LDs and LEDs.

WDM Coupler

The WDM bidirectional coupler of the present invention is based on a broadband volume holographic grating with regulated bandwidth (20 ÷ 200 nm), high optical density (O.D.) as well as high transmission in the remaining part of the spectrum. For dichromated gelatin (DCG) gratings, transmission can be high within a very broad range of wavelengths ($0.3\mu$–$3.0\mu$) that cover almost all wavelengths of interest in optical communication and spectroscopy. Since the grating's Bragg structure is slightly slanted (quasi-Lippman), Fresnel reflection is rejected, and the system's cross-talk, C, is determined only by the grating's O.D. (optical density), $$C < 10 \text{ O.D. } [-dB] \qquad \text{(Eq. 80)}$$

i.e., for O.D.$>5.0$, $C < -50$ dB. The system is illustrated in FIGS. 26A-B where the conventional lens can be replaced by GRIN lens. One spectral range is diffracted-reflected ($\lambda_1$), while the other is transmitted ($\lambda_2$). Typical parameters of such single-mode WDM couplers, are $d = 9\mu$, $b = 125\mu$, $f = 3$ mm (focal length), $\lambda_1 = 1310$ nm, $\lambda_2 = 1550$ nm.

The system's dispersion loss is determined by the following formulas:

$$\zeta_D = 1 - \frac{2b}{d} \frac{\delta\lambda}{\lambda_1} \qquad \text{(Eq. 81)}$$

and $$L_D = -10 \log \zeta_D \qquad \text{(Eq. 82)}.$$

For example, for $d = 9\mu$m, $b = 125$ $\mu$m, $\lambda_1 = 1320$ nm, and $\delta\lambda = 1$ nm, we obtain $\zeta_D = 0.97$, and $L_D = 0.1$ dB. Adding 4% Fresnel loss (4× times), we obtain $L_F = 0.7$ dB, and grating loss, $L_G$, is assumed to be 0.5 dB. Since the system is highly-paraxial ($2b/f \ll 1$), we can ignore aberration losses and total WDM loss, $L_T$, is $$L_T = L_D + L_F + L_G = 0.1 + 0.7 + 0.5 = 1.3 \text{ dB}. \qquad \text{(Eq. 83)}.$$

Figure 27A:
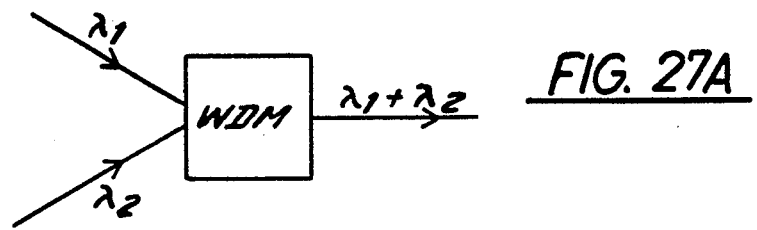
Figure 27B:
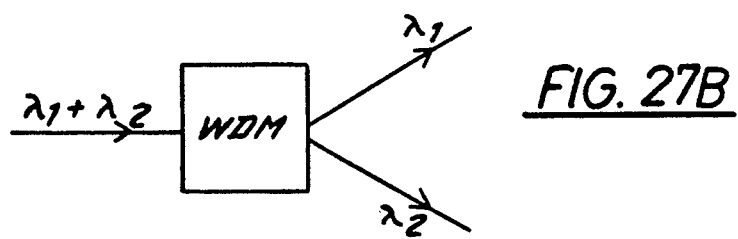
Figure 27C:
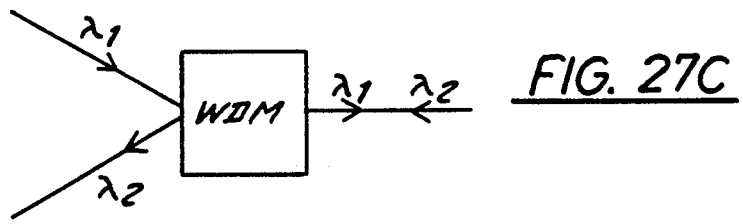
Figure 27D:
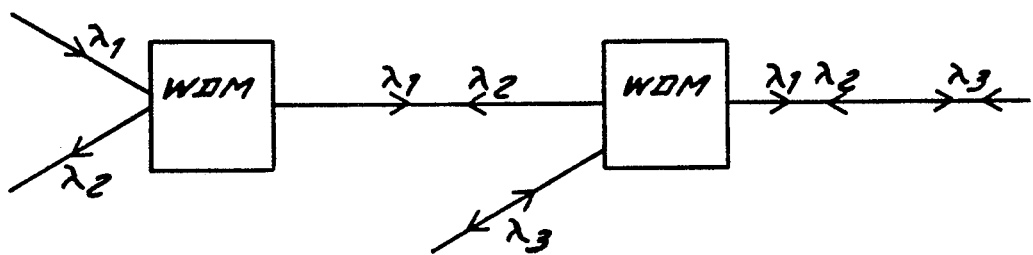

This system can be used as a WDM (FIG. 27A), WD(D)M (FIG. 27B) or a bidirectional WDM coupler (FIG. 27C) or a dual window cascaded system as in FIG. 27D. Since the holographic grating is only slightly slanted, the grating period is not small, because $$\frac{1}{\Lambda} = \frac{\sin\beta}{\lambda} = \frac{b}{f \cdot \lambda} \qquad \text{(Eq. 84)}$$

where $\beta$ diffraction angle, for $b = 125\mu$, $f = 3$ mm, $\lambda = 1320$ nm, $1/\Lambda_{||} = 31$ 1/mm. Such a large grating constant, however, is not problematic for volume holographic gratings (alternatively, other types of holographic gratings can be used). It should be also noted that the angle $\alpha_o$ (see FIG. 28A) is highly arbitrary here since it is not determined by $\Delta\lambda$ wavelength separation. Comparing the advantages of this system, based on quasi-Lippman/Littrow volume holographic gratings versus, for example, Gould Electronics' Biconical WDM Typer Coupler (see Gould Electronics, Technical Notes Specifying Fiber Optic Couplers), the present invention offers the following advantages:

1) superior cross-talk ($< -50$ dB);
2) relatively easy generalization to a large number of channels ($>10$), separated by no less than about 1 nm, and not more than 30 nm;
3) very low sensitivity to polarization; and
4) low sensitivity to wavelength shift (system can be used not only for LDs and single-mode fiber, but also for LEDs, ELEDs, and multi-mode fiber).

Feature 2) is illustrated in a WDM duplex system combined with WDM transceiver, illustrated in FIG. 28. The generalized WDM link illustrated in FIG. 28 consists of six WDM sub-systems, including two bidirectional WDM couplers and four multi-channel WDMs (FIG. 3) implanted directly into two transmitters and two receivers. The system is bidirectional: the spectrum of the second window ($\lambda_1 \sim 1300$ nm) is transmitted from the left to the right, and the spectrum of the third window ($\lambda_2 \sim 1500$ nm) is transmitted from the right to the left. The system can be applied not only to LANs (local area network) but also to MANs (metropolitan area network) or WANs (wide area network) since the link's length, L, can be higher than 20 km. Such a system can have three or more times higher bandwidths than the state-of-the-art, significantly reducing the cost of electronics. For example, instead of transmitting 240 Mbps within a single-channel, we need to transmit only 80 Mbps per wavelength, still preserving the aggregate bandwidth of 240 Mbps, since $80 \times 3 = 240$. Referring to dispersion requirements, for $\Delta\lambda = 1$ nm, we obtain total dispersion on the order of 100 ps for 2 nm separation (between three channels $\lambda_1'$, $\lambda_1''$; $\lambda_1'''$; or $\lambda_2'$, $\lambda_2''$, $\lambda_2'''$) and L=20 km. This is acceptable for the majority of MAN (WAN) and LAN applications. Most state-of-the-art buildings utilize single mode fiber and therefore MANs and WANs may preferably be single mode.

Feature 4) is a consequence of low dispersion, due to the fact that grating resolution of bidirectional WDM couplers is low, only ~30 1/mm. Indeed, assuming typical multi-mode fiber, 62.5/125μ, we obtain b/d=2, and assuming a broadband LED source with linewidth $\delta\lambda = 100$ nm, and $\lambda_1 = 1320$ nm, we obtain from Eq. 82 $L_D = 1.5$ dB. Therefore, this WDM system can be used not only for single-mode fibers and LDs, but also for multi-mode fibers and LEDs or ELEDs. Of course, this system also can be used for multi-mode LD optics.

The WDM system illustrated in FIG. 26A is related to the multi-window WDM described in U.S. Pat. No. 4,926,412. The reflection part of FIG. 26A can be replaced by that of FIG. 3 in that patent, while the transmission part of FIG. 26A remains without change. In such a case, we can demultiplex multi-wavelength channels from one fiber transmission window in reflection mode and a single wavelength channel in transmission mode from another (or the same) transmission window. However, contrary to the dual-wavelength approach (that must be single-window, since the grating's wavelength spectral characteristics need to cover the entire spectrum of interest) the reflection part of the spectrum need be covered only by the grating's spectral characteristics while the transmission part need only be placed within a low material absorption region of the grating spectral characteristics. This second condition, however, is easily satisfied for all wavelengths of interest, since for DCG, the low material absorption spectral range is very wide, from 0.3μ to 3μ; i.e., it covers near UV, visible and all three fiber transmission IR windows located in the vicinity of 0.8μ, 1.3μ, and 1.5μ.

WDM paraxial geometry illustrated in FIG. 3, either single-mode or multi-mode, can be interpreted in a slightly different way, namely, instead of a number of output fibers demultiplexing λ-channels, only one output fiber may be used, located near the input fiber, similar to FIG. 26A. Instead of locating the fiber array as in a stationary multi-wavelength system, a single output fiber is used and the lens is rotated with the grating to adjust to a suitable wavelength. Eq. 81, with variable b, adjusted to specific wavelength $\lambda_1$ may still be used. Thus, a tuneable WDM filter with variable λ-resolution ($\Delta\lambda = 0.1 \div 20$ nm) is obtained based on the same principle as the stationary WDM system of the present invention.

Dual Wavelength Systems: Raman and Dye Sensors, Cameras, Optical Guidance

Yet another application, based on the same principle, is to use the WDM system illustrated in FIG. 26A, as a dual-wavelength system. In such a case, we need to use multi-mode fibers (thus, b/d~2), and δλ in Eq. 81 can be related to the spectral linewidth of the broad-band source (LED, for example) and Eq. 81 can be modified to the following form:

$$\zeta_D = 1 - \xi \frac{b}{d} \frac{\delta\lambda_o}{\lambda_1} \quad \text{(Eq. 81A)}$$

where $\delta\lambda_o$ is spectral linewidth of the broad-band source, $\lambda_1$ is the central wavelength of the diffracted-reflected spectrum, and $\xi$ is a modifying factor depending on the direction of Fresnel reflection ($\xi > 1$). In this case Eq. 80 holds, and optical cross-talk (or optical isolation) can be very low. The geometry illustrated in FIG. 26A can be modified in a number of ways by, for example, exchanging the inputs with outputs and vice versa, similar to those architectures illustrated in FIG. 27.

A particularly interesting geometry is shown in FIG. 27C and is related to the general architecture illustrated in FIGS. 21A and 22. As a specific scenario, we consider a LED signal, with $\lambda_1 = 600$ nm, and $\delta\lambda = 100$ nm, introduced to a sensing medium (see FIG. 21A). We assume that the sensing medium shifts the LED spectrum to $\lambda_2 > \lambda_1$. Both $\lambda_1$ and $\lambda_2$ signals return through the same fiber and the $\lambda_1$ signal is directed back to the source (following the reversibility principle) while the $\lambda_2$ signal is received by the photodetector. In the majority of applications (communication links, environmental sensors, medical sensors, etc.) the $\lambda_2$ broad-band signal containing information is very weak, much weaker than internal and external $\lambda_1$ signals (e.g., −60 dB below them). Therefore, low internal and external optical cross-talk, or more specifically, high optical isolation of the $\lambda_2$ signal from the $\lambda_1$ signal is obtained (in such a sense that $\lambda_1$ signal is not received by the photodetector) and is essential to the success of this type of device. The applications of such an embodiment include Raman sensors, dye sensors, security cameras, FOG-M systems (fiber-optic-guided missiles) and many others. Fortunately, the optical isolation is defined by Eq. 80 where high O.D. can be preserved by a combination of holographic edge Raman filter, multi-layer dielectric filter and absorption glass, as well as a slightly slanted fiber entrance interface. For example, for O.D.=6.0, we obtain C<−60 db, and excellent result.

Also, dispersion loss can be quite low. According to Eq. 81A, for $\xi = 1$, b/d=2, $\delta\lambda_o = 100$ nm, and $\lambda_1 = 600$ nm, we obtain $L_D = 1.5$ dB. Moreover, according to FIG. 26A, there is no optical connection between the two left-hand fibers, with respect to the $\lambda_2$ signal. Therefore, if we consider the $\lambda_1$ signal as the incident beam (i.e., reversing the direction of the $\lambda_1$ signal in the left-bottom fiber in FIG. 26A); the unwanted part of the $\lambda_1$ incident beam (the part coinciding with the spectrum of $\lambda_2$ signal) cannot be transmitted from the left-bottom fiber to the left-top fiber or from the left-bottom fiber to the right-side fiber, thus preserving excellent optical isolation.

WDM Network

Figure 29B:
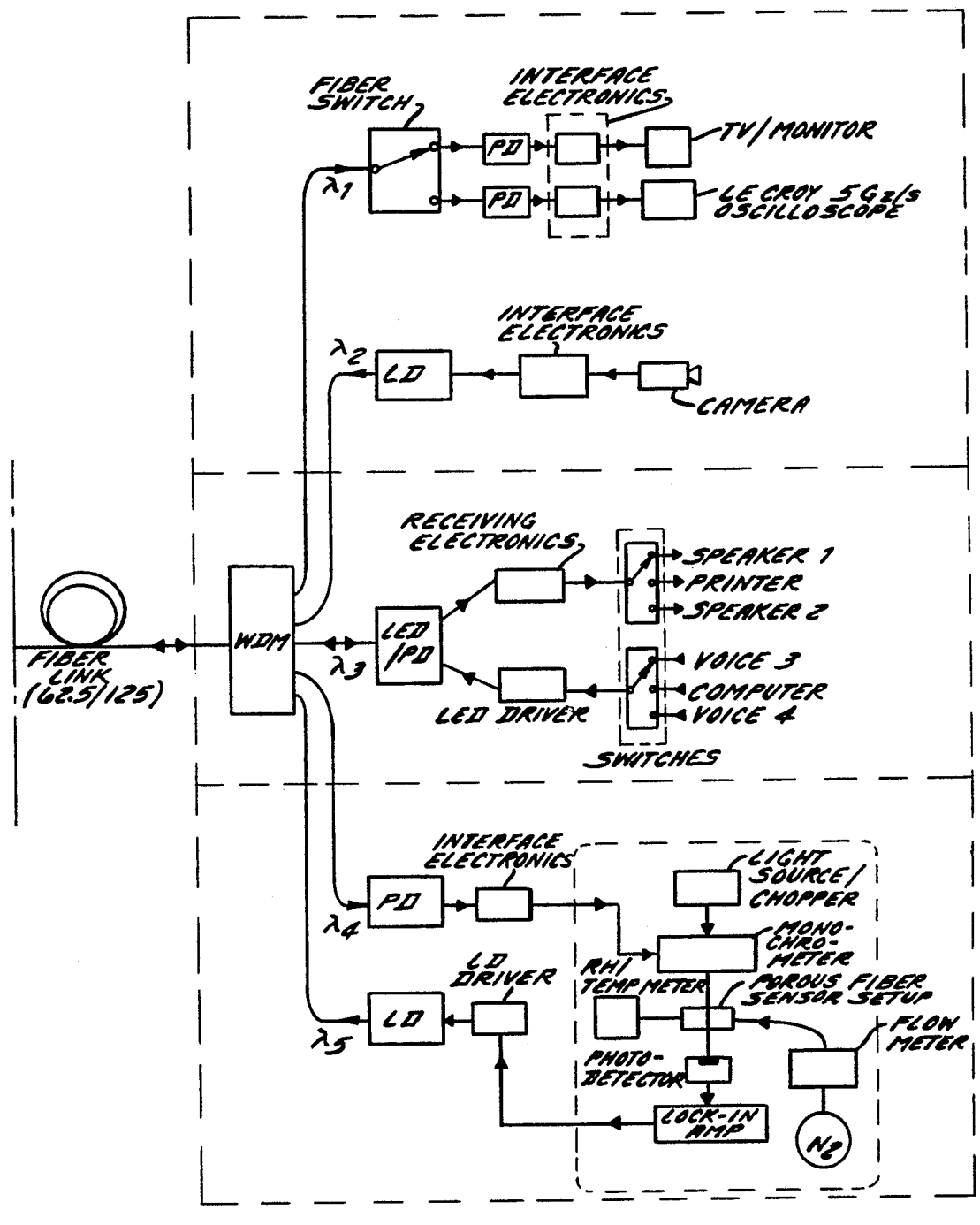

A WDM network, based on multi-mode WDMs of the present invention, is illustrated in FIGS. 29A and 29B. It includes transmission of five wavelength channels, $\lambda_1$, $\lambda_2$, $\lambda_3$, $\lambda_4$, and $\lambda_5$, bidirectionally. The system is multi-functional and can operate with standard digital and analog electronics at the same time. It also includes other standard fiber optic and electronic components such as switches, lock-in amplifiers, various sensors, printer, etc. The WDM network is only exemplary and combines transmission of voice, computer data, sensor data, etc., with full transparency (i.e. with low crosstalk, < −20 dB).

WDM Dispersion Compensation

All the above WDM systems, based on grating dispersion, cannot tolerate very high k-coefficients (see Eqs. 1 and 38), close to 1. Therefore, for high k, a dispersion-compensation WDM system used previously for holographic imaging applications as in Collier et al., Optical Holography; see also R. Kim, S. Case, SPIE Proc. 1052, (1989) may be applied.

A dispersion-compensation WDM system of the present invention is illustrated in FIG. 30. The multiplex fiber 160, transmitting multiwavelength signals, $\lambda_1$, $\lambda_2$, $\lambda_3$, is pigtailed to the GRIN lens 161 (that can be replaced by a conventional microlens). The optical beam transmitted by the input fiber 160 is collimated by the GRIN lens 161 to an expanded wavefront 162. This wavefront is slightly divergent, with the divergence angle $\delta\alpha$, in the form $$\delta\alpha = \frac{NA'}{C'} \quad \text{(Eq. 85)}$$

where NA' is the numerical aperture of the input fiber, and C' is the collimation ratio of the GRIN lens 161. The collimated beam 162 is incident upon the first reflection grating 163, that is a reflection grating (DCG, photopolymer or photoresist). The beam 162 is diffracted into the wave 164, and then diffracted again by the second reflection grating 165. Both gratings 163 and 165 compensate for grating dispersion and also compensate optical wavefronts by compensating for variations in the shape of the wavefronts. If the gratings are uniform, their grating constants $\Lambda_{||}$ are identical. If they are in the form of HOEs, they are phase-conjugated. Because dispersion is compensated for due to the preferred use of two conjugate gratings, the divergence of the second diffracted beam 165A is the same as that of the beam 162, although the spot size increases, i.e., $D''' > D'' > D' > D$. Although the system in FIG. 30 is a generalization of the system in FIG. 3, its advantage is that it can couple the output beam 165A without loss to output fibers (166', 166'', 166'''), even if the fibers 160 and 166 are identical. In such a case, we need to satisfy the following condition:

$$\frac{D}{C'} = \frac{D'''}{C''} \quad \text{(Eq. 86)}$$

where C'' is the concentration ratio of the output GRIN lenses 167. Therefor C''≠C', and GRIN lenses can not be identical. In another version, reflection gratings 163 and 165 can be replaced with transmission gratings. Also, input fibers can be replaced by laser sources (LDs, LEDs, ELEDs), and output fibers by detectors.

The excellent power budget and high power margin of the data link of the present invention is useful in situations where untrained personnel are used to hook up the link. Additionally the low cost of the specific light sources (CD LDs and ELEDs) allows the economical implementation of highly redundant systems having other sources and fibers. If one source dies the system can be switched to an existing alternative source. The data link of the present invention may also be used for high hierarchy secured channels. If a three channel system is in use, two of the multi-wavelength channels can be used for communication and the third wavelength, which would advantageously be located close due to the fact that various fiber guided waves with different wavelengths have different space locations in the fiber to the cladding can be monitored for tapping by unwanted sources.

WDM Coded Security System

In another security system, based on the WDM system of the present invention, WDM security coding may be used in such a way that the information signal is redistributed (by using TDM, for example) between a number of $\lambda$-channels that can be randomly located in $\lambda$-space according to a predescribed coding procedure and WDM hardware built accordingly. In order to break the WDM code, it is necessary to read all $\lambda$-signals at the same time. This, however, requires satisfying two hardwave requirements: the receiver must have (A) a WDM-WDDM system identical to that of the user, and (B) a fiber dispersion compensation system identical to that of the user (requirement (B) is not necessary if fiber dispersion is small). In order, however, to satisfy condition (A) it would be necessary to prepare thousands of WDM-WDDM systems, satisfying all possible $\lambda$-combinations and immediately install a proper system, with proper $\lambda$-locations. This is nearly a practical impossibility and thus the WDDM Security System may be virtually unbreachable.

Embodiments of the present invention not disclosed herein are fully intended to be within the scope of the claims.

We claim:

1. An optical multichannel data communication link for transmitting data from a transmitter to a remote receiver, said link comprising a laser diode source coupled to said transmitter; means for converting each channel of data to a light wave from said source; wavelength division multiplexer means, at the transmitter, having paraxial optics for multiplexing the light waves to provide a multiplexed signal; fiber optic means, connected to the multiplexer means, for passing the multiplexed signal to the remote receiver; wavelength division demultiplexer means having paraxial optics for demultiplexing the multiplexed signal at the receiver to produce demultiplexed light waves at the receiver; and means for reconverting each of the demultiplexed light waves for use by the receiver; said wavelength division multiplexer means and demultiplexer means having fibers, a littrow reflection grating, and lens means which are paraxially aligned with said fiber optic means, said link being optimized to minimize cross talk by one of
   (A) setting a b/d ratio for said fibers so as not to be smaller than $(1/1-k)$, where b is the core to core distance between fibers, d is the diameter of the fiber cores, and $k = d\lambda/\Delta\lambda$, where $d\lambda$ is the maximum acceptable wavelength shift of said laser diode source and $\Delta\lambda$ is wavelength separation, and
   (B) satisfying the equation: $k < 1 - d/b$, where $k = d\lambda/\Delta\lambda$, where $d\lambda$ is the maximum acceptable wavelength shift of said laser diode source and $\Delta\lambda$ is wavelength separation, and where d is the diameter of the fiber cores and b is the core to core distance between fibers.

2. The multichannel data communication link defined in claim 1 wherein the means for modulating comprises a laser diode per channel within a single window of 750 to 850 nm wavelengths and channel separation of 10 to 30 nm.

3. An optical multichannel data communication link for transmitting data from a transmitter to a remote receiver; said link comprising a source connected to said transmitter; means for converting each channel of data to a modulated light wave from said source; wavelength division multiplexer means, at the transmitter, having paraxial optics for multiplexing the light waves to produce a multiplexed signal; multimode fiber optic means, connected to the multiplexer means, for passing the multiplexed signal to the remote receiver; wavelength division demultiplexer means having paraxial optics for demultiplexing the multiplexed signal at the receiver to produce demultiplexed light waves at the receiver; and means for reconverting each of the demultiplexed light waves for use by the receiver; said wavelength division multiplexer means and demultiplexer means having a littrow reflection grating and lens means which are paraxially aligned with said multimode fiber optic means to provide channel separation of less than 50 nm; wherein the means for converting comprises an LED or an edge emitting LED having wavelength separation, $\Delta\lambda$, and linewidth, $\delta\lambda$, such that $\delta\lambda/\Delta\lambda \leq 2(1-d/b)$, where d is the fiber core diameter and b is the cladding diameter.

4. The multichannel data communication link defined in claim 1 wherein the means for converting comprises a laser diode per channel within a single window of wavelengths near 1300 nm and channel separation of 10 to 30 nm.

5. The multichannel data communication link defined in claim 1 wherein the means for converting comprises an edge emitting LED per channel within a single window of wavelengths near 800 nm and channel separation of 10 to 30 nm.

6. The multichannel data communication link defined in claim 1 wherein the means for converting comprises an edge emitting LED per channel within a single window of wavelengths near 1300 nm and channel separation of 10 to 30 nm.

7. The multichannel data communication link defined in claim 1 wherein the means for multiplexing comprises a wavelength division multiplexer having a broadband reflection grating with uniform wavelength characteristics.

8. The multichannel data communication link defined in claim 1 or claim 6 wherein the means for converting and means for reconverting are analog processing circuits.

9. The multichannel data communication link defined in claim 1 or claim 6 wherein the means for converting and means for reconverting are digital processing circuits.

10. The multichannel data communication link defined in claim 1 or claim 6 wherein the means for converting and means for reconverting are digital processing circuits for a number of the channels and are analog processing circuits for the remaining channels.

11. The multichannel data communication link defined in claim 1 wherein the means for converting comprises a laser diode per channel within the dual wavelength windows of 1310 nm and 1550 nm, respectively.

12. The multichannel data communication link defined in claim 1 further comprising electronic feedback compensation means for reducing temperature sensitivity of the link.

13. The multichannel data communication link defined in claim 1 wherein the fiber optic means comprises a multimode fiber having a core/cladding ratio of 50/125, 62.5/125, 80/125, 100/140, 200/380, or other core/cladding ratios close to 0.5, preferably within the range: 0.3–0.85.

14. The multichannel data communication link defined in claim 1 wherein said fiber optic means has at least two fibers of equal diameter so that substantially all total internal reflection (TIR) angles are filled during operation so that modal partition noise and sensitivity to mechanical disturbance are minimized.

15. The multichannel data communication link defined in claim 1 wherein the means for reconverting comprises a photodetector for each channel.

16. The multichannel data communication link of claim 15 wherein the photodetectors are located at the output of the wavelength division multiplexer means and connected directly thereto.

17. The multichannel data communication link defined in claim 1 wherein the link transmits three channels which are converted to 750 nm, 780 nm, and 810 nm wavelengths.

18. The multichannel data communication link defined in claim 1 wherein the multiplexer means comprises a surface relief grating.

19. The multichannel data communication link defined in claim 1 wherein the multiplexer means is a photoresist grating.

20. An optical multichannel data communication link for transmitting data from a transmitter to a remote receiver, said link comprising a laser diode source coupled to said transmitter; means for modulating said source with each channel of data to generate a modulated light wave; wavelength division multiplexer means, at the transmitter, having paraxial optics for multiplexing the light waves to produce a multiplexed signal; fiber optic means, connected to the multiplexer means, for passing the multiplexed signal to the remote receiver; wavelength division demultiplexer means having paraxial optics for demultiplexing the multiplexed signal at the receiver to produce demultiplexed light waves at the receiver; and means for reconverting each of the demultiplexed light waves for use by the receiver; said fiber optic means comprising a single-mode fiber; said wavelength division multiplexer means and demultiplexer means having fibers, a littrow reflection grating, and lens means which are paraxially aligned with said single-mode fiber optic means, said link being optimized to minimize cross talk by one of (A) setting a b/d ratio for said fibers so as not to be smaller than $(1/1-k)$, where b is the core to core distance between fibers, d is the diameter of the fiber cores, and $k=d\lambda/\Delta\lambda$, where $d\lambda$ is the maximum acceptable wavelength shift of said laser diode source and $\Delta\lambda$ is wavelength separation, and (B) satisfying the equation: $k<1-d/b$, where $k=d\lambda/\Delta\lambda$, where $d\lambda$ is the maximum acceptable wavelength shift of said laser diode source and $\Delta\lambda$ is wavelength separation, and where d is the diameter of the fiber cores and b is the core to core distance between fibers.

21. The multichannel data communication link defined in claim 20 wherein an optical delay line per channel compensates for interwavelength fiber dispersion.

22. The multichannel data communication link defined in claim 20 wherein the single-mode fiber has a core/cladding ratio of 9/125$\mu$.

23. The multichannel data communication link defined in claim 20 wherein the wavelength division multiplexer means comprises a Littrow volume holographic grating which preserves polarization.

24. The multichannel data communication link defined in claim 20 wherein the means for modulating comprises a distributed feedback laser.

25. The multichannel data communication link defined in claim 24 wherein the number of channels exceeds 20 and further comprising means for limiting cross-talk to less than −20 dB.

26. An optical multichannel data communication link for transmitting data from a transmitter to a remote receiver, said link comprising a multimode laser diode source coupled to said transmitter; means for converting each channel of data to a light wave from said source; wavelength division multiplexer means, at the transmitter, having paraxial optics for multiplexing the light waves to produce a multiplexed signal; multimode fiber optic means, connected to the multiplexer means, for passing the multiplexed signal to the remote receiver; wavelength division demultiplexer means having paraxial optics for demultiplexing the multiplexed signal at the receiver to produce demultiplexed light waves; and means for reconverting each of the demultiplexed light waves for use by the receiver; said wavelength division multiplexer means and demultiplexer means having fibers, a littrow reflection grating, and a lens which are paraxially aligned with said fiber optic means, said link being optimized to minimize cross talk by one of (A) setting a b/d ratio for said fibers so as not to be smaller than $(1/1-k)$, where b is the core to core distance between fibers, d is the diameter of the fiber cores, and $k=d\lambda/\Delta\lambda$, where $d\lambda$ is the maximum acceptable wavelength shift of said laser diode source and $\Delta\lambda$ is wavelength separation, and (B) satisfying the equation: $k<1-d/b$, where $k=d\lambda/\Delta\lambda$, where $d\lambda$ is the maximum acceptable wavelength shift of said laser diode source and $\Delta\lambda$ is wavelength separation, and where d is the diameter of the fiber cores and b is the core to core distance between fibers.

27. The multichannel data communication link defined in claim 26, the lens replaced by a collimating mirror.

28. The multichannel data communication link defined in claim 26, wherein the lens is a GRIN lens.

29. The multichannel data communication link defined in claim 26 wherein the fibers comprise an input fiber and a plurality of output fibers, all said fibers being in alignment.

30. The multichannel data communication link defined in claim 26 wherein the input fiber is not in alignment with the output fibers.

31. The multichannel data communication link defined in claim 1 wherein the fiber optic means comprises a single-mode fiber wherein the fiber parameters of core diameter b and cladding diameter d, fiber loss, length L, numerical aperture NA, and tolerance dx; the light source parameters of source power P; frequency dv and wavelength control $d\lambda$ and wavelength shift coefficient $k_\lambda$; the grating parameters of grating dispersion, coefficient $K_\lambda$, Littrow angle $\alpha$, resolution $1/\Lambda$, grating constant $\Lambda$, DCG refractive index n, and grating optical density O.D.; the lens parameters of focal length L and diameter D; signal dispersion; and general link parameters of power budget, power margin BER, data rate per channel and aggregate data rate are all optimized to minimize cross-talk.

32. An optical multichannel data communication link for transmitting a multichannel signal from a source to a remote receiver, said link comprising transmitter means, optical path means, and receiver means;

said transmitter means comprising a laser diode source, means for converting each channel of the signal to a light wave from the source, and wavelength dispersive means for multiplexing the light waves;

said optical path means transmitting at least as many wavelengths as the number of channels and connecting the transmitter means to the receiver means;

said receiver means comprising wavelength dispersive means for demultiplexing the light wave and detector means for detecting each of the demultiplexed light waves and reconverting the light waves for use by the remote receiver;

said wavelength dispersing means having fibers, a littrow reflection grating, and lens means which are paraxially aligned with the optical path means, said link being optimized to minimize cross talk by one of (A) setting a b/d ratio for said fibers so as not to be smaller than $(1/1-k)$, where b is the core to core distance between fibers, d is the diameter of the fiber cores, and $k=d\lambda/\Delta\lambda$, where $d\lambda$ is the maximum acceptable wavelength shift of said laser diode source and $\Delta\lambda$ is wavelength separation, and (B) satisfying the equation: $k<1-d/b$, where $k=d\lambda/\Delta\lambda$, where $d\lambda$ is the maximum acceptable wavelength shift of said laser diode source and $\Delta\lambda$ is wavelength separation, and where d is the diameter of the fiber cores and b is the core to core distance between fibers.

33. An optical multichannel data communication link for transmitting a multichannel signal from a source to a remote receiver, said link having a known wavelength shift, $d\lambda$, and comprising transmitter means, optical path means, and receiver means;

said transmitter means comprising a source, laser diode means for modulating said source with each channel of the signal to generate a light wave, and wavelength dispersive means for multiplexing the light waves;

said optical path means transmitting at least as many wavelengths as the number of channels and connecting the transmitter means to the receiver means;

said receiver means comprising wavelength dispersive means for demultiplexing the light wave and detector means for detecting each of the demultiplexed light waves and converting the light waves for use by the remote receiver;

said wavelength dispersive means having fibers, a littrow reflection grating, and lens means which are paraxially aligned with the optical path means to provide channel separation of less than 50 nm said link optimized so that the b/d ratio for said fibers is set equal to $(b/d)_c$ wherein $(b/d)_c$ is determined from the equation $(b/d)_c = 2 - \zeta_d$ where b is the core to core distance between fibers and d is the diameter of the fiber cores, and wherein the $(b/d)_c$ equation is solved for by substituting maximum loss, $\zeta_{max}$, from the equation $$\xi_{max} = \frac{1-2k}{1-k} \text{ where } k = \frac{d\lambda}{\Delta\lambda}; \text{ for } \xi_d.$$

34. An optical multichannel data communication link for transmitting a multichannel signal from a source to a remote receiver, said link comprising transmitter means, optical path means, and receiver means;
   said transmitter means comprising a source, laser diode means for modulating said source with each channel of the signal to produce a modulated light wave, and wavelength dispersive means for multiplexing the light waves;
   said optical path means transmitting at least as many wavelengths as the number of channels and connecting the transmitter means to the receiver means;
   said receiver means comprising wavelength dispersive means for demultiplexing the light wave and detector means for detecting each of the demultiplexed light waves and reconverting the light waves for use by the remote receiver;
   said wavelength dispersive means having fibers, a littrow reflection grating, lens means which are paraxially aligned with the optical path means to provide channel separation of less than 50 nm;
   said link having a predetermined minimum dispersion loss, $\zeta_d$, in accordance with the equation $$k = k_0 - \frac{1-\xi_d}{2-\xi_d}$$

where $\zeta_D$ is a function of b and d, and b is the core to core distance between fibers, d is the diameter of the fiber core, and k is the wavelength tolerance shift.

35. The multichannel data communication link defined in claim 32 wherein the laser diode means comprises standard laser diodes having wavelengths centered at 750, 780, 810, or 840 nm.

36. An optical multichannel data communication link for transmitting a multichannel signal from a source to a remote receiver, said link comprising transmitter means, optical path means, and receiver means;
   said transmitter means comprising a laser diode source, means for converting each channel of the signal to a light wave from said source, and wavelength dispersive means for multiplexing the light waves;
   said optical path means transmitting at least as many wavelengths as the number of channels and connecting the transmitter means to the receiver means;
   said receiver means comprising wavelength dispersive means for demultiplexing the light wave and detector means for detecting each of the demultiplexed light waves and reconverting the light waves for use by the remote receiver;
   said wavelength dispersive means having a littrow reflection grating and lens means which are paraxially aligned with the optical path means to provide channel separation of less than 50 nm;
   wherein the optical path means comprises fibers having a fiber geometry meeting the condition $b/d=(b/d)_c$, wherein b is the distance between adjacent fiber cores, d is the diameter of the core of the fiber, and $(b/d)_c=1/(1-k_o)$ where $$k_0 = \frac{d\lambda_c}{\Delta\lambda}$$

where $\Delta\lambda$ is the center wavelength separation of each light wave and $d\lambda_c$ is the maximum permissible wavelength variation from the center wavelength of each light wave.

37. The multichannel data communication link defined in claim 36 wherein $(b/c)_c$ is adjusted so that the tradeoff between cross-talk and insertion loss is minimized.

38. An optical multichannel data communication link for transmitting data from a transmitter to a remote receiver, said link comprising a laser diode source coupled to said transmitter, means for converting each channel of data to a light wave from said source; wavelength division multiplexer means, at the transmitter, having paraxial optics, for multiplexing the light waves to produce a multiplexed signal; fiber optic means, connected to the multiplexer means, for passing the multiplexed signal to the remote receiver; wavelength division demultiplexer means having paraxial optics for demultiplexing the multiplexed signal at the receiver to produce demultiplexed light waves at the receiver; and means for reconverting each of the demultiplexed light waves for use by the receiver; said wavelength division multiplexer means and said wavelength division demultiplexer means comprising a wavelength division multiplexer/demultiplexer having paraxially aligned fibers, a lens, and a littrow reflection grating to provide channel separation of less than 50 nm, said fibers of said multiplexer having a b/d ratio different than the b/d ratio of said fibers of said demultiplexer, where b is the core to core distance between fibers and d is the diameter of the fiber core, said link being optimized to minimize cross talk by one of
   (A) setting a b/d ratio for said fibers so as not to be smaller than $(1/1-k)$, where $k=d\lambda/\Delta\lambda$, where $d\lambda$ is the maximum acceptable wavelength shift of said laser diode source and $\Delta\lambda$ is wavelength separation, and
   (B) satisfying the equation: $k<1-d/b$, where $k=d\lambda/\Delta\lambda$, where $d\lambda$ is the maximum acceptable wavelength shift of said laser diode source and $\Delta\lambda$ is wavelength separation, and where d is the diameter of the fiber cores and b is the core to core distance between fibers.

39. An optical multichannel data communication link for transmitting data from a transmitter to a remote receiver, said link comprising a source connected to said transmitter, means for modulating said source with each channel of data to generate a modulate light wave; wavelength division multiplexer means, at the transmitter, having paraxial optics for multiplexing the light waves to produce a multiplexed signal; fiber optic means, connected to the multiplexer means, for passing the multiplexed signal to the remote receiver; wavelength division demultiplexer means having paraxial optics for demultiplexing the multiplexed signal at the receiver to produce demultiplexed light waves at the receiver; and means for converting each of the demultiplexed light waves for use by the receiver; said wavelength division multiplexer means and said wavelength division demultiplexer means comprising a wavelength division multiplexer/demultiplexer having paraxially aligned fibers, a lens, and a littrow reflection grating to provide channel separation of less than 50 nm, said fibers of said multiplexer having a b/d ratio different than the b/d ratio of said fibers of said demultiplexer, where b is the core to core distance between fibers and d is the diameter of the fiber core, wherein the respective b/d ratio of the multiplexer and demultiplexer is due to a difference in the thickness of the cladding between the fibers in the multiplexer and demultiplexer respectively.

40. A multichannel data communication link for transmitting data from a transmitter to a remote receiver, said link comprising means for conditioning the signal from the transmitter, said means for conditioning being connected electrically to the transmitter, laser diode means for converting the signals output from the signal conditioning means, said laser diode means being connected to the signal conditioning means via one optical fiber per channel, wavelength division multiplexing means, at the transmitter, for multiplexing the outputs of the laser diode means and connected to the laser diode means via one optical fiber per channel, wavelength division demultiplexing means connected to the output of the multiplexing means via an optical fiber, detector means connected to the demultiplexing means via one optical fiber per channel, signal conditioning means connected electrically to the outputs of the detector means, and receiver means electrically connected to the outputs of the signal conditioning means, said multiplexing and demultiplexing means having paraxially arranged transmission optics, fibers, and a littrow broad band uniform reflection grating, said link being optimized to minimize cross talk by one of (A) setting a b/d ratio for said fibers so as not to be smaller than $(1/1-k)$, where b is the core to core distance between fibers, d is the diameter of the fiber cores, and $k=d\lambda/\Delta\lambda$, where $d\lambda$ is the maximum acceptable wavelength shift of said laser diode source and $\Delta\lambda$ is wavelength separation, and (B) satisfying the equation: $k<1-d/b$, where $k=d\lambda/\Delta\lambda$, where $d\lambda$ is the maximum acceptable wavelength shift of said laser diode source and $\Delta\lambda$ is wavelength separation, and where d is the diameter of the fiber cores and b is the core to core distance between fibers.

41. The multichannel data communication link defined in claim 40 wherein edge limiting LED means is substituted for the laser diode means.

42. A multichannel data communication link for transmitting data from a transmitter to a remote receiver, said link comprising means for conditioning the signal from the transmitter, said means for conditioning being connected electrically to the transmitter, laser diode means for converting the signals output from the signal conditioning means, said laser diode means being connected to the signal conditioning means via one optical fiber per channel, wavelength division multiplexing means, at the transmitter, for multiplexing the outputs of the laser diode means and connected to the laser diode means via one optical fiber per channel, wavelength division demultiplexing means connected to the output of the multiplexing means via an optical fiber, detector means connected to the demultiplexing means via one optical fiber per channel, signal conditioning means connected electrically to the outputs of the detector means, and receiver means electrically connected to the outputs of the signal conditioning means, said multiplexing and demultiplexing means having paraxially arranged transmission optics and a littrow broad band uniform reflection grating wherein the optical fibers connecting the laser diode means and the multiplexing means are of smaller diameter than the optical fiber connecting the multiplexing and demultiplexing means, and the optical fibers connecting the demultiplexing means and the detectors are of larger diameter than the said fibers and fiber, said link being optimized to minimize cross talk by one of (A) setting a b/d ratio for said fibers so as not to be smaller than $(1/1-k)$, where b is the core to core distance between fibers, d is the diameter of the fiber cores, and $k=d\lambda/\Delta\lambda$, where $d\lambda$ is the maximum acceptable wavelength shift of said laser diode source and $\Delta\lambda$ is wavelength separation, and (B) satisfying the equation: $k<1-d/b$, where $k=d\lambda/\Delta\lambda$, where $d\lambda$ is the maximum acceptable wavelength shift of said laser diode source and $\Delta\lambda$ is wavelength separation, and where d is the diameter of the fiber cores and b is the core to core distance between fibers.

43. A multichannel video link for linking the central processing unit of a real time market data computer to a plurality of data feed monitors and keyboards, said link comprising a transmitting module which fits into the electronics rack of the computer, a receiving module which fits into the electronics rack of a remote receiver to which is connected the plurality of data feed monitors, and optical path means connecting the transmitting module to the receiving module, said transmitting module comprising a laser diode source for each channel in the system operating in the single window range of 750-850 nm, a wavelength division multiplexer connected to each of the laser diode outputs and having fibers, a uniform broadband reflection littrow grating, and paraxial transmission optics; said optical path means comprising a standard multimode fiber; the receiving module comprising a wavelength division demultiplexer (WDDM) connected to the optical path means and having fibers, a uniform broadband reflection littrow grating, paraxial transmission optics, and an output for each channel, and photodetector means connected to each output of the WDDM, the outputs of the photodetector means connected to the data feed monitors, said link being optimized to minimize cross talk by one of (A) setting a b/d ratio for said fibers so as not to be smaller than $(1/1-k)$, where b is the core to core distance between fibers, d is the diameter of the fiber cores, and $k=d\lambda/\Delta\lambda$, where $d\lambda$ is the maximum acceptable wavelength shift of said laser diode source and $\Delta\lambda$ is wavelength separation, and (B) satisfying the equation: $k<1-d/b$, where $k=d\lambda/\Delta\lambda$, where $d\lambda$ is the maximum acceptable wavelength shift of said laser diode source and $\Delta\lambda$ is wavelength separation, and where d is the diameter of the fiber cores and b is the core to core distance between fibers.

44. A multichannel video link for linking the central processing unit of a real time market data computer to a plurality of data feed monitors and keyboards, said link comprising a transmitting module which fits into the electronics rack of the computer, a receiving module which fits into the electronics rack of a remote receiver to which is connected the plurality of data feed monitors, and optical path means connecting the transmitting module to the receiving module, said transmitting module comprising a laser diode source for each channel in the system operating in the single window range of 750–850 nm, a wavelength division multiplexer connected to each of the laser diode outputs and having a uniform broadband reflection littrow grating and paraxial transmission optics to provide channel separation of less than 50 nm; said optical path means comprising a standard multimode fiber; the receiving module comprising a wavelength division demultiplexer (WDDM) connected to the optical path means and having a uniform broadband reflection littrow grating and paraxial transmission optics to provide channel separation of less than 50 nm, and an output for each channel, and photodetector means connected to each output of the WDDM, the outputs of the photodetector means connected to the data feed monitors, wherein the wavelength division demultiplexer is optimized in accordance with the following equation $$\left(\frac{b}{d_{[c]}}\right)_c = \frac{1}{1-k}$$

where b is the core to core distance between fibers, d is the core diameter, and k is $$\frac{d\lambda}{\Delta\lambda}$$

wherein $d\lambda 0$ is wavelength shift.

45. A multichannel video link for linking the central processing unit of a real time market data computer to a plurality of data feed monitors and keyboards, said link comprising a transmitting module which fits into the electronics rack of the computer, a receiving module which fits into the electronics rack of a remote receiver to which is connected the plurality of data feed monitors, and optical path means connecting the transmitting module to the receiving module, said transmitting module comprising an LED for each channel in the system operating in the single window range of 750–850 nm, a wavelength division multiplexer connected to each of the laser diode outputs having a uniform broadband reflection littrow grating and paraxial transmission optics to provide channel separation of less than 50 nm; said optical path means comprising a standard multimode fiber; the receiving module comprising a wavelength division demultiplexer (WDDM) connected to the optical path means and having a uniform broadband reflection littrow grating and paraxial transmission optics to provide channel separation of less than 50 nm, and an output for each channel, and photodetector means connected to each output of the WDDM, the outputs of the photodetector means connected to the data feed monitors, wherein $$(b/d)_c = \frac{2}{2-k'}$$

where b is the core to core distance between fibers, d is the fiber core diameter, and $k' = \delta\lambda, \Delta\lambda$, $\delta\lambda$ is ELED linewidth, and $\Delta\lambda$ is wavelength separation.

46. An integrated services digital network (ISDN) comprising a first plurality of connected computer workstations, a second plurality of connected computer workstations, a multiplexing link having electrical inputs from the first plurality, and video and voice signal inputs and an optical output; and a demultiplexing link having an optical input connected via a single fiber to the optical output of the multiplexing link, and an electrical output to the second plurality and video and voice signal outputs; said multiplexing link comprising a laser diode source; wavelength division multiplexer means coupled to said source and having paraxial optics including first fibers, lens means, and a littrow reflection grating paraxially aligned with said first fibers; said demultiplexing link comprising wavelength demultiplexing means having paraxial optics including second fibers, lens means, and a littrow reflection grating paraxially aligned with said second fibers, said link being optimized to minimize cross talk by one of (A) setting a b/d ratio for said first and second fibers so as not to be smaller than $(1/1-k)$, where b is the core to core distance between fibers, d is the diameter of the fiber cores, and $k = d\lambda/\Delta\lambda$, where $d\lambda$ is the maximum acceptable wavelength shift of said laser diode source and $\Delta\lambda$ is wavelength separation, and (B) satisfying, for said first and second fibers, the equation: $k < 1 - d/b$, where $k = d\lambda/\Delta\lambda$, where $d\lambda$ is the maximum acceptable wavelength shift of said laser diode source and $\Delta\lambda$ is wavelength separation, and where d is the diameter of the fiber cores and b is the core to core distance between fibers.

47. A local area networking (LAN) system comprising an engine workstation connected to wavelength division demultiplexing means (WDDM); said WDDM connected optically via a single transmission fiber to remote wavelength division demultiplexing means (WDDM) connected to a remote workstation; said engine workstation transmitting signals to and receiving signals from said remote workstation over said single transmission fiber, said WDDM and remote WDDM having fibers, a littrow reflection grating, and lens means paraxially aligned with said transmission fiber, said link being optimized to minimize cross talk by one of (A) setting a b/d ratio for said fibers so as not to be smaller than $(1/1-k)$, where b is the core to core distance between fibers, d is the diameter of the fiber cores, and $k = d\lambda/\Delta\lambda$, where $d\lambda$ is the maximum acceptable wavelength shift of said laser diode source and $\Delta\lambda$ is wavelength separation, and (B) satisfying the equation: $k < 1 - d/b$, where $k = d\lambda/\Delta\lambda$, where $d\lambda$ is the maximum acceptable wavelength shift of said laser diode source and $\Delta\lambda$ is wavelength separation, and where d is the diameter of the fiber cores and b is the core to core distance between fibers.

48. The LAN system defined in claim 47 wherein the engine workstation transmits standard red-green-blue (RGB) signals to said remote workstation and transmits to and receives data signals from the remote workstation.

49. The LAN system defined in claim 47 wherein the WDDM means comprises fibers, a lens, and a reflection grating all arranged paraxially.

50. The LAN system defined in claim 47 wherein the remote workstation comprises a standard computer monitor and a keyboard, the monitor receiving said standard red-green-blue (RGB) signals and the keyboard receiving and transmitting said data signals.

51. A multichannel data communication link comprising a first wavelength division multiplexing bidirectional coupler, a second wavelength division multiplexing bidirectional coupler, first and second transmitters including a laser diode source, and first and second receivers, the first transmitter inputting a first wavelength light wave into the first coupler, the second transmitter inputting a second wavelength light wave into the second coupler, the first coupler inputting the first wavelength light wave into the second coupler and the second coupler inputting the second wavelength light wave into the first coupler, the second coupler outputting the first wavelength light wave into the second receiver and the first coupler outputting the second wavelength light wave into the first receiver, said couplers having fibers, a littrow reflection grating, and a lens paraxially aligned, said link being optimized to minimize cross talk by one of (A) setting a b/d ratio for said fibers so as not to be smaller than $(1/1-k)$, where b is the core to core distance between fibers, d is the diameter of the fiber cores, and $k=d\lambda/\Delta\lambda$, where $d\lambda$ is the maximum acceptable wavelength shift of said laser diode source and $\Delta\lambda$ is wavelength separation, and (B) satisfying the equation: $k<1-d/b$, where $k=d\lambda/\Delta\lambda$, where $d\lambda$ is the maximum acceptable wavelength shift of said laser diode source and $\Delta\lambda$ is wavelength separation, and where d is the diameter of the fiber cores and b is the core to core distance between fibers.

52. The multichannel data communication link defined in claim 51 in a local area network, metropolitan area network, or wide-area network.

53. The multichannel data communication link defined in claim 51 wherein the first and second couplers receive and transmit the first and second wavelength light waves between each other via a single mode fiber.

54. The multichannel data communication link defined in claim 51 wherein the first and second couplers receive and transmit the first and second wavelength light waves between each other via a multi-mode fiber.

55. The multichannel data communication link defined in claim 51 wherein the couplers comprise a volume holographic grating in quasi-Lippman geometry, lens means for collimation and concentration, and first, second, and third fibers, all arranged paraxially.

56. The multichannel data communication link of claim 51 wherein the first and second transmitters comprise single mode, 3-channel wavelength division multiplexers.

57. The multichannel data communication link defined in claim 51 wherein the first and second receivers comprise single mode, 3-channel wavelength division multiplexers.

58. The multichannel data communication link defined in claim 51 wherein the first wavelength equals about 1320 nm and the second wavelength equals about 1510 nm.

59. A broad band source comprising a paraxially aligned lens, littrow reflection grating, and first, second and third fibers, said first fiber being an output fiber, said second and third fibers being input fibers carrying two separate wavelength light waves slightly shifted from each other from two separate LEDs, said two separate wavelength light waves being multiplexed and coupled into said first fiber by the lens and grating with wavelength separation of less than 50 nm between the two light waves, said source being optimized to minimize cross talk by one of (A) setting a b/d ratio for said fibers so as not to be smaller than $(1/1-k)$, where b is the core to core distance between fibers, d is the diameter of the fiber cores, and $k=d\lambda/\Delta\lambda$, where $d\lambda$ is the maximum acceptable wavelength shift of said LEDs and $\Delta\lambda$ is wavelength separation, and (B) satisfying the equation: $k<1-d/b$, where $k=d\lambda/\Delta\lambda$, where $d\lambda$ is the maximum acceptable wavelength shift of said LEDs and $\Delta\lambda$ is wavelength separation, and where d is the diameter of the fiber cores and b is the core to core distance between fibers.

60. The broad band source as defined in claim 59 wherein the light waves are generated by ELEDs.

61. The broad band source as defined in claim 59 further comprising means for coupling at least 50% of the total energy of the two separate wavelength light waves into the first fiber.

* * * * *

UNITED STATES PATENT AND TRADEMARK OFFICE
CERTIFICATE OF CORRECTION

PATENT NO. : 5,278,687
DATED : Jan. 11, 1994
INVENTOR(S) : Jannson et al.

It is certified that error appears in the above-indentified patent and that said Letters Patent is hereby corrected as shown below:

Title page of patent, after "Attorney, Agent, or Firm", change "Niles & Niles" to --Nilles & Nilles, S.C.--.

Column 23, Table 6, No. 20, the Value "1000 1/mm" should read --1000 $\ell$/mm--; and
    No. 25, the Value "$\leqq$90%" should read --$\geqq$90%--.

Column 24, line 27 "Wave-" should be --wave---.

Signed and Sealed this

Twenty-first Day of March, 1995

BRUCE LEHMAN

*Attest:*

*Attesting Officer*   *Commissioner of Patents and Trademarks*